United States Patent
Bechtel et al.

(10) Patent No.: US 9,208,262 B2
(45) Date of Patent: Dec. 8, 2015

(54) SYSTEM FOR DISPLAYING A PLURALITY OF ASSOCIATED ITEMS IN A COLLABORATIVE ENVIRONMENT

(75) Inventors: Michael E. Bechtel, Naperville, IL (US); Erin E. Hsu, Sunnyvale, CA (US); Brian H. Richards, Chicago, IL (US)

(73) Assignee: Accenture Global Services Limited, Dublin (IE)

( * ) Notice: Subject to any disclaimer, the term of this patent is extended or adjusted under 35 U.S.C. 154(b) by 477 days.

(21) Appl. No.: 12/489,824

(22) Filed: Jun. 23, 2009

(65) Prior Publication Data
US 2009/0259947 A1 Oct. 15, 2009

Related U.S. Application Data

(63) Continuation-in-part of application No. 12/036,012, filed on Feb. 22, 2008.

(51) Int. Cl.
*G06F 3/00* (2006.01)
*G06F 17/30* (2006.01)
*G06Q 10/10* (2012.01)

(52) U.S. Cl.
CPC .......... *G06F 17/30994* (2013.01); *G06Q 10/10* (2013.01)

(58) Field of Classification Search
CPC ... G06Q 10/10; G06Q 10/109; G06Q 10/107; G06F 3/0481; H04L 12/1822
USPC .................................................. 715/751, 753
See application file for complete search history.

(56) References Cited

U.S. PATENT DOCUMENTS

| | | | | |
|---|---|---|---|---|
| 5,251,294 A | * | 10/1993 | Abelow | 715/236 |
| 5,414,809 A | * | 5/1995 | Hogan et al. | 715/765 |
| 5,628,009 A | * | 5/1997 | Kikuta et al. | 1/1 |
| 5,812,773 A | * | 9/1998 | Norin | 709/204 |
| 5,835,085 A | * | 11/1998 | Eick et al. | 715/853 |
| 5,878,214 A | * | 3/1999 | Gilliam et al. | 709/204 |

(Continued)

FOREIGN PATENT DOCUMENTS

| | | |
|---|---|---|
| EP | 1 286 276 A1 | 2/2003 |
| EP | 1286276 A1 | 2/2003 |
| WO | WO 2004/097627 A2 | 11/2004 |

OTHER PUBLICATIONS

Abi-Antoun et al. ("Differencing and merging of architectural views" by Abi-Antoun et al.; pub date: Dec. 22, 2007).*

(Continued)

*Primary Examiner* — Jessica Chuang
(74) *Attorney, Agent, or Firm* — Brinks Gilson & Lione

(57) ABSTRACT

A system is described for displaying a plurality of associated items in a collaborative environment. The system may include a memory, an interface, and a processor. The memory may store items, each item associated with another item. The processor may provide the graphical representation of the items to a user where each item is represented by a shape. The processor may receive a request to associate a first metric of the items with a size of each shape and a request to associate a second metric of the items with a color of each shape. The processor may transform the graphical representation such that the size of each shape is based on the value of the first metric of each item, and the color of each shape is based on the value of the second metric of each item. The processor may provide the transformed graphical representation to the user.

50 Claims, 33 Drawing Sheets

(56) References Cited

U.S. PATENT DOCUMENTS

| | | | |
|---|---|---|---|
| 5,907,704 A * | 5/1999 | Gudmundson et al. | 717/100 |
| 5,918,222 A * | 6/1999 | Fukui | G06Q 10/10 1/1 |
| 6,302,698 B1 | 10/2001 | Ziv-El | |
| 6,484,190 B1 * | 11/2002 | Cordes et al. | 715/207 |
| 6,509,898 B2 * | 1/2003 | Chi et al. | 345/440 |
| 6,681,369 B2 | 1/2004 | Meunier et al. | |
| 6,775,576 B2 * | 8/2004 | Richetta et al. | 700/8 |
| 6,856,986 B1 | 2/2005 | Rossides | |
| 6,865,715 B2 * | 3/2005 | Uchino et al. | 715/277 |
| 6,889,096 B2 * | 5/2005 | Spriggs et al. | 700/17 |
| 7,012,627 B1 * | 3/2006 | Estrada | G06Q 10/10 715/732 |
| 7,077,313 B2 * | 7/2006 | Chung | G06K 7/10346 235/386 |
| 7,111,253 B2 * | 9/2006 | Newman | 715/854 |
| 7,155,157 B2 * | 12/2006 | Kaplan | 434/350 |
| 7,219,307 B2 * | 5/2007 | Senay | 715/764 |
| 7,296,023 B2 | 11/2007 | Geyer et al. | |
| 7,305,419 B1 * | 12/2007 | Cosby et al. | 1/1 |
| 7,356,772 B2 * | 4/2008 | Brownholtz et al. | 715/752 |
| 7,360,164 B2 * | 4/2008 | Bjoernsen | G06Q 10/10 709/203 |
| 7,370,285 B1 | 5/2008 | Nickerson et al. | |
| 7,421,690 B2 * | 9/2008 | Forstall et al. | 718/100 |
| 7,458,019 B2 * | 11/2008 | Gumz et al. | 715/234 |
| 7,480,696 B2 | 1/2009 | Kirkland et al. | |
| 7,519,529 B1 | 4/2009 | Horvitz | |
| 7,519,562 B1 | 4/2009 | Vander Mey et al. | |
| 7,548,873 B2 * | 6/2009 | Veeningen et al. | 705/7.12 |
| 7,565,534 B2 | 7/2009 | Starbuck et al. | |
| 7,620,407 B1 * | 11/2009 | Donald et al. | 455/466 |
| 7,634,546 B1 * | 12/2009 | Strickholm | G06Q 10/10 709/205 |
| 7,635,087 B1 * | 12/2009 | Chung | G06K 7/14 235/386 |
| 7,657,404 B2 | 2/2010 | Thurner | |
| 7,702,730 B2 * | 4/2010 | Spataro | G06F 17/30011 709/205 |
| 7,720,835 B2 * | 5/2010 | Ward et al. | 707/710 |
| 7,725,331 B2 * | 5/2010 | Schurenberg | G06Q 10/10 715/743 |
| 7,788,237 B2 | 8/2010 | Voronov et al. | |
| 7,793,219 B1 * | 9/2010 | Stratton et al. | 715/723 |
| 7,814,048 B2 * | 10/2010 | Zhou et al. | 707/602 |
| 7,818,378 B2 * | 10/2010 | Buchheit et al. | 709/206 |
| 7,822,848 B2 | 10/2010 | Muller et al. | |
| 7,853,880 B2 * | 12/2010 | Porter | 715/734 |
| 7,899,694 B1 | 3/2011 | Marshall et al. | |
| 7,953,720 B1 | 5/2011 | Rohde et al. | |
| 7,996,774 B1 * | 8/2011 | Sidenur | G06Q 10/10 715/743 |
| 8,046,014 B2 * | 10/2011 | Donald et al. | 455/466 |
| 8,060,817 B2 * | 11/2011 | Goldberg et al. | 715/212 |
| 8,065,193 B2 * | 11/2011 | Bullock | 705/26.3 |
| 8,140,983 B2 * | 3/2012 | Brantley et al. | 715/759 |
| 8,151,200 B2 | 4/2012 | Roger et al. | |
| 8,356,048 B2 * | 1/2013 | Hibbets et al. | 707/769 |
| 8,499,248 B1 * | 7/2013 | Keel | G06F 17/3087 715/753 |
| 8,671,021 B2 * | 3/2014 | Maharajh et al. | 705/14.66 |
| 8,677,279 B2 * | 3/2014 | Gan et al. | 715/854 |
| 8,701,018 B1 * | 4/2014 | Keel | G06F 17/3087 715/751 |
| 2001/0033296 A1 * | 10/2001 | Fullerton et al. | 345/730 |
| 2002/0023144 A1 | 2/2002 | Linyard et al. | |
| 2002/0023271 A1 * | 2/2002 | Augenbraun et al. | 725/109 |
| 2002/0075320 A1 | 6/2002 | Kurapati | |
| 2002/0076674 A1 * | 6/2002 | Kaplan | 434/107 |
| 2002/0133369 A1 * | 9/2002 | Johnson | 705/1 |
| 2003/0028269 A1 * | 2/2003 | Spriggs et al. | 700/83 |
| 2003/0036947 A1 | 2/2003 | Smith, III et al. | |
| 2003/0067481 A1 * | 4/2003 | Chedgey et al. | 345/738 |
| 2003/0101065 A1 * | 5/2003 | Rohall et al. | 705/1 |
| 2003/0101197 A1 * | 5/2003 | Sorensen et al. | 707/104.1 |
| 2003/0129574 A1 * | 7/2003 | Ferriol et al. | |
| 2003/0163537 A1 * | 8/2003 | Rohall et al. | 709/206 |
| 2003/0167310 A1 * | 9/2003 | Moody et al. | 709/206 |
| 2003/0167443 A1 | 9/2003 | Meunier et al. | |
| 2003/0172025 A1 * | 9/2003 | Gallina | 705/38 |
| 2003/0177311 A1 * | 9/2003 | Moody et al. | 709/206 |
| 2003/0216962 A1 | 11/2003 | Heller et al. | |
| 2004/0113953 A1 * | 6/2004 | Newman | 345/853 |
| 2004/0148586 A1 * | 7/2004 | Gilboa | 717/108 |
| 2004/0181417 A1 * | 9/2004 | Piller et al. | 705/1 |
| 2004/0186738 A1 * | 9/2004 | Reisman | 705/1 |
| 2004/0205065 A1 | 10/2004 | Petras et al. | |
| 2004/0225577 A1 | 11/2004 | Robinson | |
| 2004/0260756 A1 * | 12/2004 | Forstall et al. | 709/200 |
| 2005/0057584 A1 * | 3/2005 | Gruen et al. | 345/752 |
| 2005/0060222 A1 | 3/2005 | White | |
| 2005/0108103 A1 | 5/2005 | Roberts et al. | |
| 2005/0114781 A1 * | 5/2005 | Brownholtz et al. | 715/733 |
| 2005/0149622 A1 | 7/2005 | Kirkland et al. | |
| 2005/0159932 A1 * | 7/2005 | Thurner | 703/2 |
| 2005/0165859 A1 | 7/2005 | Geyer et al. | |
| 2005/0177388 A1 | 8/2005 | Moskowitz et al. | |
| 2005/0228983 A1 * | 10/2005 | Starbuck et al. | 713/151 |
| 2005/0267875 A1 | 12/2005 | Bentley, III | |
| 2005/0283474 A1 | 12/2005 | Francis et al. | |
| 2006/0026502 A1 | 2/2006 | Dutta | |
| 2006/0026509 A1 * | 2/2006 | Porter | 715/520 |
| 2006/0026593 A1 * | 2/2006 | Canning et al. | 718/100 |
| 2006/0053382 A1 * | 3/2006 | Gardner et al. | 715/764 |
| 2006/0090137 A1 * | 4/2006 | Cheng et al. | 715/758 |
| 2006/0095443 A1 | 5/2006 | Kumar et al. | |
| 2006/0101324 A1 * | 5/2006 | Goldberg et al. | 715/503 |
| 2006/0106627 A1 * | 5/2006 | Al-Nujaidi | 705/1 |
| 2006/0112392 A1 | 5/2006 | Zhang et al. | |
| 2006/0121434 A1 | 6/2006 | Azar | |
| 2006/0134593 A1 * | 6/2006 | Kalous et al. | 434/350 |
| 2006/0136510 A1 * | 6/2006 | Voronov et al. | 707/203 |
| 2006/0218004 A1 * | 9/2006 | Dworkin et al. | 705/1 |
| 2006/0242554 A1 | 10/2006 | Gerace et al. | |
| 2006/0247943 A1 | 11/2006 | Kapoor | |
| 2007/0011204 A1 * | 1/2007 | Sorensen et al. | 707/104.1 |
| 2007/0078670 A1 | 4/2007 | Dave et al. | |
| 2007/0143128 A1 | 6/2007 | Tokarev et al. | |
| 2007/0143281 A1 | 6/2007 | Smirin et al. | |
| 2007/0150496 A1 * | 6/2007 | Feinsmith | 707/100 |
| 2007/0160970 A1 * | 7/2007 | Kaplan | 434/350 |
| 2007/0219958 A1 | 9/2007 | Park et al. | |
| 2007/0226296 A1 * | 9/2007 | Lowrance et al. | 709/204 |
| 2007/0245380 A1 * | 10/2007 | Dommer et al. | 725/52 |
| 2007/0256033 A1 | 11/2007 | Hiler | |
| 2007/0288416 A1 * | 12/2007 | Ferguson et al. | 706/50 |
| 2007/0288546 A1 | 12/2007 | Rosenberg | |
| 2007/0294281 A1 * | 12/2007 | Ward et al. | 707/102 |
| 2008/0108036 A1 | 5/2008 | Dom et al. | |
| 2008/0120339 A1 * | 5/2008 | Guan et al. | 707/104.1 |
| 2008/0133671 A1 | 6/2008 | Kalaboukis | |
| 2008/0172407 A1 * | 7/2008 | Sacks | 707/102 |
| 2008/0189724 A1 * | 8/2008 | Tien et al. | 719/329 |
| 2008/0192302 A1 * | 8/2008 | Rohall et al. | 358/402 |
| 2008/0201159 A1 | 8/2008 | Gabrick | |
| 2008/0201225 A1 * | 8/2008 | Maharajh et al. | 705/14 |
| 2008/0208898 A1 * | 8/2008 | Salo et al. | 707/103 R |
| 2008/0222279 A1 * | 9/2008 | Cioffi et al. | 709/223 |
| 2008/0228827 A1 | 9/2008 | Perlman | |
| 2008/0243729 A1 * | 10/2008 | Icenoggle | 706/12 |
| 2008/0243807 A1 | 10/2008 | Gaucas et al. | |
| 2008/0244438 A1 * | 10/2008 | Peters et al. | 715/772 |
| 2008/0261191 A1 | 10/2008 | Woolf et al. | |
| 2008/0270949 A1 * | 10/2008 | Liang | 715/859 |
| 2008/0276179 A1 | 11/2008 | Borenstein et al. | |
| 2008/0281610 A1 * | 11/2008 | Yoshida et al. | 705/1 |
| 2008/0288914 A1 * | 11/2008 | Schmitter | 717/101 |
| 2008/0301091 A1 * | 12/2008 | Hibbets et al. | 707/3 |
| 2009/0037414 A1 * | 2/2009 | Olivier et al. | 707/7 |
| 2009/0070188 A1 | 3/2009 | Scott et al. | |
| 2009/0094219 A1 | 4/2009 | Davis | |
| 2009/0094328 A1 | 4/2009 | Goodman et al. | |
| 2009/0132651 A1 | 5/2009 | Roger et al. | |
| 2009/0162824 A1 | 6/2009 | Heck | |

(56) References Cited

U.S. PATENT DOCUMENTS

| | | | |
|---|---|---|---|
| 2009/0271708 A1 | 10/2009 | Peters et al. | |
| 2009/0292727 A1* | 11/2009 | Powell | 707/104.1 |
| 2010/0011309 A1* | 1/2010 | Mitra et al. | 715/768 |
| 2010/0048231 A1* | 2/2010 | Donald et al. | 455/466 |
| 2010/0076838 A1* | 3/2010 | Steelberg et al. | 705/14.44 |
| 2010/0162135 A1* | 6/2010 | Wanas et al. | 715/753 |
| 2010/0299326 A1* | 11/2010 | Germaise | 707/728 |
| 2012/0246251 A1* | 9/2012 | Staats | 709/206 |

OTHER PUBLICATIONS

Halasz et al. ("NoteCards in a Nutshell" by Halasz et al.; pub date: 1987).*

Lampe et al. ("Follow the Reader: Filtering Comments on Slashdot" by Lampe et al.; pub date: Apr. 28, 2007).*

SchematicView (see 3D MAX-TUTORIAL.COM from https://web.archive.org/web/20070731032921/http://www.3dmaxtutorials.com/SchematicView.html; dated Jul. 31, 2007; last accessed Jul. 20, 2014.*

European Search Report for European Patent Application No. EP 09002450 dated Jul. 20, 2009.

First Examiner's Report from the Canadian Patent Office for Canadian Patent Application No. 2,652,734 dated Mar. 7, 2012.

United States Patent and Trademark non-final Office Action dated Feb. 17, 2012 for co-pending U.S. Appl. No. 12/707,464.

United States Patent and Trademark non-final Office Action dated Oct. 6, 2011 for co-pending U.S. Appl. No. 12/474,468.

United States Patent and Trademark non-final Office Action dated Apr. 12, 2012 for co-pending U.S. Appl. No. 12/474,457.

United States Patent and Trademark non-final Office Action dated Mar. 29, 2012 for co-pending U.S. Appl. No. 12/491,321.

Notification of Third Office Action, the State Intellectual Property Office of The People's Republic of China, Application No. 200910007397.6, 12.08.2013, 9 pages.

English Translation of the Abstract and portions of "Research on and Implementation of QA Technique based on Forum Data Source," Chinese Master Thesis, Luo Bin, Beijing Jiaotong University, Dec. 31, 2007, 4 pages, http://www.doc88.com/p-643858895701.html.

"Research on and Implementation of QA Technique based on Forum Data Source," Chinese Master Thesis, Luo Bin, Beijing Jiaotong University, Dec. 31, 2007, 7 pages, http://wwwdoc88.com/p-643858895701.html.

United States Patent and Trademark Final Office Action dated Oct. 21, 2013 for co-pending U.S. Appl. No. 12/035,988.

Vbulletin (Distance), Advanced Report Post Management System, (Mar. 8, 2007) http://web.archive.org/web/20071019022335/http://www.vbulletin.org/forum/showthread.php?t=137031, pp. 1-10.

phpBB Academy at Star Trek Guide—EXreaction, Soft Delete (Sep. 2007) http://startrekguide.com/community/viewtopic.php?f=848a=3409. , pp. 1-9.

RCGroups, Warning Types (Oct. 13, 2007) http://web.archive.org/web/20071013080645/http//www.rcgroups.com/forum/wlist.php , pp. 1-4.

Non-Final Rejection dated Apr. 4, 2014 issued in co-pending U.S. Appl. No. 12/035,988.

* cited by examiner

FIG. 10

Home | Dashboard | Administrator

Recent Activity | My Vine | myProfile

Feedback  Refresh  Logout

Recent Activity

Today:
- A grape, Brown Bag Technology, was voted up
- A new grape, Rotate Button in Upper Corner, was posted by brian.h.richards
- A grape, Software Design Patterns, was voted up
- A grape, Time Estimating, was voted up
- A grape, Grapevine Determines Experts, was voted down
- A grape, Admin Loads Experts Names, was voted up
- A grape, Expert contributions, was voted down
- A grape, Fix the seed view, was voted down
- A grape, SMB, was voted down
- A grape, Repeated Project Tasks, was voted up
- A grape, Talking to Clients...Sooner, was voted up
- A grape, Jeans on Friday, was voted up
- A grape, dress downs as rewards, was voted up
- A grape, Admin Loads Experts Names, was voted up
- A grape, Grapevine Determines Experts, was voted down

Recent Seeds

| Title | Age (Days) |
|---|---|
| TechLabs Training | 2 |
| Improve the Grapevine (Archive) | 3 |
| Grapevine Notables | 8 |
| OLPCs as an ultra-mobile laptap | 8 |
| OLPCs for Advancing Education | 8 |
| Name the Innovation Program! | 10 |

Recent Grapes

| Title | Age |
|---|---|
| Profile Travel Habits | 0 |
| Rotate Button in Upper Corner | 0 |
| Grapevine Determines Experts | 1 |
| Admin Loads Experts Names | 1 |
| Fix the seed view | 1 |
| Good balance so far | 1 |

SYSTEM FOR DISPLAYING A PLURALITY OF ASSOCIATED ITEMS IN A COLLABORATIVE ENVIRONMENT

CROSS-REFERENCE TO RELATED APPLICATIONS

This application is a continuation-in-part of U.S. patent application Ser. No. 12/036,012, filed on Feb. 22, 2008, which is incorporated by reference herein.

TECHNICAL FIELD

The present description relates generally to a system and method, generally referred to as a system, for displaying a plurality of associated items in a collaborative environment, and more particularly, but not exclusively, to displaying a plurality of associated items in a collaborative environment such that items of high value are readily identifiable by a user.

BACKGROUND

Collaborative software may allow users to cooperatively build off an initial idea or topic. The topic may continually evolve as additional users provide insight to the topic; however, the collaborative software may only be capable of displaying linear revisions of the topic. For example, a collaborative software system may provide users with an interface for creating and expanding articles on topics. The interface may provide users with the most recent version of the article, and may allow the users to post modifications to the most recent version of the article. However, in some instances there may be topics where there is not one clear answer to a given question. There may be competing opinions to what the content of such an article should contain. It may be difficult for users to identify the opinions which are more valuable than others.

SUMMARY

A system for displaying a plurality of associated items in a collaborative environment may include a memory, an interface, and a processor. The memory may be connected to the processor and the interface and may store a plurality of items. Each item may be associated with at least one other item. The processor may provide a graphical representation of the plurality of items to a device of a user. Each item may be represented in the graphical representation by a shape and the associations between the items may be represented by lines between the shapes. The processor may receive a request to associate a first metric of the plurality of items with a size of each shape. The size of each shape may be based on a value of the first metric of each item represented by each shape. The processor may receive a request to associate a second metric of the plurality of items with a color of each shape. The color of each shape may be based on a value of the second metric of each item represented by each shape. The processor may transform the graphical representation of the plurality of items such that the size of each shape representing each item is based on the first value of the first metric of each item, and the color of each shape representing each item is based on the second value of the second metric of each item. The processor may provide the transformed graphical representation of the plurality of items to the device of the user.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 10 is a screenshot of a recent activity screen in the system of FIG. 1, or other systems for displaying a plurality of associated items in a collaborative environment.

DETAILED DESCRIPTION

A system and method, generally referred to as a system, may relate to displaying a plurality of associated items in a collaborative environment, and more particularly, but not exclusively, to displaying a plurality of associated items in a collaborative environment such that items of high value are readily identifiable by a user. The principles described herein may be embodied in many different forms.

The system may provide users of a collaborative environment with a graphical display of items which were innovated in the collaborative environment. The graphical display may display each item as a shape, such as a circle, and may display a line between each item and the item it was innovated from. The system may allow a user to associate a metric relating to the items to a graphical attribute of the shapes representing the items, such as the color of the shapes or the size of the shapes. The system may transform the graphical display such that the shapes are displayed in accordance with values of the metrics for each item. For example, the size of a shape may be larger if the item represented by the shape has a high value for the metric associated with size. Alternatively, the size of the shape may be smaller if the item represented by the shape has a low value for the metric. By associating metrics of the items with graphical attributes of the shapes, the system allows users to quickly and easily identify shapes representing high value items.

The system allows a user to move items, such as by disassociating an item from the item it was innovated from, and associating the item with another item. For example, the users may move an item if the item is not relevant to the initial item it was innovated from. Moving an item which is not relevant ensures the collaborative innovation is not sidetracked by irrelevant items. The system also allows a user to convert an innovated item into an initial item to be innovated from. Allowing users to convert an item into an initial item ensures high value items are properly innovated from in the collaborative environment.

The system may also provide a user with a graphical display of the items and an outline display of the items. The graphical display and the outline display may be synchronized such that actions the user performs in one display are reflected in the other display. For example if a user selects an item in the graphical display, the item is selected in the outline display. The graphical display may provide an overview of the items submitted in the collaborative environment, and the relationships between the items, while the outline display may provide detailed information on each item. By simultaneously providing both the graphical display and the outline display, the system allows the users to intuitively navigate through the items while simultaneously viewing detailed information about the items.

Figure 1:
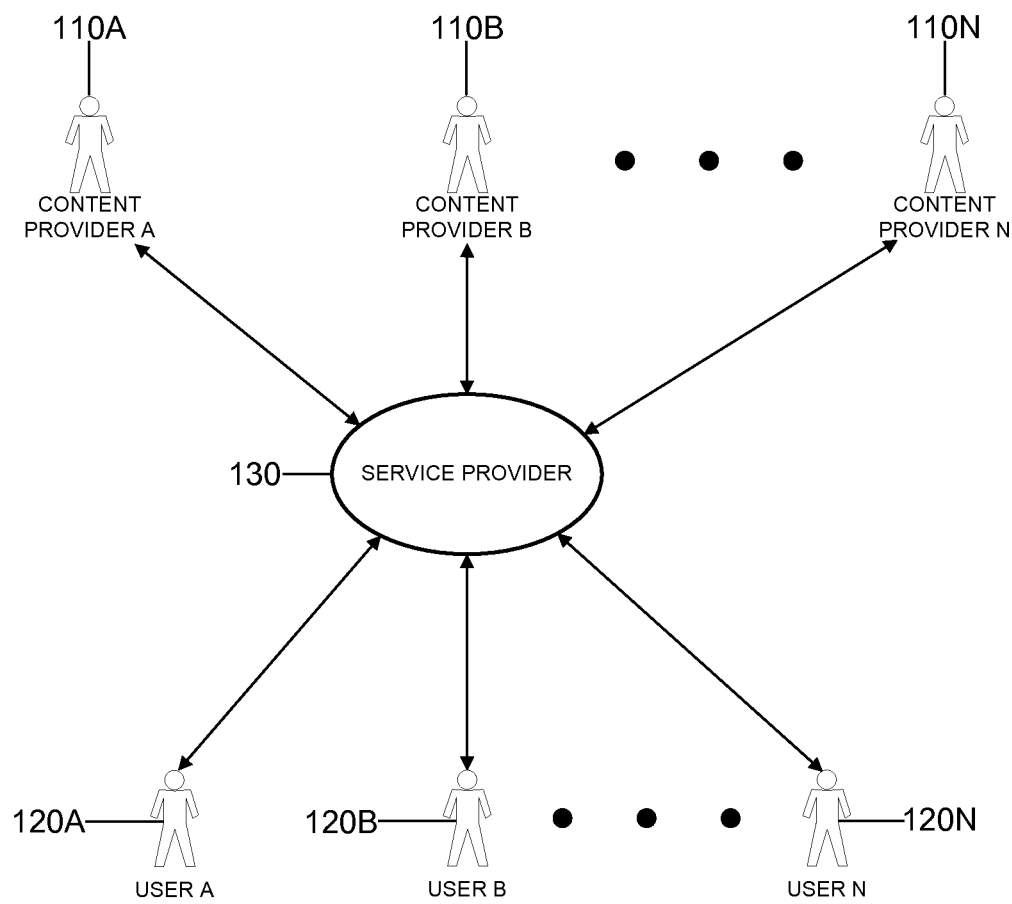
FIG. 1 is a block diagram of an overview of a system for displaying a plurality of associated items in a collaborative environment.

FIG. 1 provides an overview of a system 100 for displaying a plurality of associated items in a collaborative environment. Not all of the depicted components may be required, however, and some implementations may include additional components. Variations in the arrangement and type of the components may be made without departing from the spirit or scope of the claims as set forth herein. Additional, different or fewer components may be provided.

The system 100 may include one or more content providers 110A-N, such as stakeholders or decision making personnel of an organization, a service provider 130, such as a collaborative innovation interface provider, and one or more users 120A-N, such as employees of the organization, administrators of the system 100, or other parties authorized to use the service. The service provider 130 may provide an interface for collaborative innovation. Collaborative innovation may be the process of building and refining items, such as ideas, in a collaborative environment. The users 120A-N may provide items, such as ideas, innovations of provided items, rating of provided items, or generally any data that may assist the collaborative innovation process. The content providers 110A-N may provide initial items, or seed ideas, to begin the collaborative process and may review the results of the collaborative innovation process. Alternatively or in addition one or more of the users 120A-N may be authorized to provide initial items. One or more of the users 120A-N and/or the content providers 110A-N may be system administrators, also referred to as administrators.

In operation, the service provider 130 may provide the content providers 110A-N with an interface for identifying an initial item. The initial item may be a question whose answer is of value to one of the content providers 110A-N, such as the content provider A 110A. For example, an initial question may be "what activities would you like the social committee to sponsor?" Alternatively or in addition the initial item may be a statement of opinion or fact. The service provider 130 may provide the content provider A 110A with an interface for identifying which users 120A-N the initial item should be displayed to and/or which users 120A-N should be allowed to rate the item or enhance the item. An enhancement of an initial item may be referred to as a response, revision, primary response, a grape item, a grape idea, a grape, an item innovated from an initial item, or an item enhanced from an initial item. In the case of a primary response, an enhancement of a primary response may be referred to as a secondary response, and so on. The system 100 may allow the content provider A 110A to select one or more users 120A-N, or a group of users 120A-N.

Once an initial question has been created the service provider 130 may send a notification to the one or more users 120A-N that a new question is available, such as by emailing the users 120A-N. The service provider 130 may provide an interface displaying the initial items in the system 100 to the users 120A-N. The interface may allow the users 120A-N to filter the initial items based on one or more characteristics of the items. The users 120A-N may use the interface to select an initial item. The interface for viewing and filtering initial items may be discussed in more detail in FIGS. 4 and 4A below. If a user A 120A selects an initial item, the service provider 130 may provide the user A 120A with an interface displaying detailed information regarding the initial item. The interface displaying detailed initial item information is discussed in more detail in FIG. 5 below.

The service provider 130 may provide the users 120A-N with one or more interfaces for viewing the items, creating enhancements to the items, and commenting on and rating the items. The interface may display all of the items innovated from the initial item to the users 120A-N and may allow the users 120A-N to select and rate an item. In the system 100, the display of all the items innovated from the initial item may be referred to as the collaborative innovation view. The initial item and the items innovated from the initial item may be represented in the collaborative innovation view as a graphical hierarchical structure, such as a horizontal tree-like structure, referred to as a graphical representation of the items. The graphical representation may represent each item as a shape, such as a circle, a polygon, or any geometric shape, and may allow the users 120A-N to visually navigate, and rate, the items. Each item may be connected by a line to the item it was innovated from. The interface may further provide a list view, or outline representation, of the items, which allows the users 120A-N to search and sort the items based on one or more item characteristics, such as the title of the item. The interfaces for viewing, enhancing, and rating the items are discussed in more detail in FIGS. 6 and 6A-E below.

Figure 6:
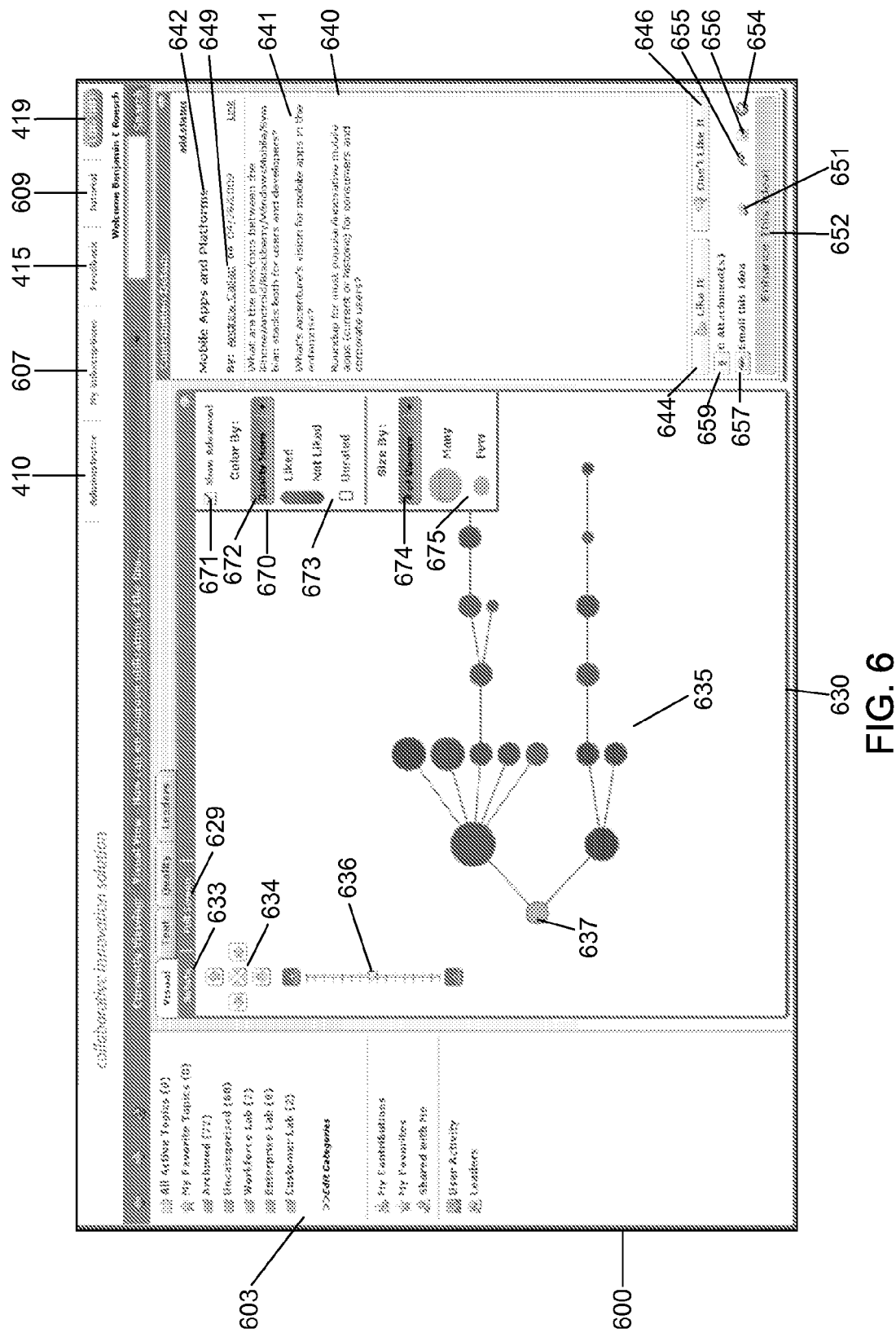
FIG. 6 is a screenshot of an initial item collaborative innovation interface in the system of FIG. 1, or other systems for displaying a plurality of associated items in a collaborative environment.

The interface for viewing the items may allow the users 120A-N to associate one or more metrics relating to the items with one or more graphical attributes of the shapes representing the items. The one or more metrics of the items may include the quality of the items as indicated by ratings of the items, the number of readers of the items, the age of the items, the status of the items, the number of times the items were shared with other users, the number of total votes (i.e. the sum of positive and negative votes) received for the item, the geographic location of the users who provided the items, or the department of the organization the users who provided the items belong to. The graphical attributes of the shapes may include the color of the shapes, the shading of the shapes, the size of the shapes, the outline of the shapes, the transparency of the shapes, the shadowing of the shapes, the dimension of the shapes, or generally any graphical attribute of the shapes. When a user A 120A associates one or more metrics to one or more graphical attributes, the service provider 130 may update the graphical representation such that the attributes of the shapes associated with metrics of the items are reflective of the values of metrics for the items. FIG. 6 below provides an example of an interface which allows users to associate metrics of the items with graphical attributes of the shapes. The steps associated with associating metrics of the items with graphical attributes of the shapes are discussed in more detail in FIG. 12 below.

The service provider 130 may also provide an interface which allows the users 120A-N to move items, such as by disassociating an item from the item it was innovated from, and associating the item with another item, or converting the item into an initial item to be innovated from. The users may select a shape representing an item in the graphical representation of the items and may select to move the item or convert the item to an initial item. The service provider 130 may update the graphical representation to reflect the moved or converted item. FIGS. 11A-F below provide examples of interfaces for moving or converting items. The steps associated with moving an item may be discussed in more detail in FIG. 14 below. The steps associated with converting an item to an initial item may be discussed in more detail in FIG. 15 below.

Once the period of time allocated to collaborating on an initial item has expired, the service provider 130 may notify the content provider A 110A that the collaborative innovation process has completed. The service provider 130 may provide the content provider A 110A and/or the users 120A-N with an interface for viewing the results of the collaborative innovation process. The results may be displayed as an ordered list of items generated by the users 120A-N during the innovation process. The items may be ordered based on the ratings the items received from the users 120A-N. The service provider 130 may provide the content provider A 110A with an interface for filtering the results based on one or more characteristics of the users 120A-N who rated the items. In the system 100 the items receiving the highest ratings may be referred to as wine items, wine ideas, or simply wine. The interface for viewing collaborative innovation results is discussed in more detail in FIGS. 7 and 7A below.

The service provider 130 may provide the users 120A-N with an interface for viewing a summary of their activity with the service provider 130. The summary may include one or more graphs displaying the activity of the users 120A-N, such as a pie graph, a bar graph, or generally any graph capable of reporting the activity of the users 120A-N. The interface may also allow the users 120A-N to view or modify their user profile. The interface for providing user activity data is discussed in more detail in FIGS. 8 and 8A below.

The service provider 130 may provide an administrator interface to authorized content providers 110A-N and or users 120A-N, such as the content provider A 110A. The administrator interface may allow the content provider A 110A to add and/or remove users 120A-N and set the permissions of users 120A-N. The permissions may include creating initial items, creating follow-up items, rating items, viewing items, or generally any permission that may be set in the system 100. The administrator interface is discussed in more detail in FIG. 9 and FIG. 9A below.

Figure 2:
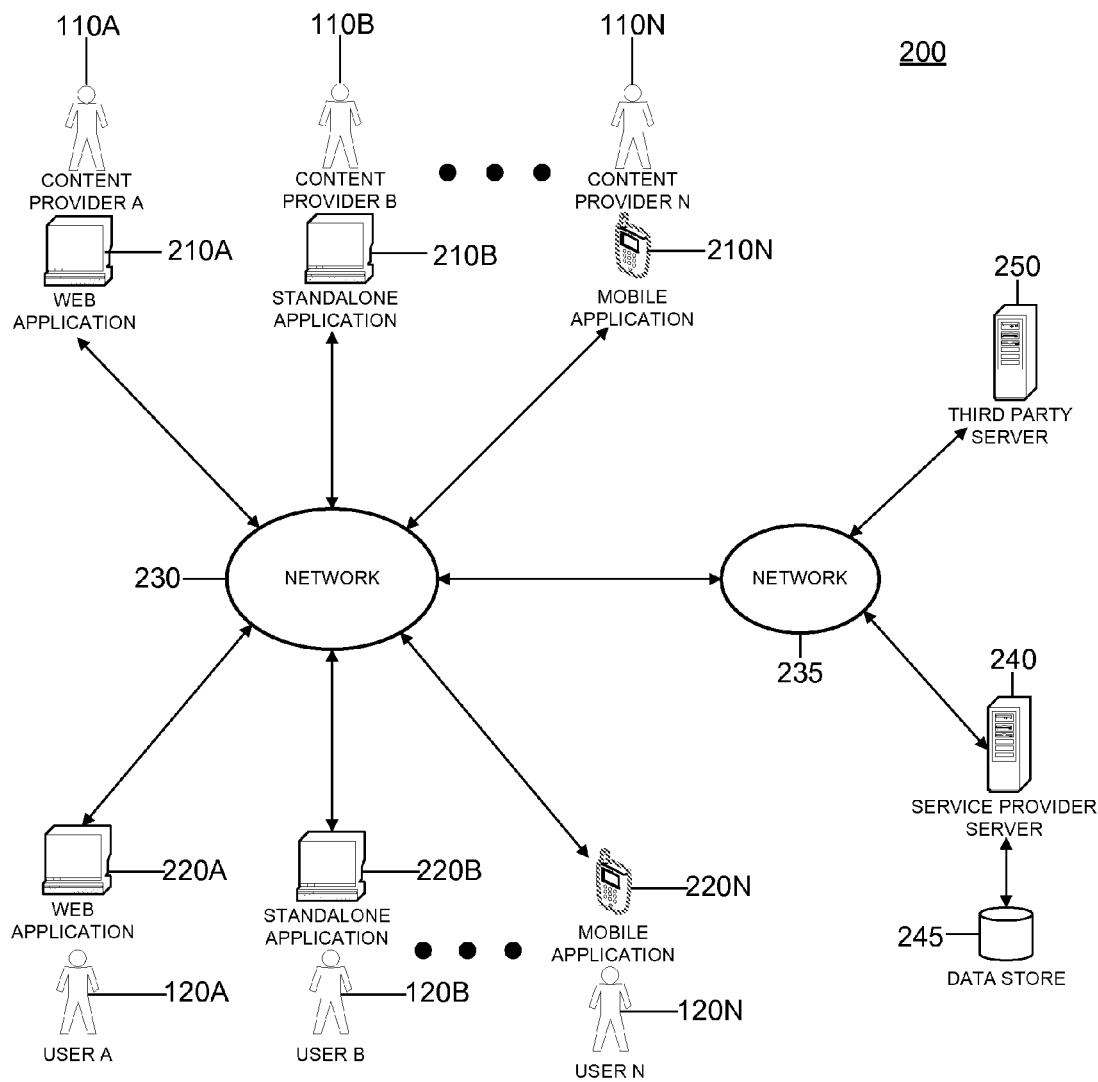
FIG. 2 is a block diagram of a network environment implementing the system of FIG. 1 or other systems for displaying a plurality of associated items in a collaborative environment.

FIG. 2 provides a simplified view of a network environment 200 implementing the system of FIG. 1 or other systems for displaying a plurality of associated items in a collaborative environment. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The network environment 200 may include one or more web applications, standalone applications and mobile applications 210A-N, which may be client applications of the content providers 110A-N. The system 200 may also include one or more web applications, standalone applications, mobile applications 220A-N, which may be client applications of the users 120A-N. The web applications, standalone applications and mobile applications 210A-N, 220A-N, may collectively be referred to as client applications 210A-N, 220A-N. The system 200 may also include a network 230, a network 235, the service provider server 240, a data store 245, and a third party server 250.

Some or all of the service provider server 240, and third-party server 250 may be in communication with each other by way of network 235. The third-party server 250 and service provider server 240 may each represent multiple linked computing devices. Multiple distinct third party servers, such as the third-party server 250, may be included in the network environment 200. A portion or all of the third-party server 250 may be a part of the service provider server 240.

The data store 245 may be operative to store data, such as user information, data relating to items, or ratings of items of the users 120A-N. The data store 245 may include one or more relational databases or other data stores that may be managed using various known database management techniques, such as, for example, SQL and object-based techniques. Alternatively or in addition the data store 245 may be implemented using one or more of magnetic, optical, solid state or tape drives. The data store 245 may be in direct communication with the service provider server 240. Alternatively or in addition the data store 245 may be in communication with the service provider server 240 through the network 235.

The networks 230, 235 may include wide area networks (WAN), such as the internet, local area networks (LAN), campus area networks, metropolitan area networks, or any other networks that may allow for data communication. The network 230 may include the Internet and may include all or part of network 235; network 235 may include all or part of network 230. The networks 230, 235 may be divided into sub-networks. The sub-networks may allow access to all of the other components connected to the networks 230, 235 in the system 200, or the sub-networks may restrict access between the components connected to the networks 230, 235. The network 235 may be regarded as a public or private network connection and may include, for example, a virtual private network implementing encryption or other security mechanisms employed over the public Internet, or the like.

The content providers 110A-N may use a web application 210A, standalone application 210B, or a mobile application 210N, or any combination thereof, to communicate to the service provider server 240, such as via the networks 230, 235. Similarly, the users 120A-N may use a web application 220A, a standalone application 220B, or a mobile application 220N to communicate to the service provider server 240, via the networks 230, 235.

The service provider server 240 may provide user interfaces to the content providers 110A-N via the networks 230, 235, through the web applications, standalone applications or mobile applications 210A-N. The service provider server 240 may also provide user interfaces to the users 120A-N via the networks 230, 235, through the web applications, standalone applications or mobile applications 220A-N. The user interfaces may be designed using ADOBE FLEX. The user interfaces may be initially downloaded when the applications 210A-N, 220A-N first communicate with the service provider server 240. The client applications 210A-N, 220A-N may download all of the code necessary to implement the user interfaces, but none of the actual data. The data may be downloaded from the service provider server 240 as needed.

The user interface may be developed using the singleton development pattern, utilizing the model locator found within the cairngorm framework. Within the singleton pattern there may be several data structures each with a corresponding data access object. The data structures may be structured to receive the information from the service provider server 240.

The web applications, standalone applications and mobile applications 210A-N, 220A-N may run on a device connected to the network 230 in any configuration that supports data transfer. This may include a data connection to the network 230 that may be wired or wireless. Any of the web applications, standalone applications and mobile applications 210A-N, 220A-N may individually be referred to as a client application. The web applications 210A, 220A may run on any platform that supports web content, such as a web browser or a computer, a mobile phone, personal digital assistant (PDA), pager, network-enabled television, digital video recorder, such as TIVO®, automobile and/or any appliance capable of data communications.

The standalone applications 210B, 220B may run on a machine that may have a processor, memory, a display, a user interface and a communication interface. The processor may be operatively connected to the memory, display and the interfaces and may perform tasks at the request of the standalone applications 210B, 220B or the underlying operating system. The memory may be capable of storing data. The display may be operatively connected to the memory and the processor and may be capable of displaying information to the content provider B 110B or the user B 120B. The user interface may be operatively connected to the memory, the processor, and the display and may be capable of interacting with a user B 120B or a content provider B 110B. The communication interface may be operatively connected to the memory, and the processor, and may be capable of communicating through the networks 230, 235 with the service provider server 240, and the third party server 250. The standalone applications 210B, 220B may be programmed in any programming language that supports communication protocols. These languages may include: SUN JAVA®, C++, C#, ASP, SUN JAVASCRIPT®, asynchronous SUN JAVASCRIPT®, or ADOBE FLASH ACTIONSCRIPT®, ADOBE FLEX, and PHP, amongst others.

The mobile applications 210N, 220N may run on any mobile device that may have a data connection. The data connection may be a cellular connection, a wireless data connection, an internet connection, an infra-red connection, a Bluetooth connection, or any other connection capable of transmitting data.

The service provider server 240 may include one or more of the following: an application server, a data store, such as the data store 245, a database server, and a middleware server. The application server may be a dynamic HTML server, such as using ASP, JSP, PHP, or other technologies. The service provider server 240 may co-exist on one machine or may be running in a distributed configuration on one or more machines. The service provider server 240 may collectively be referred to as the server. The service provider server 240 may implement a server side Wiki engine, such as ATLASSIAN CONFLUENCE. The service provider server 240 may receive requests from the users 120A-N and the content providers 110A-N and may provide data to the users 120A-N and the content providers 110A-N based on their requests. The service provider server 240 may communicate with the client applications 210A-N, 220A-N using extensible markup language (XML) messages.

The third party server 250 may include one or more of the following: an application server, a data source, such as a database server, and a middleware server. The third party server may implement any third party application that may be used in a collaborative innovation system, such as a user verification system. The third party server 250 may co-exist on one machine or may be running in a distributed configuration on one or more machines. The third party server 250 may receive requests from the users 120A-N and the content providers 110A-N and may provide data to the users 120A-N and the content providers 110A-N based on their requests.

Figure 20:
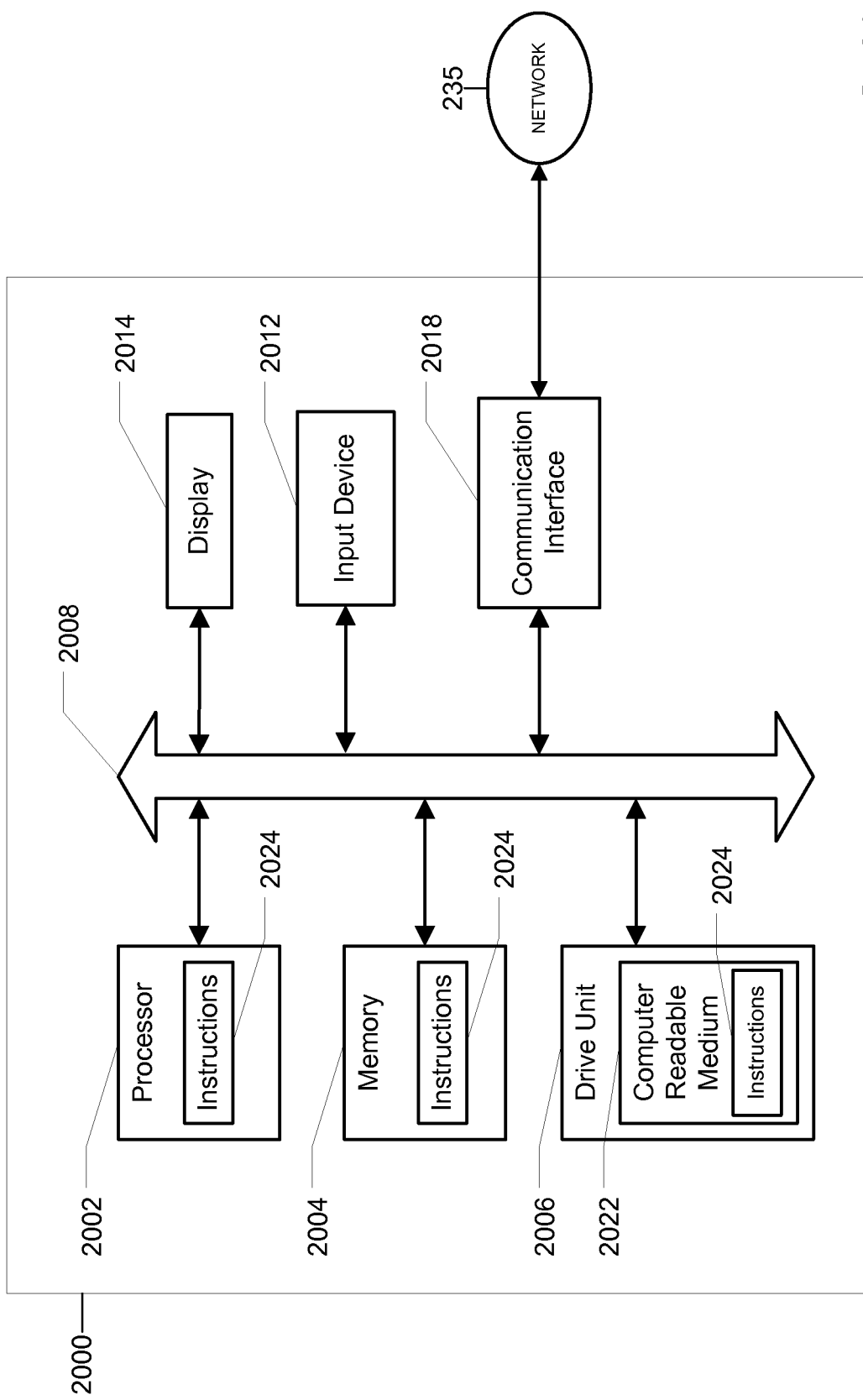
FIG. 20 is an illustration of a computer system that may be used in the systems of FIG. 2, or other systems for displaying a plurality of associated items in a collaborative environment.

The service provider server 240 and the third party server 250 may be one or more computing devices of various kinds, such as the computing device in FIG. 20. Such computing devices may generally include any device that may be configured to perform computation and that may be capable of sending and receiving data communications by way of one or more wired and/or wireless communication interfaces. Such devices may be configured to communicate in accordance with any of a variety of network protocols, including but not limited to protocols within the Transmission Control Protocol/Internet Protocol (TCP/IP) protocol suite. For example, the web applications 210A, 210A may employ HTTP to request information, such as a web page, from a web server, which may be a process executing on the service provider server 240 or the third-party server 250.

There may be several configurations of database servers, such as the data store 245, application servers, and middleware servers included in the service provider server 240, or the third party server 250. Database servers may include MICROSOFT SQL SERVER®, ORACLE®, IBM DB2® or any other database software, relational or otherwise. The application server may be APACHE TOMCAT®, MICROSOFT IIS®, ADOBE COLDFUSION®, or any other application server that supports communication protocols. The middleware server may be any middleware that connects software components or applications.

The networks 230, 235 may be configured to couple one computing device to another computing device to enable communication of data between the devices. The networks 230, 235 may generally be enabled to employ any form of machine-readable media for communicating information from one device to another. Each of networks 230, 235 may include one or more of a wireless network, a wired network, a local area network (LAN), a wide area network (WAN), a direct connection such as through a Universal Serial Bus (USB) port, and the like, and may include the set of interconnected networks that make up the Internet. The networks 230, 235 may include any communication method by which information may travel between computing devices.

In operation, the client applications 210A-N, 220A-N may make requests back to the service provider server 240. The service provider server 240 may access the data store 245 and retrieve information in accordance with each request. The information may be formatted as XML and communicated to the client applications 210A-N, 220A-N. The client applications 210A-N, 220A-N may display the XML appropriately to the users 120A-N, and/or the content providers 110A-N.

Figure 3:
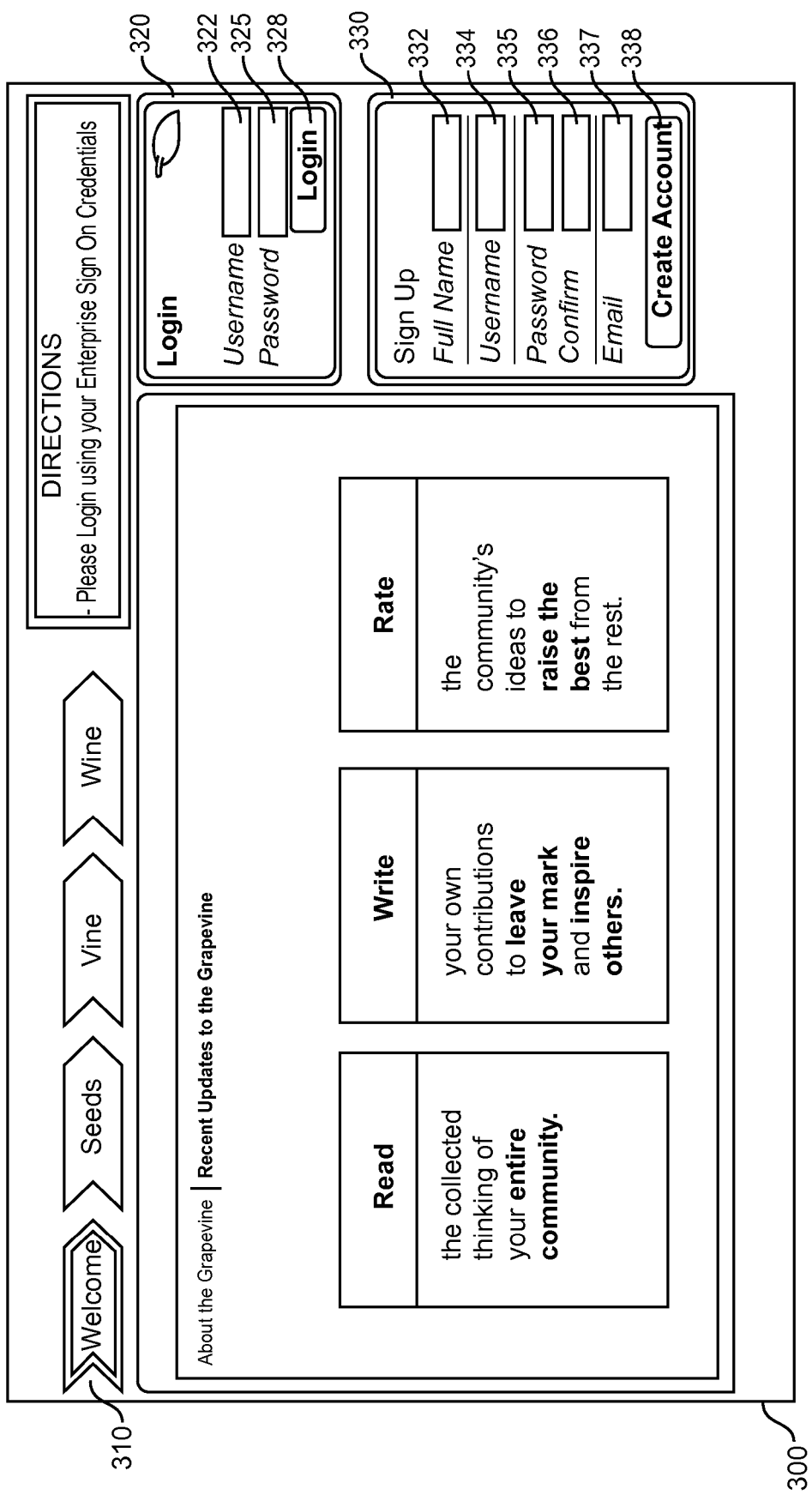
FIG. 3 is a screenshot of a user login interface in the system of FIG. 1, or other systems for displaying a plurality of associated items in a collaborative environment.

FIG. 3 is a screenshot of a user login interface 300 in the system of FIG. 1, or other systems for displaying a plurality of associated items in a collaborative environment. The system 100 may display the user login interface 300 to the user A 120A when the user A 120A first interacts with the system 100. The user A 120A may use the user login interface 300 to log into the system 100, or create a new account to access the system 100.

The user login interface 300 may include a navigation bar 310, a login subsection 320, and a sign up subsection 330. The login subsection 320 may include a username field 322, a password field 325, and a login button 328. The sign up subsection 330 may include a full name field 332, a username field 334, a password field 335, a confirm password field 336, an email field 337, and a create account button 338.

In operation the user A 120A may enter their username in the username field 322 and their password in the password field 325. The user A 120A may then click on the login button 328 to login into the system 100. If the user A 120A does not already have an account the user A 120A may fill in the fields in the sign up subsection 330, and click on the create account button 338, to create a new account. The user A 120A may be granted immediate access to the system 100, or an administrator and/or one of the content providers 110A-N may need to approve of the user A 120A before the user A 120A is granted access to the system. In this instance the system 100 may notify the user A 120A when they have been granted access, such as an email notification. The navigation bar 310 displays the current screen the user A 120A is viewing. Alternatively or in addition there may be multiple user login interfaces 300. In this instance the system 100 may display a different user login interface 300 depending upon whether the user A 120A is an internal user of an organization or is a client of the organization.

Figure 3A:
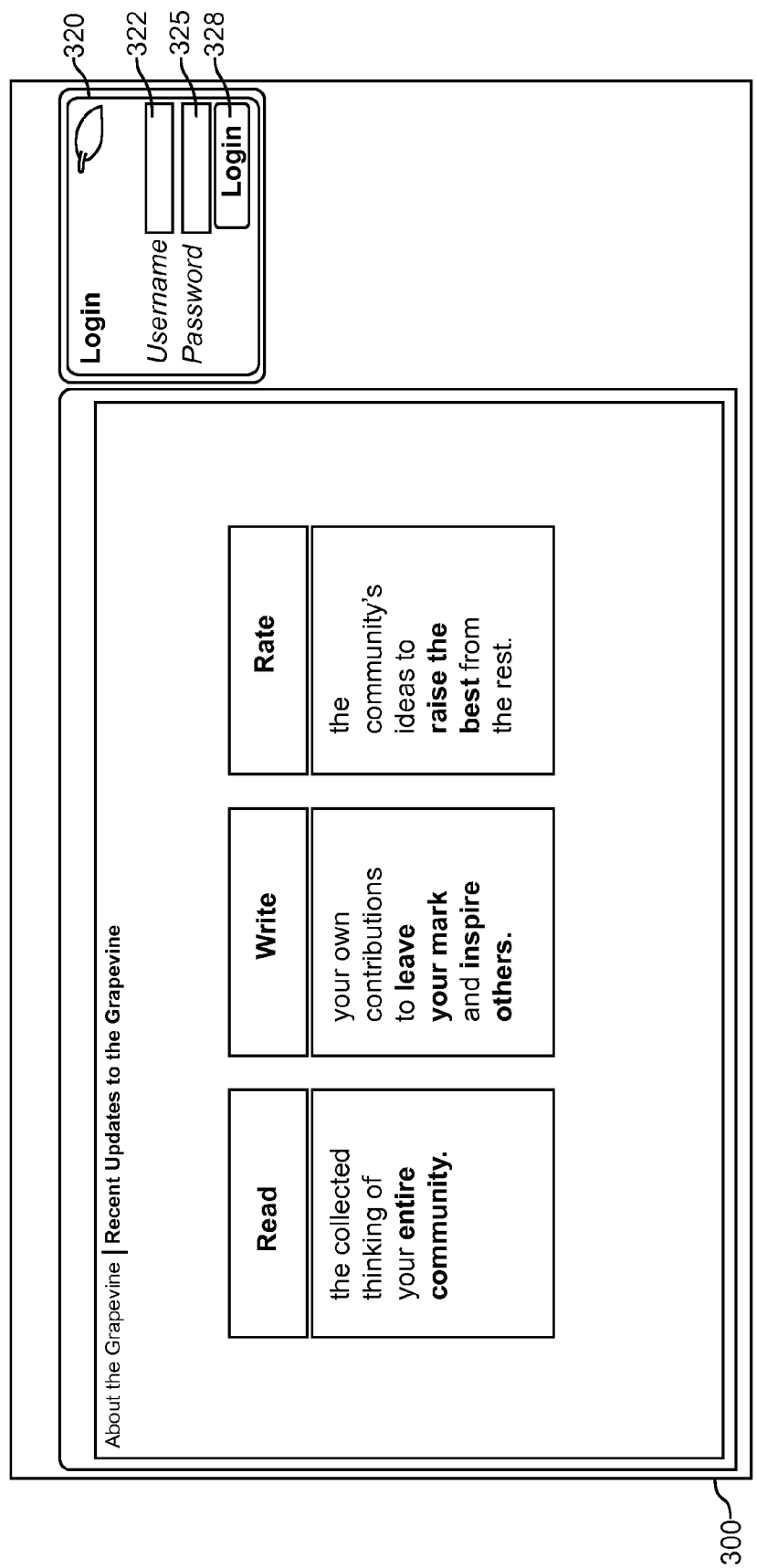
FIG. 3A is a screenshot of an alternative user login interface in the system of FIG. 1, or other systems for displaying a plurality of associated items in a collaborative environment.

FIG. 3A is a screenshot of an alternative user login interface 300 in the system of FIG. 1, or other systems for displaying a plurality of associated items in a collaborative environment. The system 100 may display the alternative user login interface 300 to the user A 120A when the user A 120A first interacts with the system 100. The user A 120A may use the alternative user login interface 300 to log into the system 100.

The alternative user login interface 300 may include a login subsection 320. The login subsection 320 may include a username field 322, a password field 325, and a login button 328. In operation the user A 120A may enter their username in the username field 322 and their password in the password field 325. The user A 120A may then click on the login button 328 to login into the system 100.

Figure 4:
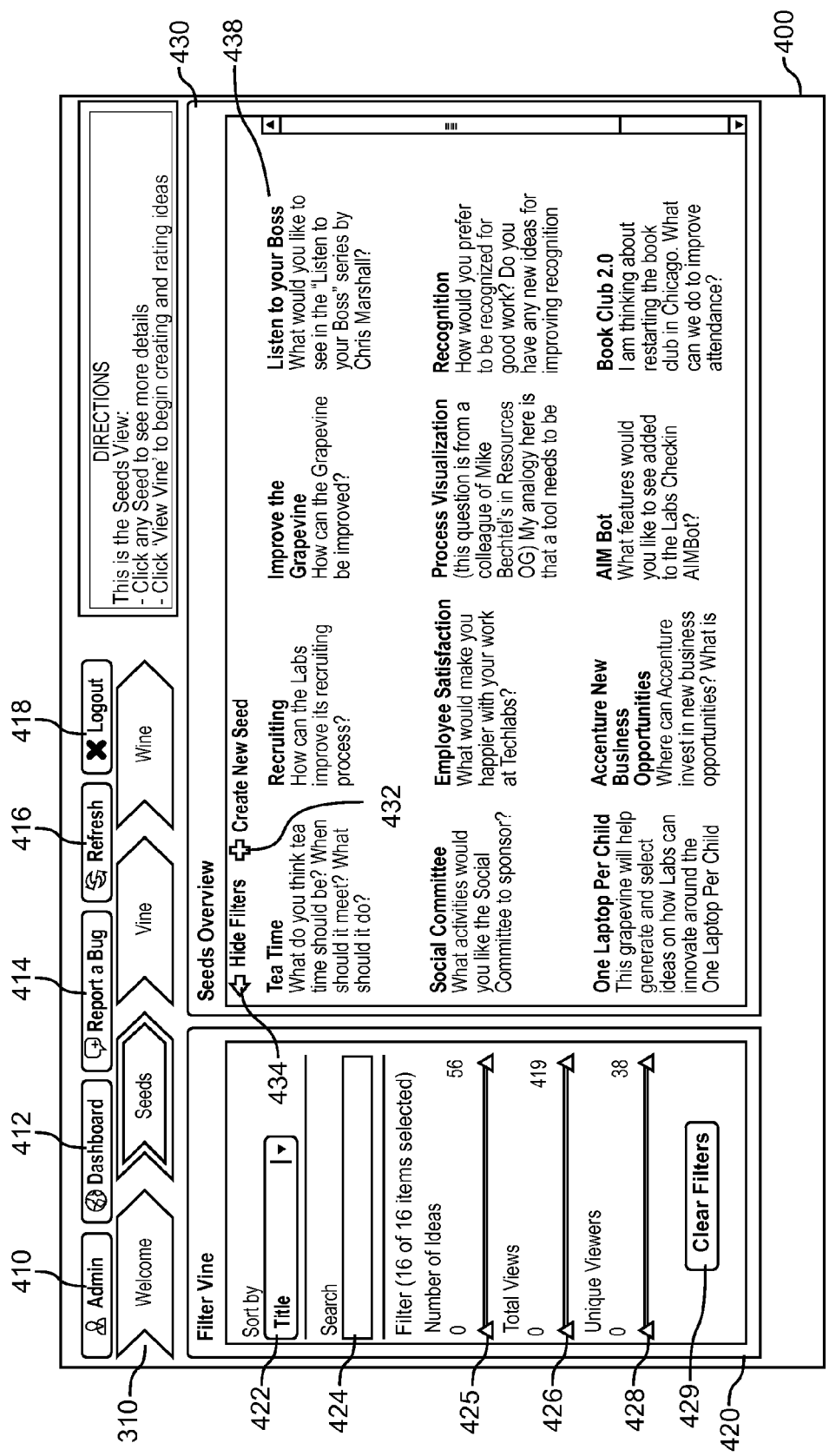
FIG. 4 is a screenshot of an initial item selection interface in the system of FIG. 1, or other systems for displaying a plurality of associated items in a collaborative environment.

FIG. 4 is a screenshot of an initial item selection interface 400 in the system of FIG. 1, or other systems for displaying a plurality of associated items in a collaborative environment. The system 100 may display the initial item selection interface 400 to the user A 120A after the user A 120A logs into the system 100. The user A 120A may use the initial item selection interface 400 to search, filter, and select one or more of the initial items.

The initial item selection interface 400 may include a navigation bar 310, an admin button 410, a dashboard button 412, a report a bug button 414, a search button 416, a logout button 418, a filter subsection 420 and an initial item subsection 430. The filter subsection 420 may include a sort by selector 422, a search field 424, a number of items filter 425, a total views filter 426, a unique viewers filter 428 and a clear filters button 429. The initial item subsection 430 may include a create new initial item button 432, a hide filters button 434, and initial items 438.

In operation, the user A 120A may click on the admin button 410 to view the admin interface. The user A 120A may need certain permissions to access the admin interface. The admin interface is discussed in more detail in FIGS. 9 and 9A below. The user A 120A may click on the dashboard button 412 to view the dashboard interface. The dashboard interface is described in more detail in FIGS. 8 and 8A below. The user A 120A may click on the refresh button 416 to refresh the data displayed in the initial item selection interface 400. The user A 120A may click on the logout button 418 to log out of the system 100.

The user A 120A may use the filter subsection 420 to sort and/or filter the initial items 438. The sort by selector 422 may be used to sort by one or more characteristics of the initial items 438, such as the title, creator, creation date, and number of grape items of the initial items 438. The search field 424 may be used to search the initial items 438. The filters 425, 426, 428, may be used to filter the initial items 438. The clear filters button 429 may be used to reset the filters 425, 426, 428.

The user A 120A may view one or more initial items 438 in the initial item subsection 430. The user A 120A may hide the filter subsection 420 by clicking on the hide filters button 434. The user A 120A may create a new initial item by clicking on the create new initial item button 432. The user A 120A may be required to have certain permissions in order to create a new initial item. The user A 120A may click on one of the initial items 438 to view detailed information about the initial item. The detailed information screen is discussed in more detail in FIG. 5 below.

Alternatively or in addition the initial item selection interface 400 may allow a user A 120A to flag an initial item for potential removal by an administrator. The administrator may review the initial item and determine whether to remove the initial item. There may be two types of initial item creation modes, a crowd controlled mode, where any of the users 120A-N can create an initial item, and a managed mode, where only administrator users can create an initial item.

Figure 4A:
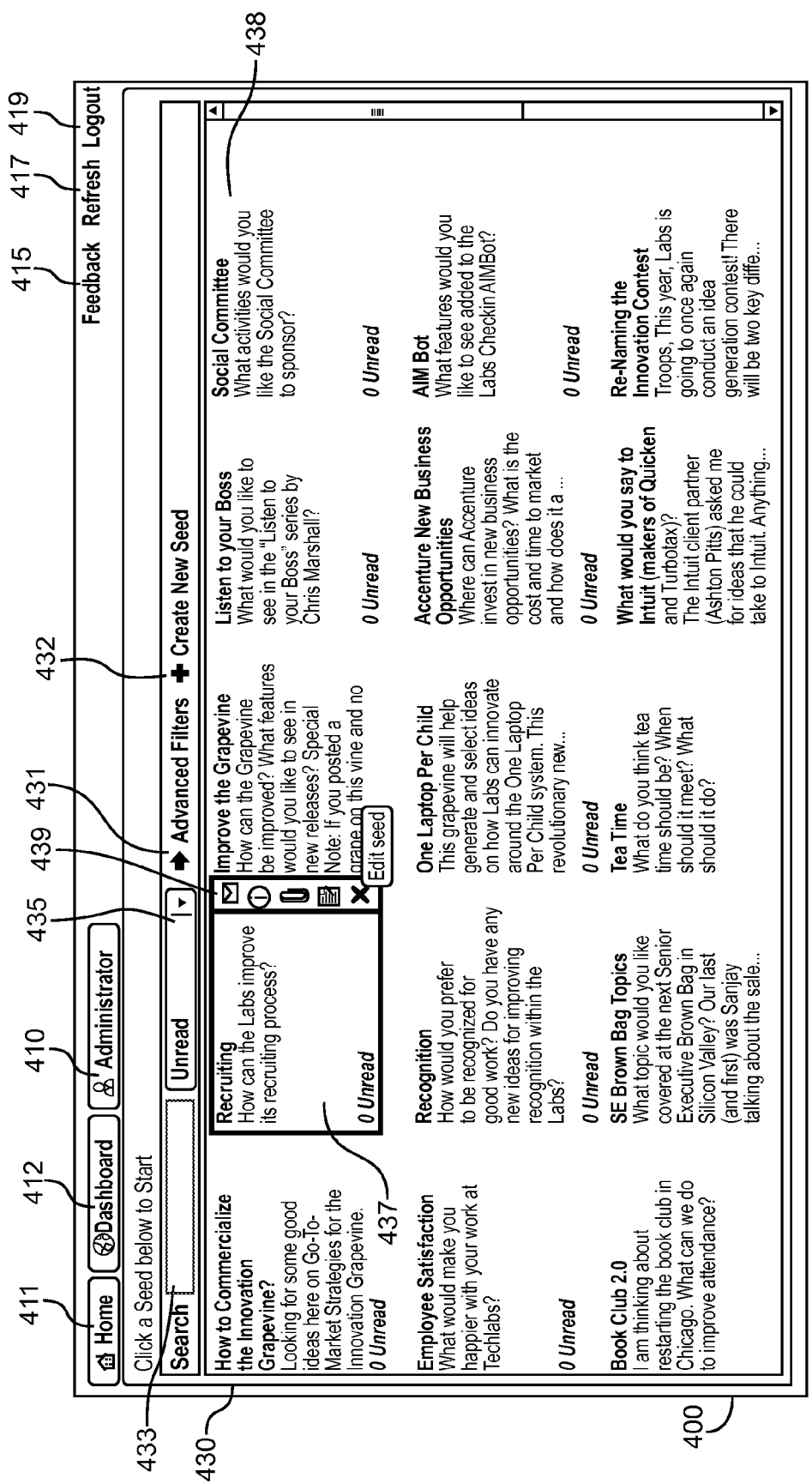
FIG. 4A is a screenshot of an alternative initial item selection interface in the system of FIG. 1, or other systems for displaying a plurality of associated items in a collaborative environment.

FIG. 4A is a screenshot of an alternative initial item selection interface 400 in the system of FIG. 1, or other systems for displaying a plurality of associated items in a collaborative environment. The system 100 may display the alternative initial item selection interface 400 to the user A 120A after the user A 120A logs into the system 100. The user A 120A may use the alternative initial item selection interface 400 to search, filter, and select one or more of the initial items.

The initial item selection interface 400 may include an admin button 410, a dashboard button 412, a home button 411, a feedback link 415, a refresh link 417, a logout link 419, and an initial item subsection 430. The initial item subsection 430 may include an advanced filters button 431, a create new initial item button 432, a search field 433, a search dropdown box 435, a selected initial item 437, an initial item action buttons 439, and initial items 438.

In operation, the user A 120A may click on the admin button 410 to view the admin interface. The user A 120A may need certain permissions to access the admin interface. The admin interface is described in more detail in FIGS. 9 and 9A below. The user A 120A may click on the dashboard button 412 to view the dashboard interface. The dashboard interface is described in more detail in FIGS. 8 and 8A below. The user A 120A may click on the refresh link 417 to refresh the data displayed in the initial item selection interface 400. The user A 120A may click on the logout button 418 to log out of the system 100. The user A 120A may click on the feedback link 415 to provide feedback on the system 100, such as to an administrator. The home button 411 may return the user to the user login interface 300. Alternatively or in addition the user A 120A may specify any screen or interface in the system 100 as a home screen. When the user A 120A clicks on the home button 411 the user A 120A may be displayed the specified home screen.

The user A 120A may view one or more initial items 438 in the initial item subsection 430. The user A 120A may view advanced filters, such as the filters in the filter subsection 420, by clicking on the advanced filters button 431. The user A 120A may create a new initial item by clicking on the create new initial item button 432. The user A 120A may be required to have certain permissions in order to create a new initial item. The user A 120A may click on one of the initial items 438 to select an initial item and/or view detailed information about the initial item. The detailed information screen is discussed in more detail in FIG. 5 below.

The selected item 437 may be an item selected by the user A 120A. When the user A 120A selects an item the user A 120A may use the selected item action buttons 439 to perform actions on the selected item 437. The actions may include emailing the item, receiving additional information on the item, attaching an item, such as a file, to the item, editing the item and deleting the item. If the user A 120A selects to edit the selected item 437 the user A 120A may be taken to the detailed information screen of FIG. 5.

The user A 120A may use the search field 433 to search for initial items. The user A 120A may use the search dropdown box 435 to filter the items searched, such as by only searching the unread items.

Figure 5:
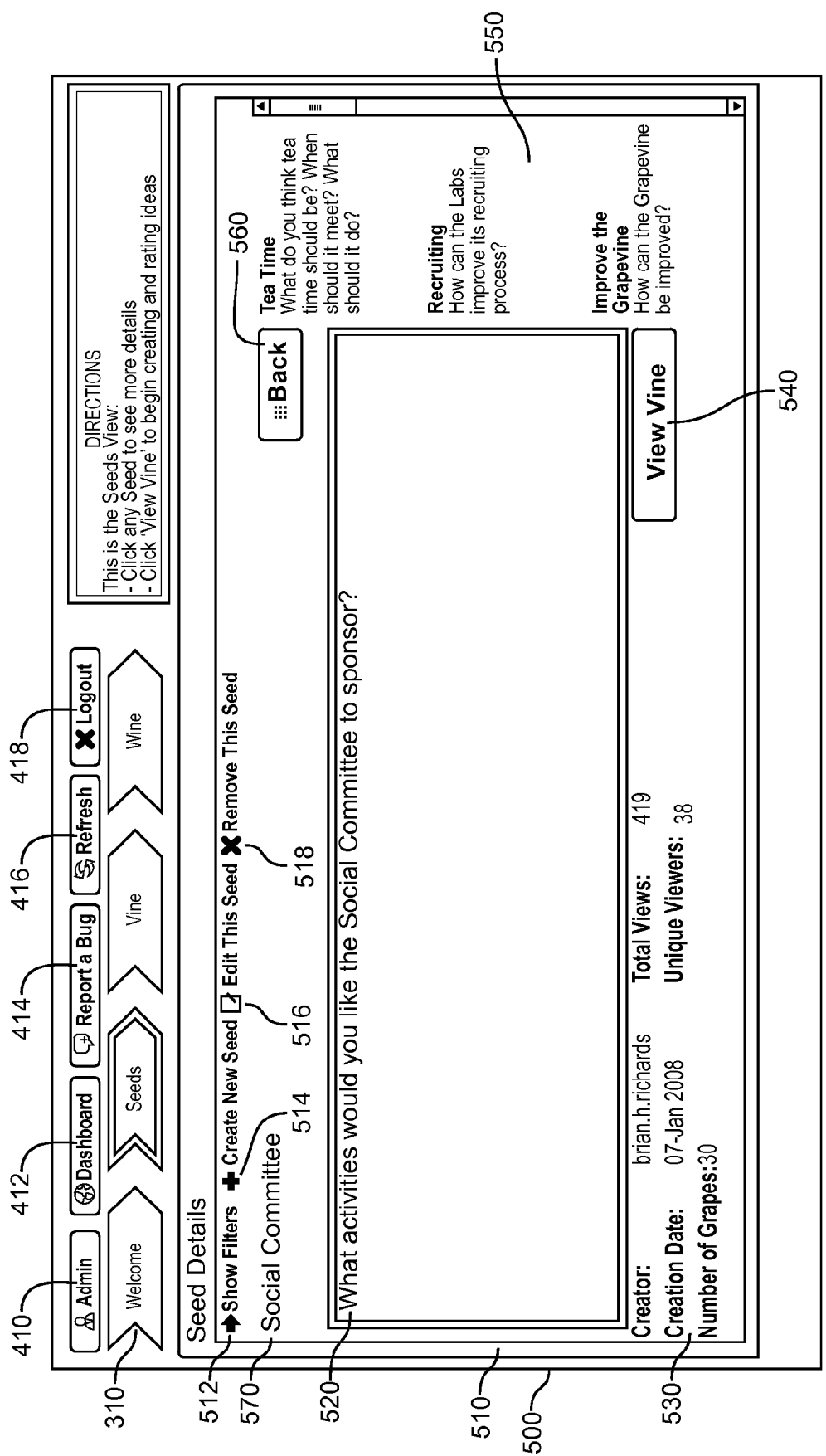
FIG. 5 is a screenshot of an initial item details screen in the system of FIG. 1, or other systems for displaying a plurality of associated items in a collaborative environment.

FIG. 5 is a screenshot of an initial item details screen 500 in the system of FIG. 1, or other systems for displaying a plurality of associated items in a collaborative environment. The system 100 may display the initial items details screen 500 to the user A 120A when the user A 120A clicks on one of the initial items 438 in the initial item subsection 430 of the initial item selection interface 400 in FIG. 4. The user A 120A may use the initial item details screen 500 to view detailed information regarding the selected initial item.

The initial item details screen 500 may include a navigation bar 310, an admin button 410, a dashboard button 412, a report a bug button 414, a refresh button 416, a logout button 418, an initial item details subsection 510, an initial item 520, an initial item information subsection 530, a view vine button 540, an additional initial items subsection 550, a back button 560, and an initial item title 570. The initial item details subsection 510 may include a show filters button 512, a create new initial item button 514, an edit this initial item button 516, and a remove this initial item button 518.

In operation the user A 120A may view detailed information about the initial item in the initial item information subsection 530. The detailed information may include the creator of the initial item, the creation date of the initial item, the number of items innovated from the initial item, the total number of views of the initial item and the number of unique viewers of the initial item. The user A 120A may use the show filters button 512 to view the current filter settings. The user A 120A may use the create new initial item button 514 to create a new initial item. The initial item may be edited with the edit this initial item button 516 and removed with the remove this initial item button 518. The system 100 may require that the user A 120A have the appropriate permissions in order to add, edit, archive, or delete an initial item. The user A 120A may view the details of another initial item by clicking on an initial item in the additional initial items subsection 550. The user A 120A may click on the back button 560 to return to the initial item selection interface 400 as discussed in FIG. 4. The user A 120A may click on the view vine button 540 to view the items innovated from the initial item in the initial item collaborative innovation interface 600 discussed in more detail in FIGS. 6 and 6A-C below.

FIG. 6 is a screenshot of an initial item collaborative innovation interface 600 in the system of FIG. 1, or other systems for displaying a plurality of associated items in a collaborative environment. The system 100 may display the initial item collaborative innovation interface 600 to the user A 120A when the user A 120A clicks on the view vine button 540 in the initial item details screen 500, as discussed in FIG. 5. The user A 120A may use the initial item collaborative innovation interface 600 to view, add, and rate items that have been innovated from the initial item. The initial item collaborative innovation interface 600 may display a graphical representation of the items, such as in the form of a hierarchical structure.

The initial item collaborative innovation interface 600 may include an admin button 410, a my subscriptions link 607, a feedback link 415, a tutorial link 609, a logout link 419, a navigation section 603, a collaborative display subsection 630, and an item display subsection 640. The collaborative display subsection 630 may include a display modifier 634, a rotate button 633, a zoom bar 636, a full screen button 629, a graphical representation 635 of the items, a selected shape 637, and a shape modification section 670. The shape modification section 670 may include a show advanced checkbox 671, a color metric selector 672, a color legend 673, a size metric selector 674, and a size legend 675. The item display subsection 640 may include an item title field 642, a user identifier field 649, an item content field 641, a like button 644, a don't like button 646, an enhance button 652, an add favorite button 651, a move/convert button 655, an edit button 656, an add attachment button 659, an email button 657, and a delete button 654.

In operation, the user A 120A may view the graphical representation 635 of the items innovated from an initial item in the collaborative display subsection 630. The graphical representation 635 may provide a visual depiction of the collaborative innovation process by representing each item as a shape, such as a circle. The user A 120A may navigate the graphical representation 635 using the display modifier 634. The user A 120A may zoom in and out of the graphical representation 635 using the zoom bar 636. The user A 120A may rotate the graphical representation 635 using the rotate button 633. The user A 120A may view the graphical representation 635 in full screen by clicking on the full screen button 629. The user A 120A may click on one of the shapes to view detailed information regarding the selected shape 637 in the item display subsection 640.

The shape modification section 670 may allow the user A 120A to associate graphical attributes of the shapes, such as the color or size of the shapes, with metrics relating to the items represented by the shapes, such as the quality of the items, the number of readers of the items, the age of the items, the status of the items, the number of times the items were shared with other users, the number of total votes (i.e. the sum of positive and negative votes) received for the item, the geographic location of the users who provided the items, or the department of the organization the users who provided the items belong to. The show advanced checkbox 671 may allow a user A 120A to view advanced options in the shape modification section 670. The user A 120A may use the color metric selector 672 to select a metric to associate with the color of the shapes. The color legend 673 may display the values of the metrics associated with different colors of the shapes. For example, in FIG. 6 the user A 120A selected "Quality Score" in the color metric selector 672. Accordingly, the color legend 673 displays the color associated with a "Quality Score" indicating the users 120A-N liked the items and the color associated with a "Quality Score" indicating the users 120A-N did not like the items. The user A 120A may use the size metric selector 674 to select a metric to associate with the size of the shapes. The size legend 675 may display the values of the metrics associated with different sizes of the shapes. For example, in FIG. 6, the user A 120A selected "# of Viewers" in the size metric selector 674. Accordingly, the size legend 675 displays the size indicating that the item was viewed by many viewers and the size indicating the item was viewed by few viewers.

The user A 120A may use the item display subsection 640 to view, rate or modify the item represented by the selected shape 637. The user A 120A may click on the like it button 644 if they like the item represented by the selected shape 637, or click on the don't like it button 646 if they don't like the item represented by the selected shape 637. The user A 120A may create an item innovated from the item represented by the selected shape 637 by clicking on the enhance button 652. The item added by the user A 120A may appear in the graphical representation 635 as a shape connected to the selected shape 637 via a line. The user A 120A may view the title of the item represented by the selected shape 637 in the item title field 642. The user A 120A may view the user who provided the item represented by the selected shape 637 in the user identifier field 649. The user A 120A may view the content of the item represented by the selected shape 637 in the item content field 641. The user A 120A may add an attachment to the item represented by the selected shape 637 by clicking on the attachment button 659. The user A 120A may email the item represented by the selected shape 637 by clicking on the email button 657. The user A 120A may edit the item represented by the selected shape 637 by clicking on the edit button 656, may delete or archive the item represented by the selected shape 637 by clicking on the delete button 654, and may add the item represented by the selected shape 637 as a favorite by clicking on the add favorite button 651. Alternatively, the user A 120A may need to be authorized to edit, delete, or archive the item.

The user A 120A may move the item represented by the selected shape 637, or may convert the item represented by the selected shape 637 into an initial item by clicking on the move/convert button 655. The service provider server 240 may provide the user A 120A with an interface for moving or converting the item represented by the selected shape 637 when the user A 120A clicks on the move/convert button 655, such as the user interface 1100A. The steps of moving an item are discussed in more detail in FIG. 14 below, and the steps associated with converting an item into an initial item are discussed in more detail in FIG. 15 below.

The user A 120A may navigate through the system 100 using the navigation section 603. The user A 120A may view their subscriptions by clicking on the my subscriptions link 607. The user A 120A may view a tutorial by clicking on the tutorial link 609.

Figure 6A:
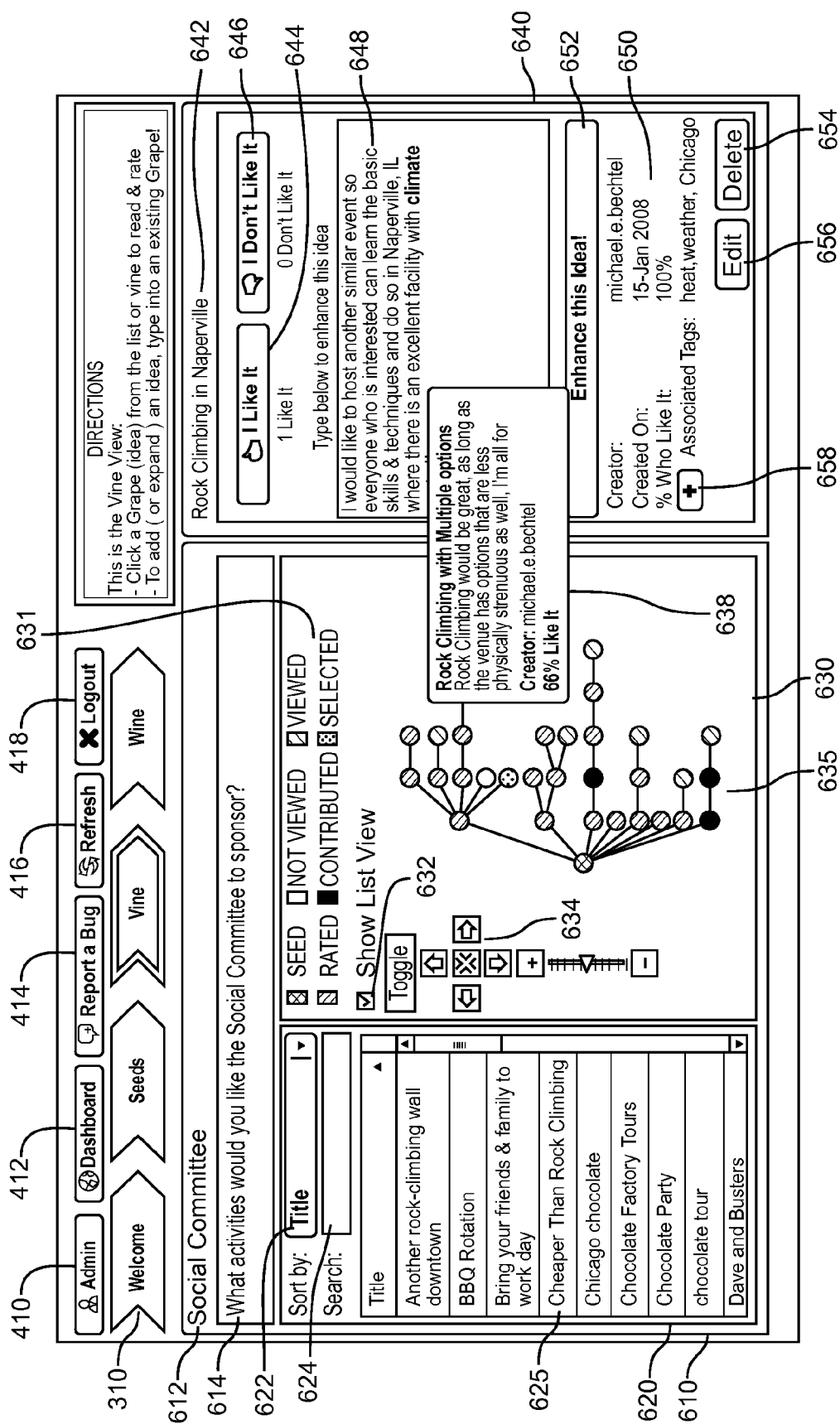
FIG. 6A is a screenshot of an alternative initial item collaborative innovation interface in the system of FIG. 1, or other systems for displaying a plurality of associated items in a collaborative environment.

FIG. 6A is a screenshot of an alternative initial item collaborative innovation interface 600 in the system of FIG. 1, or other systems for managing a collaborative environment. The system 100 may display the alternative initial item collaborative innovation interface 600 to the user A 120A when the user A 120A clicks on the view vine button 540 in the initial item details screen 500, as discussed in FIG. 5. The user A 120A may use the alternative initial item collaborative innovation interface 600 to view, add, and rate items that have been innovated from the initial item. The alternative initial item collaborative innovation interface 600 may display a graphical representation of the items, such as in the form of a hierarchical structure.

The alternative initial item collaborative innovation interface 600 may include a navigation bar 310, an admin button 410, a dashboard button 412, a report a bug button 414, a refresh button 416, a logout button 418, an item display section 610 and an item display subsection 640. The item display section 610 may include an item title 612, an initial item 614, an item selector subsection 620 and a collaborative display subsection 630. The item selector subsection 620 may include a sort by selector 622, a search field 624, and an item list 625. The collaborative display subsection 630 may include a legend display 631, a show list view checkbox 632, a display modifier 634, a graphical representation 635, and an item detail display 638. The item display subsection 640 may include an item title field 642, a like button 644, a don't like button 646, an item enhancement field 648, an enhance button 652, an item information display 650, an add tag button 658, an edit button 656, and a delete button 654.

In operation, the user A 120A may view the graphical representation 635 of the items innovated from an initial item in the collaborative display subsection 630. The graphical representation 635 may provide a visual depiction of the collaborative innovation process by representing each item as a shape, such as a circle. The user A 120A may modify the data that is displayed in the graphical representation 635 by using the item selector subsection 620. The user may view items in the item list 625 and may change the items displayed in the item list by using the sort by selector 622 and the search field 624.

The user A 120A may scroll and zoom in and zoom out of the graphical representation 635 using the display modifier 634. The graphical representation 635 may include one or more shapes representing the items, such as circles. The user A 120A may click on one of the shapes to view detailed information regarding the item represented by the shape in the item detail display 638. Alternatively or in addition the information in the item detail display 638 may be automatically displayed when the user A 120A uses a pointing interface, such as a mouse, to hover over a shape in the graphical representation 635. The user A 120A may be able to easily move around the graphical representation 635 at any zoom level. The user A 120A may zoom in and zoom out using the + and − buttons, or by using a mouse wheel. The legend display 631 may color code the shapes representing the items based on whether the user A 120A has contributed, viewed, selected, or rated the item.

The user A 120A may use the item display subsection 640 to view, rate or modify the item represented by the selected shape. The user A 120A may click on the like it button 644 if they like the item represented by the selected shape, or click on the don't like it button 646 if they don't like the item represented by the selected shape. The user A 120A may create an item innovated from the item represented by the selected shape by clicking on the enhance button 652. The item added by the user A 120A may appear in the graphical representation 635 as a shape connected to the selected shape via a line. The user A 120A may view details of the item represented by the selected shape in the item information display 650. The user A 120A may add a tag to the item represented by the selected shape by clicking on the add tag button 658. The user A 120A may tag an item with any searchable keywords. The user A 120A may edit the item represented by the selected shape by clicking on the edit button 656 and may delete the item represented by the selected shape by clicking on the delete button 654.

Figure 6B:
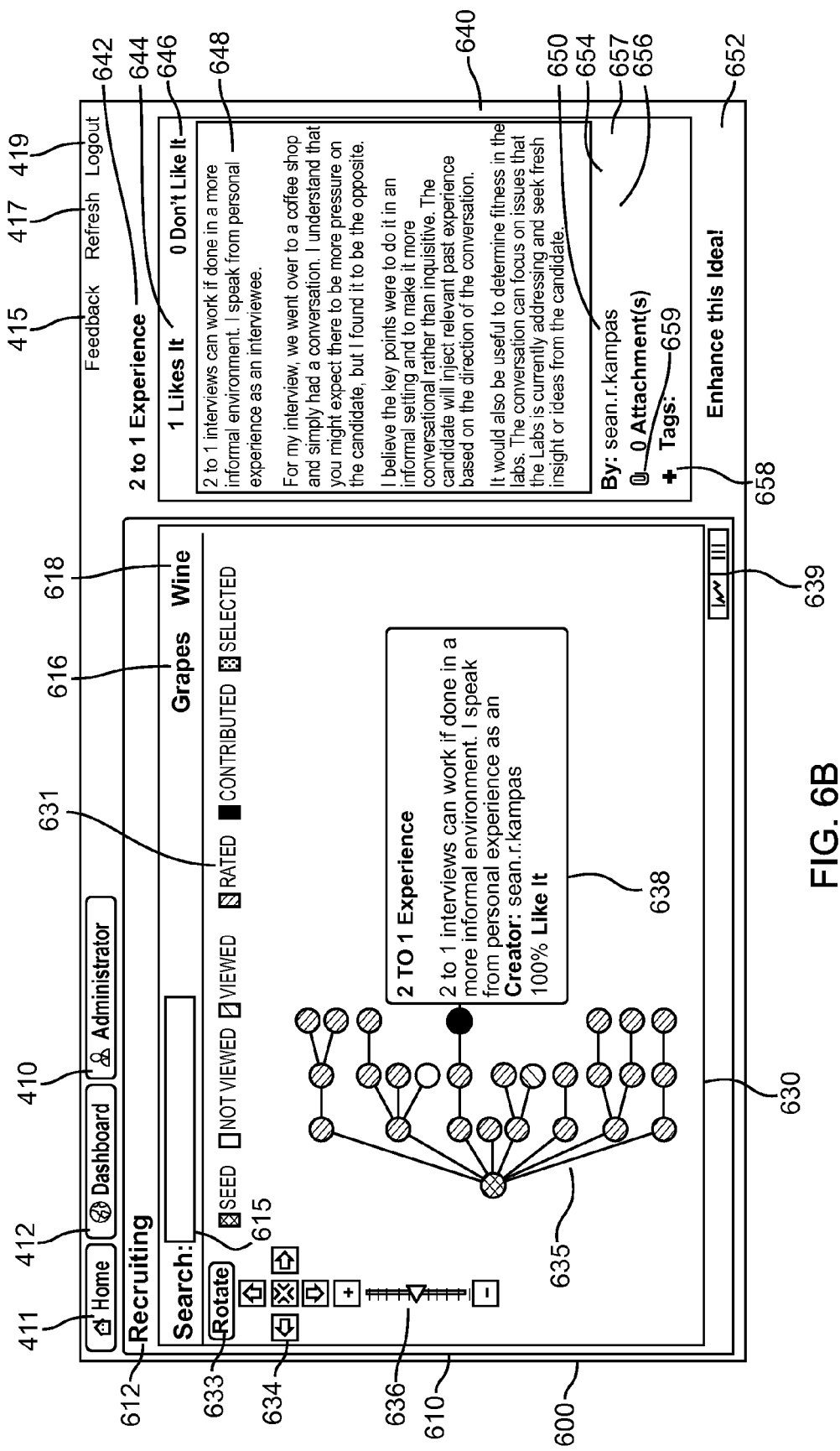
FIG. 6B is a screenshot of an alternative initial item collaborative innovation interface in the system of FIG. 1, or other systems for displaying a plurality of associated items in a collaborative environment.

FIG. 6B is a screenshot of an alternative initial item collaborative innovation interface 600 in the system of FIG. 1, or other systems for managing a collaborative environment. The system 100 may display the alternative initial item collaborative innovation interface 600 to the user A 120A when the user A 120A clicks on the view vine button 540 in the initial item details screen 500, as discussed in FIG. 5. The user A 120A may use the alternative initial item collaborative innovation interface 600 to view, add, and rate items that have been innovated from the initial item. The alternative initial item collaborative innovation interface 600 may display a graphical representation of the items, such as in the form of a hierarchical structure.

The alternative initial item collaborative innovation interface 600 may include an admin button 410, a home button 411, a dashboard button 412, a feedback link 415, a refresh link 417, a logout link 419, an item display section 610 and an item display subsection 640. The item display section 610 may include an initial item title 612, a search field 615, a grapes button 616, a wine button 618, and a collaborative display subsection 630. The collaborative display subsection 630 may include a legend display 631, a display modifier 634, a rotate button 633, a zoom bar 636, a graphical representation 635, an item detail display 638, and a list/graph toggle button 639. The item display subsection 640 may include an item title field 642, a like button 644, a don't like button 646, an item enhancement field 648, an enhance button 652, an item information display 650, an add tag button 658, an edit button 656, an add attachment button 659, an email button 657, and a delete button 654.

Figure 6C:
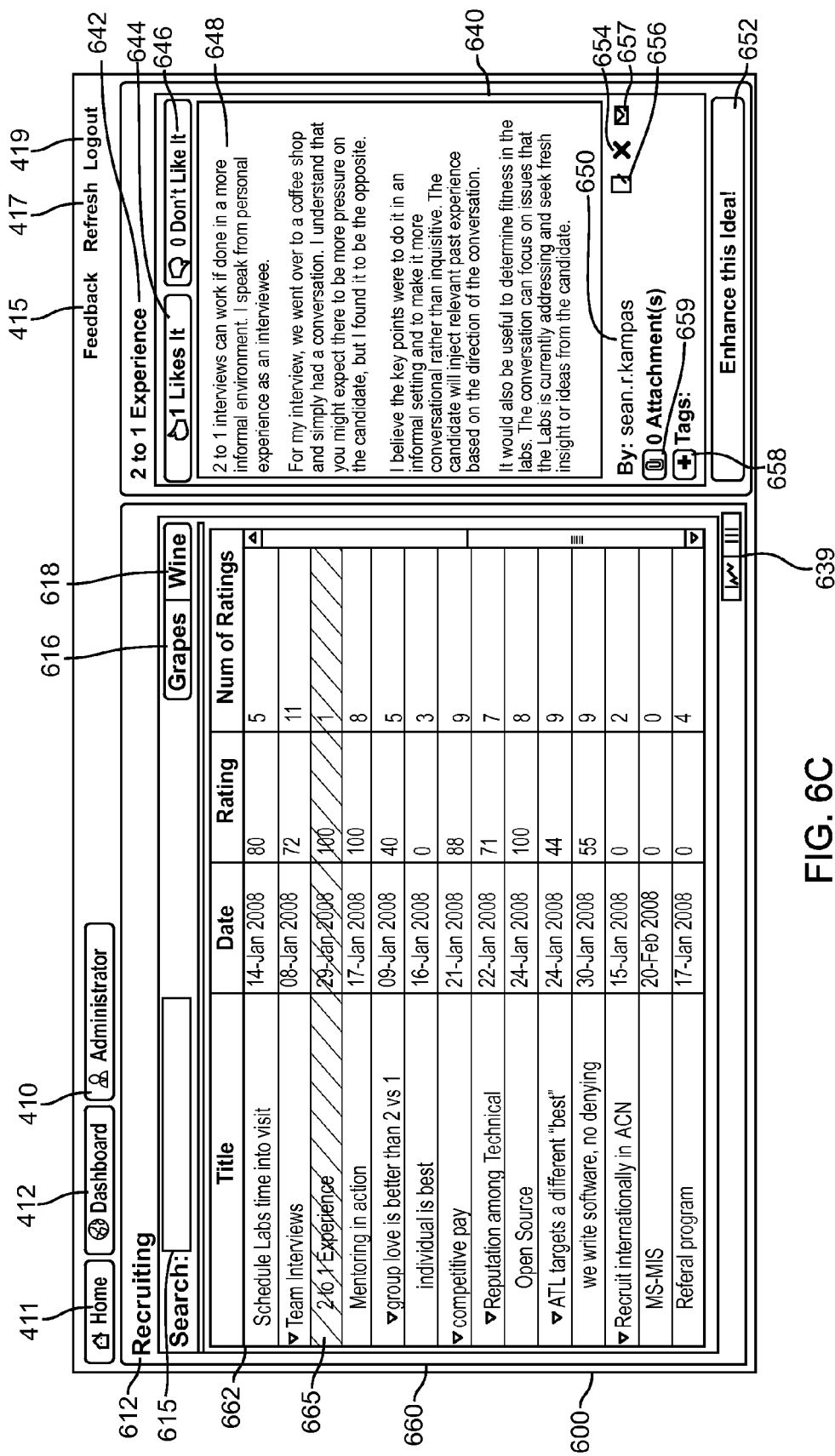
FIG. 6C is a screenshot of an outline representation of the items in an alternative initial item collaborative innovation interface in the system of FIG. 1, or other systems for displaying a plurality of associated items in a collaborative environment.

In operation, the user A 120A may view the graphical representation 635 of the items innovated from the initial item identified in the initial item title 612 in the collaborative display subsection 630. The graphical representation 635 may provide a visual depiction of the collaborative innovation process by representing each item as a shape, such as a circle. The user A 120A may toggle between the graphical representation of the items and an outline representation of the items using the list/graph toggle button 639. FIG. 6C describes the outline representation of the items, also referred to as a list view of the items, in more detail.

The user A 120A may move around the graphical representation 635 using the display modifier 634. The user A 120A may zoom in and out of the graphical collaborative display using the zoom bar 636. The user A 120A may rotate the graphical representation 635 using the rotate button 633. The graphical representation 635 may include one or more shapes representing the items, such as circles. The user A 120A may click on one of the shapes to view detailed information regarding the item represented by the shape in the item detail display 638. Alternatively or in addition the information in the item detail display 638 may be automatically displayed when the user A 120A uses a pointing interface, such as a mouse, to hover over a shape in the graphical representation 635. The legend display 631 may color code the shapes representing the items based on whether the user A 120A has contributed, viewed, selected, or rated the item.

The user A 120A may use the item display subsection 640 to view, rate or modify the item represented by the selected shape. The user A 120A may click on the like it button 644 if they like the item represented by the selected shape, or click on the don't like it button 646 if they don't like the item represented by the selected shape. The user A 120A may create an item innovated from the item represented by the selected shape by clicking on the enhance button 652. The item added by the user A 120A may appear in the graphical representation 635 as a shape connected to the selected shape via a line. The user A 120A may view details of the item represented by the selected shape in the item information display 650. The user A 120A may add a tag to the item represented by the selected shape by clicking on the add tag button 658. The user A 120A may tag an item with any searchable keywords. The user A 120A may add or download an attachment to the item represented by the selected shape by clicking on the attachment button 659. The user A 120A may email the item represented by the selected shape by clicking on the email button 657. The user A 120A may edit the item represented by the selected shape by clicking on the edit button 656 and may archive or delete the item represented by the selected shape by clicking on the delete button 654. Alternatively, the user A 120A may need certain permissions to be allowed to edit, delete or archive the item.

The user A 120A may search through the items by using the search field 615. The user A 120A may toggle whether the only the best items are searched or whether all the items are searched by using the grapes button 616 and the wine button 618. If the user A 120A clicks on the wine button 618 the search may be limited to the best items. If the user A 120A clicks on the grapes button 616, the search may be expanded to all the items. FIG. 6B may use the term "grape" to refer to each of the items innovated from the initial item, the term "vine" to refer to all of the items innovated from the initial item, and the term "wine" to refer to the best items innovated from the initial item.

FIG. 6C is a screenshot of an outline representation of the items in an alternative initial item collaborative innovation interface 600 in the system of FIG. 1, or other systems for managing a collaborative environment. The system 100 may display the alternative initial item collaborative innovation interface 600 to the user A 120A when the user A 120A clicks on the view vine button 540 in the initial item details screen 500, as discussed in FIG. 5. Alternatively, the outline representation in the alternative initial item collaborative innovation interface 600 may be displayed to the user A 120A when the user clicks on the list/graph toggle button 639 in FIG. 6B. The user A 120A may use the alternative initial item collaborative innovation interface 600 to view, add, and rate items that have been innovated from the initial item.

The alternative initial item collaborative innovation interface 600 may include an admin button 410, a home button 411, a dashboard button 412, a feedback link 415, a refresh link 417, a logout link 419, an item display section 610 and an item display subsection 640. The item display section 610 may include an item title 612, a search field 615, a grapes button 616, a wine button 618, and a collaborative list subsection 660. The collaborative list subsection 660 may include an outline representation 662 and a selected item 665. The item display subsection 640 may include an item title field 642, a like button 644, a don't like button 646, an item enhancement field 648, an enhance button 652, an item information display 650, an add tag button 658, an edit button 656, an add attachment button 659, an email button 657, and a delete button 654.

In operation the user A 120A may view an outline view of the items in the outline representation 662. The selected item 665 may represent an item the user A 120A selected from the outline representation 662. The selected item 665 may be enhanced or rated in the item modification subsection 640. The user A 120A may toggle to the graphical representation of the items using the list/graph toggle button 639. FIGS. 6 and 6A-B discuss the graphical representation of the items in more detail. The outline representation 662 may display the items in a thread view. The thread view may first display an initial item with the enhancements to the initial item listed below the initial item. Enhancements to the enhancements may be similarly situated below the item and/or enhancement they were derived from.

The user A 120A may use the item display subsection 640 to modify, enhance, or rate a selected item. The user A 120A may click on the like it button 644 if they like the item, or click on the don't like it button 646 if they don't like the item. The user A 120A may create an item enhancing the selected item by entering the item in the item enhancement field 648 and clicking the enhance button 652. The user A 120A may view details of the selected item in the item information display 650. The user A 120A may add a tag to the item by clicking on the add tag button 658. The user A 120A may tag an item with any searchable keywords. The user A 120A may add an attachment to the item by clicking on the attachment button 659. The user A 120A may email the selected item by clicking on the email button 657. The user A 120A may edit the item by clicking on the edit button 656 and may delete the selected item by clicking on the delete button 654.

The user A 120A may search through the items by using the search field 615. The user A 120A may toggle whether the only the best items are searched or whether all the items are searched by using the grapes button 616 and the wine button 618. If the user A 120A clicks on the wine button 618 the search may be limited to the best items. If the user A 120A clicks on the grapes button 616, the search may be expanded to all the items. FIG. 6C may use the term "grape" to refer to each individual item innovated from the initial items, the term "vine" to refer to all of the items innovated from an initial item, and the term "wine" to refer to the best items innovated from the initial item.

Figure 7:
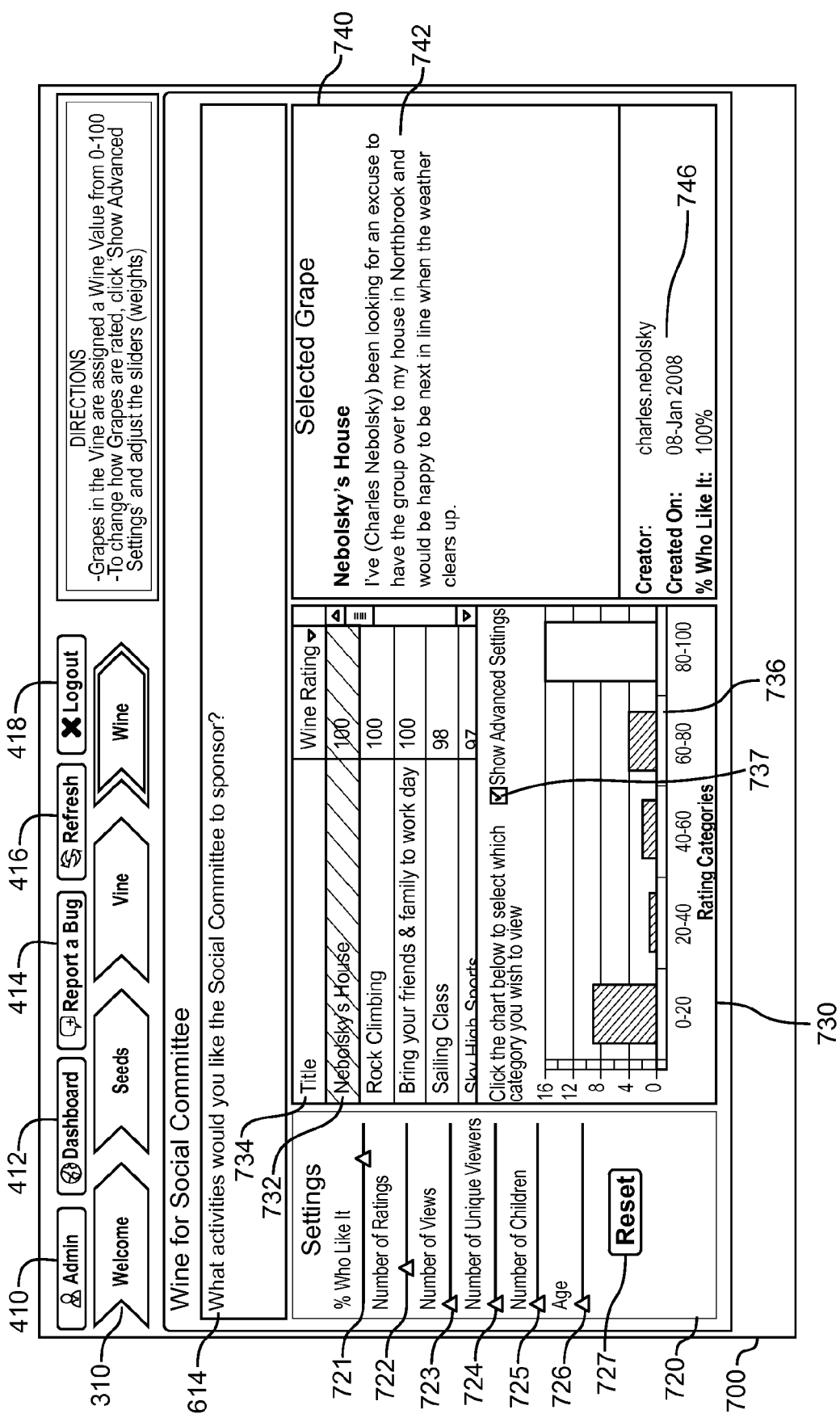
FIG. 7 is a screenshot of an initial item results screen in the system of FIG. 1, or other systems for displaying a plurality of associated items in a collaborative environment.

FIG. 7 is a screenshot of an initial item results screen 700 in the system of FIG. 1, or other systems for displaying a plurality of associated items in a collaborative environment. The system 100 may display the initial item results screen 700 to one of the content providers 110A-N, such as the content provider A 110A. The initial item results screen 700 may display a summary of the items that were innovated from the initial item. The items innovated from the initial item may be sorted based on the ratings received from the users 120A-N.

The initial item results screen 700 may include a navigation bar 310, an admin button 410, a dashboard button 412, a report a bug button 414, a refresh button 416, a logout button 418, an initial item 614, a settings subsection 720, a summary subsection 730, and a selected item subsection 740. The settings subsection 720 may include a like it selector 721, a number of ratings selector 722, a number of views selector 723, a number of unique viewers selector 724, a number of children selector 725, an age selector 726 and a reset button 727. The summary subsection 730 may include a rating category graph 736, an item list 734, an advanced settings checkbox 737, and a selected item 732. The selected item subsection 740 may include a selected item description display 742 and a selected item details display 746.

The settings subsection 720 may be used to modify the weight given to each factor in the overall rating calculation. The selectors 721, 722, 723, 724, 725, 726 may be adjusted to change the weight afforded to each factor in the overall ratings calculations. The selectors 721, 722, 723, 724, 725, 726 may be reset by clicking on the reset button 727. The summary subsection 730 may display the items most highly rated by the users 120A-N in accordance with the weight of the factors indicated in the settings subsection 720. The user A 120A may use the advanced settings checkbox 737 to toggle the display of the settings subsection 720. The ratings category graph 736 may display ranges of the ratings for the selected initial item. The user A 120A may click on a bar in the ratings category graph 736 to change the range of ratings of the items displayed in the item list 734.

The user A 120A may select an item from the item list 734 and view detailed information regarding the selected item in the selected item subsection 740. The user A 120A may view the description of the selected item 732 in the selected item description display 742. The user A 120A may view the details associated with the selected item in the selected item description display 746.

Figure 7A:
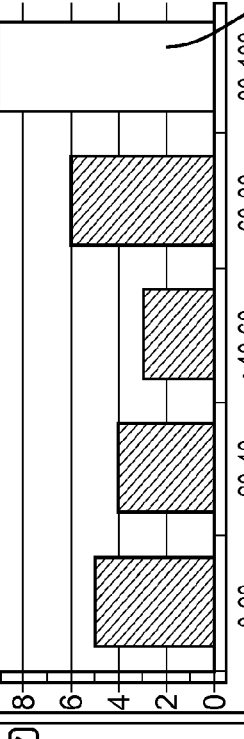
FIG. 7A is a screenshot of an alternative initial item results screen in the system of FIG. 1, or other systems for displaying a plurality of associated items in a collaborative environment.

FIG. 7A is a screenshot of an alternative initial item results screen 700 in the system of FIG. 1, or other systems for displaying a plurality of associated items in a collaborative environment. The system 100 may display the alternative initial item results screen 700 to one of the content providers 110A-N, such as the content provider A 110A. The alternative initial item results screen 700 may display a summary of the items that were innovated from the initial item. The items innovated from the initial item may be sorted based on the ratings received from the users 120A-N.

The initial item results screen 700 may include an admin button 410, a home button 411, a dashboard button 412, a feedback link 415, a refresh link 417, a logout link 419, a search field 615, a grapes button 616, a wine button 618, a settings subsection 720, a summary subsection 730, and a selected item subsection 740. The settings subsection 720 may include a like it selector 721, a number of ratings selector 722, a number of unique viewers selector 724, a number of children selector 725, an age selector 726 and a reset button 727. The summary subsection 730 may include a rating category graph 736, an item list 734, a selected rating bar 738, and a selected item 732. The selected item subsection 740 may include a selected item 732, a selected item description display 742, a selected item details display 746, and a selected item ratings display 748.

The settings subsection 720 may be used to modify the weight given to each factor in the overall rating calculation. The selectors 721, 722, 724, 725, 726 may be adjusted to change the weight afforded to each factor in the overall ratings calculations. The selectors 721, 722, 724, 725, 726 may be reset by clicking on the reset button 727. The summary subsection 730 may display the items most highly rated by the users 120A-N in accordance with the weight of the factors indicated in the settings subsection 720. The ratings category graph 736 may display ranges of the ratings for the selected initial item. The selected rating bar 738 in the ratings category graph 736 may be a bar selected by the user A 120A. The selected rating bar 738 in the ratings category graph 736 to change the range of ratings of the items displayed in the item list 734.

The user A 120A may select an item from the item list 734 and view detailed information regarding the selected item 732 in the selected item subsection 740. The user A 120A may view the description of the selected item 732 in the selected item description display 742. The user A 120A may view the details associated with the selected item 732, such as creation details, in the selected item description display 746. The user A 120A may view ratings information of the selected item 732 in the selected item ratings display 748.

Figure 8:
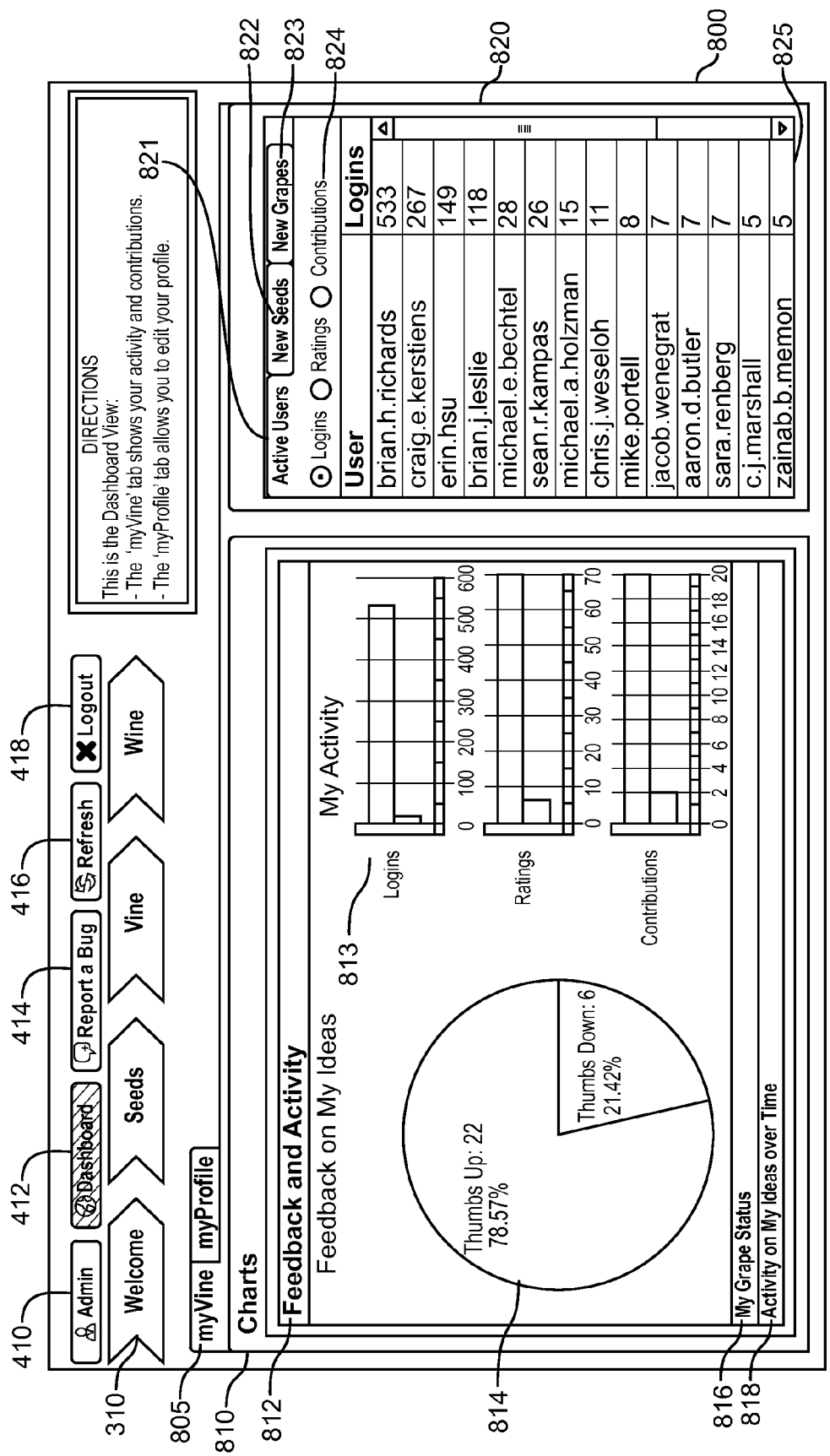
FIG. 8 is a screenshot of a user dashboard screen in the system of FIG. 1, or other systems for displaying a plurality of associated items in a collaborative environment.

FIG. 8 is a screenshot of a user dashboard screen 800 in the system of FIG. 1, or other systems for displaying a plurality of associated items in a collaborative environment. The system 100 may display the user dashboard screen 800 to the user A 120A when the user A 120A clicks on the dashboard button 412. The user A 120A may use the user dashboard screen 800 to obtain a quick overview of recent changes in the system 100. The user A 120A may also use the user dashboard screen 800 to view metrics regarding their use of the system 100 and the other users 120B-N use of the system 100.

The user dashboard screen 800 may include a navigation bar 310, an admin button 410, a dashboard button 412, a report a bug button 414, a refresh button 416, a logout button 418, a vine tab 805, a charts subsection 810 and a user subsection 820. The charts subsection 810 may include a feedback and activity header 812, a grape status header 816, an activity header 818, a feedback graph 814, and an activity display 813. The user subsection 820 may include an active users tab 821, a new initial items tab 822, a new grape items tab 823, a display selector 824 and a user list 825.

In operation, the user A 120A may view their activity in the charts subsection 810. The feedback graph 814 may display the number of items liked by the user A 120A and the number of items disliked by the user A 120A. The activity display 813 may display the activity of the user A 120A in the system 100. The activity display 813 may display the logins, ratings, and items contributed by the user A 120A. The user subsection 820 may display the activity of the other users 120B-N. The user A 120A may click on the new initial items tab 822 to view the new initial item activity or the user A 120A may click on the new grape items tab 823 to view the new grape item activity.

The user A 120A may click on the grape status header 816 to view data associated with the status of their items. The status of the items may be used to provide feedback to the other users 120B-N. The status of the items may be published to the users 120A-N via email, text messaging, social network messaging, or generally any messaging system capable of communicating the items. The user A 120A may click on the activity header 818 to view the activity on their items over a period of time. The user A 120A may click on the myProfile tab in the vine tab 805 to view the data associated with their user profile.

Figure 8A:
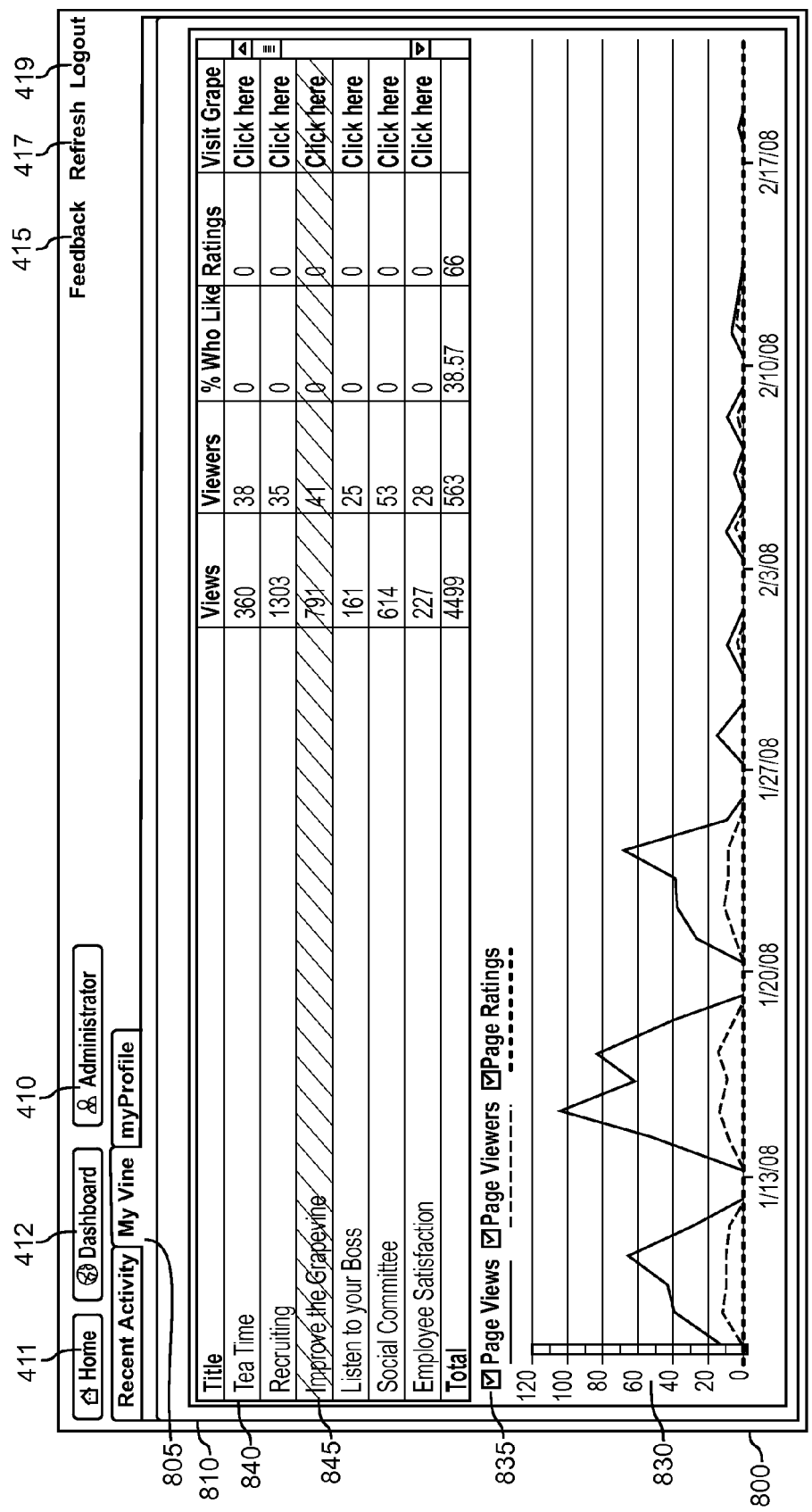
FIG. 8A is a screenshot of an alternative user dashboard screen in the system of FIG. 1, or other systems for displaying a plurality of associated items in a collaborative environment.

FIG. 8A is a screenshot of an alternative user dashboard screen 800 in the system of FIG. 1, or other systems for displaying a plurality of associated items in a collaborative environment. The system 100 may display the alternative user dashboard screen 800 to the user A 120A when the user A 120A clicks on the dashboard button 412. The user A 120A may use the alternative user dashboard screen 800 to obtain an overview of recent changes in the system 100. The user A 120A may also use the alternative user dashboard screen 800 to view metrics regarding their use of the system 100 and the other users 120B-N use of the system 100.

The alternative user dashboard screen 800 may include an admin button 410, a home button 411, a dashboard button 412, feedback link 415, a refresh link 417, a logout link 419, a vine tab 805, and charts subsection 810. The charts subsection 810 may include an initial item table 840, a selected initial item 845, a view graph 830 and view filters 835.

In operation the user A 120A may view their activity in the charts subsection 810. The initial item table 840 may display all of the initial items in the system 100 the user A 120A has provided items or ratings for. Alternatively or in addition the initial item table 840 may display all of the initial items in the system 100. The selected initial item 845 may be an initial item the user A 120A would like to view additional information for. The view graph 830, may display detailed information regarding the selected initial item 845. The user A 120A may use the view filters 835 to select one or more metrics for the selected item 845. For example, the user A 120A may view a graph of the page views for the selected item 845, the page viewers for the selected item 845, and/or the page ratings for the selected item 845. The user A 120A may click on the "click here" field in the "Visit Grape" column to view the associated initial item or item.

Figure 9:
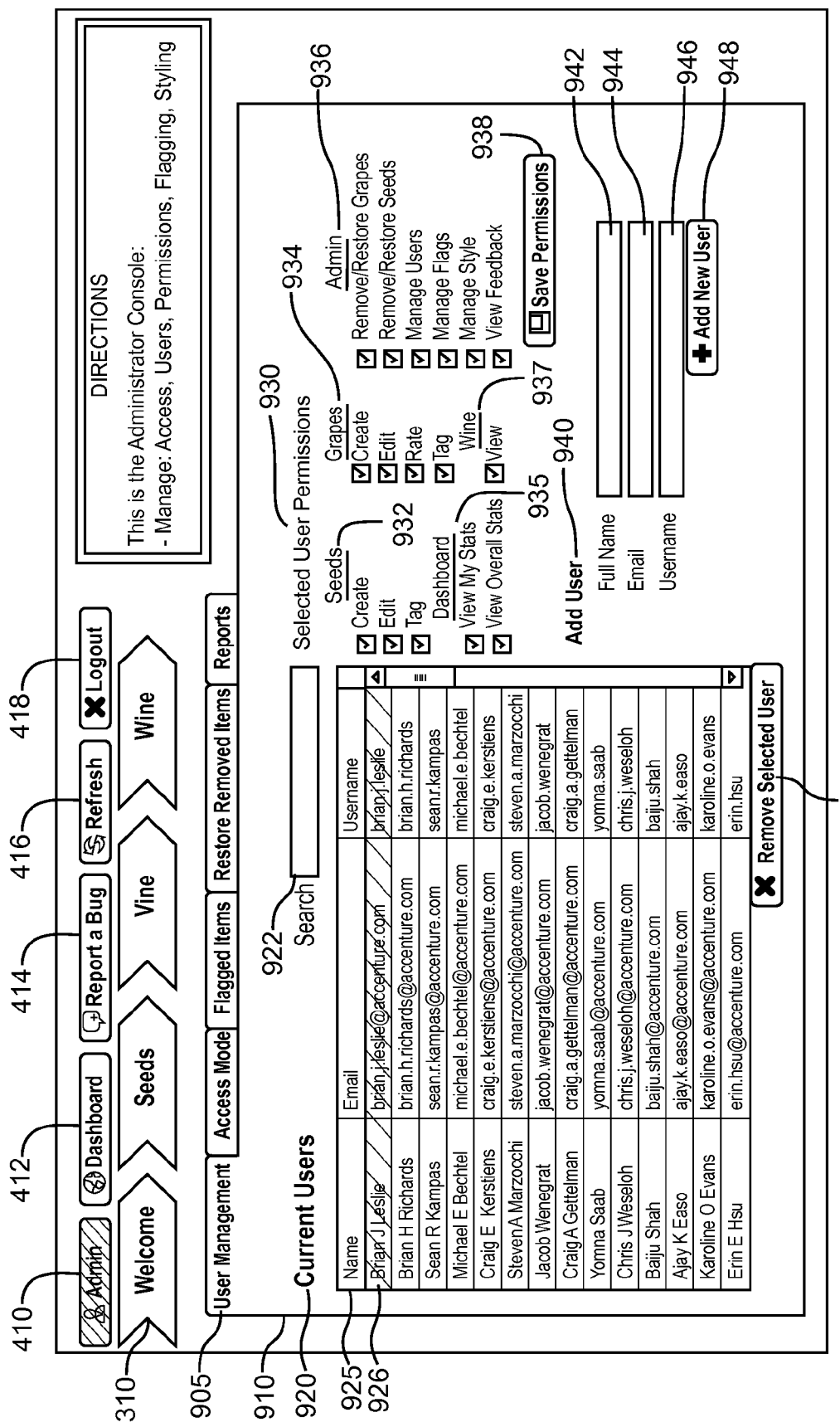
FIG. 9 is a screenshot of an administrator interface in the system of FIG. 1, or other systems for displaying a plurality of associated items in a collaborative environment.

FIG. 9 is a screenshot of an administrator interface 900 in the system of FIG. 1, or other systems for displaying a plurality of associated items in a collaborative environment. The system 100 may display the administrator interface 900 to the user A 120A when the user A 120A clicks on the admin button 410. The user A 120A may use the administrator interface 900 to view and modify the administrative data associated with the system 100. A user A 120A with administrator privileges may be taken directly to the administrator interface 900 upon logging into the system 100.

The administrator interface 900 may include a navigation bar 310, an admin button 410, a dashboard button 412, a report a bug button 414, a refresh button 416, a logout button 418, an administrator tabset 905, a user management section 910, a current users subsection 920, a selected user permissions subsection 930, and a add user subsection 940. The current users subsection 920 may include a search field 922, a current users table 925, a selected user 926, and a remove selected user button 928. The selected users subsection 930 may include an initial items permissions 932, a grape items permissions 934, admin items permissions 936, and a save permissions button 938. The add user subsection 940 may include a full name field 942, an email field 944, a username field 946, and an add new user button 948. The administrator interface may be designed using ADOBE FLEX ACCORDION. Each accordion may contain controls similar in nature.

In operation one of the users 120A-N with administrator privileges, such as the user A 120A, may use the administrator interface 900 to modify or view the permissions of the users 120A-N. The user A 120A may search the current users table 925 by entering a name of a user in the search field 922. The user A 120A may remove the selected user 926 by clicking on the remove selected user button 928. The user A 120A may modify the permissions associated with the selected user 926 in the selected user permissions subsection 930. The user A 120A may select or deselect one or more of the initial item permissions 932, the grape item permissions 934, the dashboard permissions 935, the admin permissions 936, and the wine permissions 937. The initial item permissions 932 may include create, edit, and tag permissions. The grape item permissions 934 may include create, edit, rate, and tag permissions. The admin permissions 936 may include remove/restore grape items, remove/restore initial items, manage users, manage flags, manage style and view feedback permissions. The dashboard permissions 935 may include view my stats and view overall stats permissions. The wine permissions 937 may include view permissions. The user A 120A may affect the changes in permissions by clicking on the save permissions button 938.

The user A 120A may add a new user using the add user subsection 940. The user A 120A may enter the name of the new user in the name field 942, the email of the new user in the email field 944 and the username of the new user in the username field 946. The user A 120A may add the new user by clicking on the add new user button 948.

Alternatively or in addition the user A 120A may use the administrator interface 900 to change the color scheme or font size of the interface. The administrator interface 900 may also be used to generate reports. The administrator interface 900 may be used to add, change or remove branding, or generally add, change or remove any features of the system 100. The administrator interface 900 may be used to manage the access mode. The access mode may be open access, domain restricted access, admin added access, or admin approved access. If the system 100 is operating in open access any person may create an account and login. If the system 100 is operating in domain restricted access, only persons with email accounts in a certain domain may create an account and login. If the system 100 is operating in admin added mode, an administrator must add a user to a user list in order to grant access. If the system 100 is operating in admin approved mode an administrator must approve of a user's request for access to the system 100.

Figure 9A:
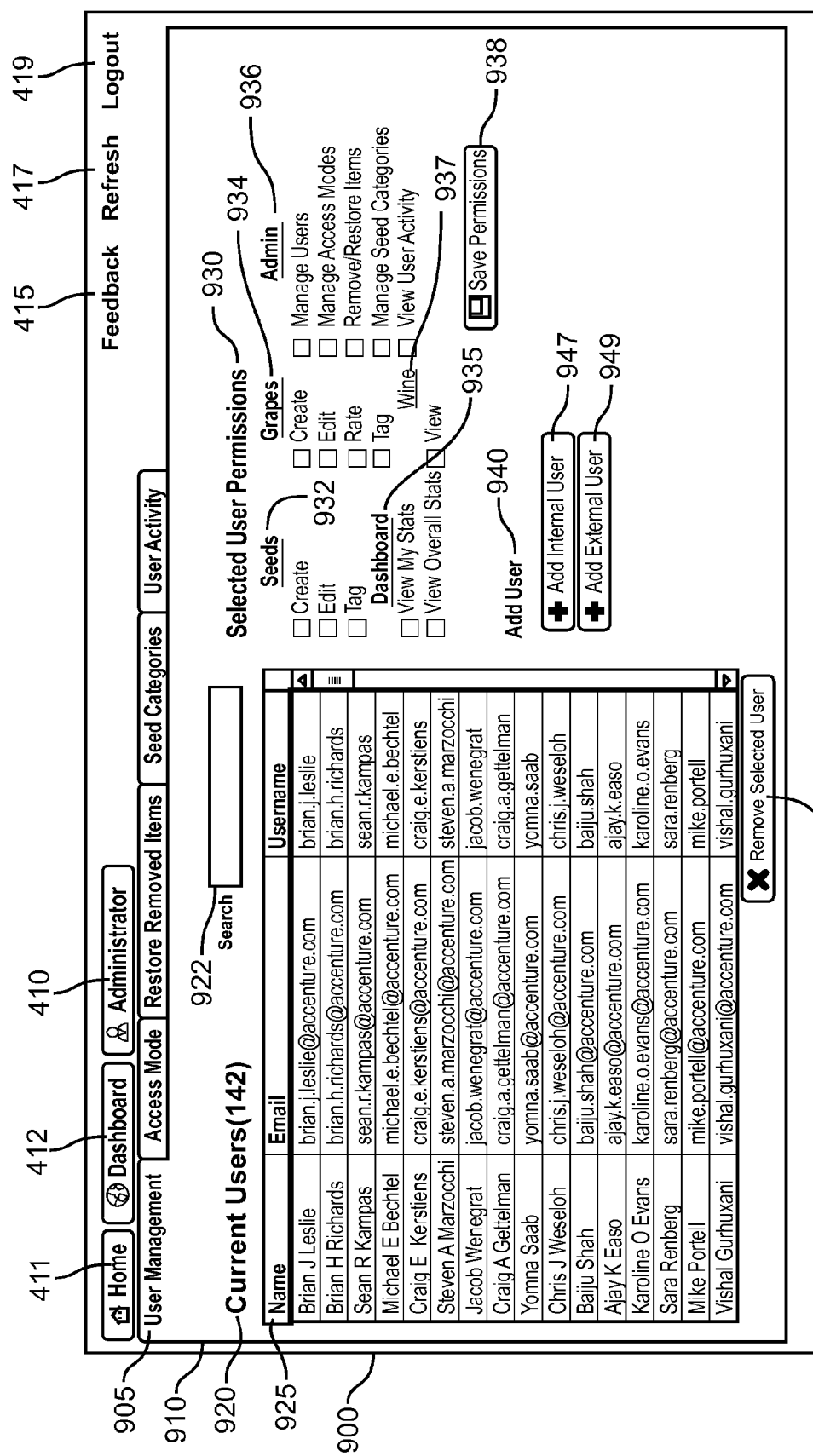
FIG. 9A is a screenshot of an alternative administrator interface in the system of FIG. 1, or other systems for displaying a plurality of associated items in a collaborative environment.

FIG. 9A is a screenshot of an alternative administrator interface 900 in the system of FIG. 1, or other systems for displaying a plurality of associated items in a collaborative environment. The system 100 may display the alternative administrator interface 900 to the user A 120A when the user A 120A clicks on the admin button 410. The user A 120A may use the alternative administrator interface 900 to view and modify the administrative data associated with the system 100. A user A 120A with administrator privileges may be taken directly to the alternative administrator interface 900 upon logging into the system 100.

The alternative administrator interface 900 may include an admin button 410, a home button 411, a dashboard button 412, a feedback link 415, a feedback link 417, a logout link 419, an administrator tabset 905, a user management section 910, a current users subsection 920, a selected user permissions subsection 930, and a add user subsection 940. The current users subsection 920 may include a search field 922, a current users table 925, a selected user 926, and a remove selected user button 928. The selected users subsection 930 may include an initial items permissions 932, a grape items permissions 934, admin items permissions 936, and a save permissions button 938. The add user subsection 940 may include an add internal user button 947 and an add external user button 949. The administrator interface may be designed using ADOBE FLEX ACCORDION. Each accordion may contain controls similar in nature.

In operation one of the users 120A-N with administrator privileges, such as the user A 120A, may use the administrator interface 900 to modify or view the permissions of the users 120A-N. The user A 120A may search the current users table 925 by entering a name of a user in the search field 922. The user A 120A may remove the selected user 926 by clicking on the remove selected user button 928. The user A 120A may modify the permissions associated with the selected user 926 in the selected user permissions subsection 930. The user A 120A may select or deselect one or more of the initial item permissions 932, the grape item permissions 934, the dashboard permissions 935, the admin permissions 936, and the wine permissions 937. The initial item permissions 932 may include create, edit, and tag permissions. The grape item permissions 934 may include create, edit, rate, and tag permissions. The admin permissions 936 may include remove/restore grape items, remove/restore initial items, manage users, manage flags, manage style and view feedback permissions. The dashboard permissions 935 may include view my stats and view overall stats permissions. The wine permissions 937 may include view permissions. The user A 120A may affect the changes in permissions by clicking on the save permissions button 938.

The user A 120A may add a new user using the add user subsection 940. The user A 120A may click on the add internal user button 947 to add a new internal user and the add external user button 949 at add a new external user. An internal user may be a member of the organization or the collaborative environment while an external user may be a person external to the organization. The external users may, by default, be given more restrictive user permissions.

Alternatively or in addition the user A 120A may use the administrator interface 900 to change the color scheme or font size of the interface. The administrator interface 900 may also be used to generate reports. The administrator interface 900 may be used to add, change or remove branding, or generally add, change or remove any features of the system 100. The administrator interface 900 may be used to manage the access mode. The access mode may be open access, domain restricted access, admin added access, or admin approved access. If the system 100 is operating in open access any person may create an account and login. If the system 100 is operating in domain restricted access, only persons with email accounts in a certain domain may create an account and login. If the system 100 is operating in admin added mode, an administrator must add a user to a user list in order to grant access. If the system 100 is operating in admin approved mode an administrator must approve of a user's request for access to the system 100.

FIG. 10 is a screenshot of a recent activity screen 1000 in the system of FIG. 1, or other systems for displaying a plurality of associated items in a collaborative environment. The system 100 may display the recent activity screen 1000 to the user A 120A when the user A 120A clicks on the dashboard button 412 and the clicks on the recent activity tab 1005. Alternatively or in addition the system 100 may display the recent activity screen 1000 to the user A 120A when the user A 120A clicks on the dashboard button 412. The user A 120A may use the recent activity screen 1000 to view the recent activity in the system 100.

The recent activity screen 1000 may include an admin button 410, a home button 411, a dashboard button 412, feedback link 415, a refresh link 417, a logout link 419, a recent activity display 1010, a recent initial item table 1020 and a recent grape table 1030. The recent activity display 1010 may include a list of items or items.

In operation, the user A 120A may view the activity of the item in the system in the recent activity display 1010. The recent activity display 1010 may indicate when a particular item has received many positive ratings, or when a particular item has received many negative ratings. The recent activity display 1010 may display the items, the activity on the items, and any associated information, such as the person who posted the item. The user A 120A may click on one of the items to view the item.

The recent initial items table 1020 may display the recent initial items added to the system 100. The user A 120A may click on one of the initial items to view the initial item. The recent initial items table 1020 may also display the age of the initial item. The recent grapes table 1030 may display the recent items added to the system. The recent grapes table 1030 may display the age of the items, such as in days. The user A 120A may click on one of the items to view, enhance, or rate the item.

Figure 11A:
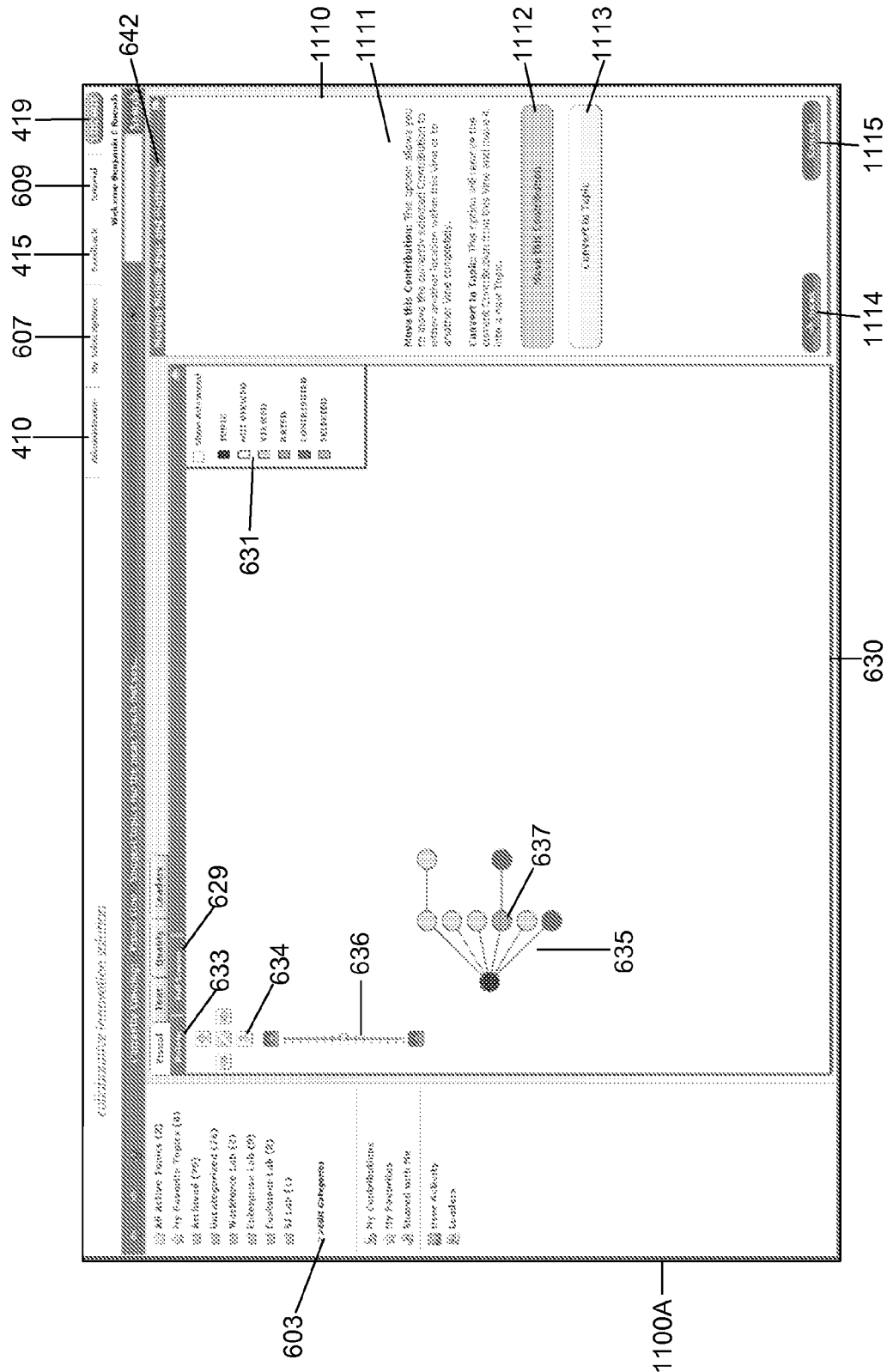
FIG. 11A is a screenshot of a move/convert item interface in the system of FIG. 1, or other systems for displaying a plurality of associated items in a collaborative environment.

FIG. 11A is a screenshot of a move/convert item interface 1100A in the system of FIG. 1, or other systems for displaying a plurality of associated items in a collaborative environment. The system 100 may display the move/convert item interface 1100A to the user A 120A when the user A 120A requests to move an item or convert an item to an initial item, such as by clicking on the move/convert button 655 of FIG. 6. The user A 120A may use the move/convert item interface 1100A to move an item or convert an item into an initial item. The move/convert item interface 1100A may display a graphical representation 635 of the items, such as in the form of a hierarchical structure, which displays the selected shape 637 representing the item being moved or converted.

The move/convert item interface 1100A may include an admin button 410, a my subscriptions link 607, a feedback link 415, a tutorial link 609, a logout link 419, a navigation section 603, a collaborative display subsection 630, and a move/convert item subsection 1110. The collaborative display subsection 630 may include a display modifier 634, a rotate button 633, a zoom bar 636, a full screen button 629, a graphical representation 635, and a selected shape 637. The move/convert subsection 1110 may include a description field 1111, a move contribution button 1112, a convert to initial item button 1113, a next button 1114, and a cancel button 1115.

In operation, the user A 120A may view the graphical representation 635 of the items innovated from an initial item in the collaborative display subsection 630. The graphical representation 635 may provide a visual depiction of the collaborative innovation process by representing each item as a shape, such as a circle. The user A 120A may move around the graphical representation 635 using the display modifier 634. The user A 120A may zoom in and out of the graphical collaborative display using the zoom bar 636. The user A 120A may rotate the graphical representation 635 using the rotate button 633. The user A 120A may view the graphical representation 635 in full screen by clicking on the full screen button 629.

The user A 120A may use the move/convert item subsection 1110 to start the process of moving the item represented by the selected shape 637, or converting the item represented by the selected shape 637 into an initial item. The user A 120A may view information pertinent to moving or converting the item represented by the selected shape 637 in the description field 1111. The user A 120A may start the process of moving the item represented by the selected shape 637 by clicking on the move item button 1112. The user A 120A may start the process of converting the item represented by the selected shape 637 into an initial item by clicking on the convert item button 1113. The user A 120A may confirm their selection by clicking on the next button 1114. The user A 120A may cancel moving/converting the item represented by the selected shape 637 by clicking on the cancel button 1115.

The user A 120A may navigate through the system 100 using the navigation section 603. The user A 120A may view their subscriptions by clicking on the my subscriptions link 607. The user A 120A may view a tutorial by clicking on the tutorial link 609.

Figure 11B:
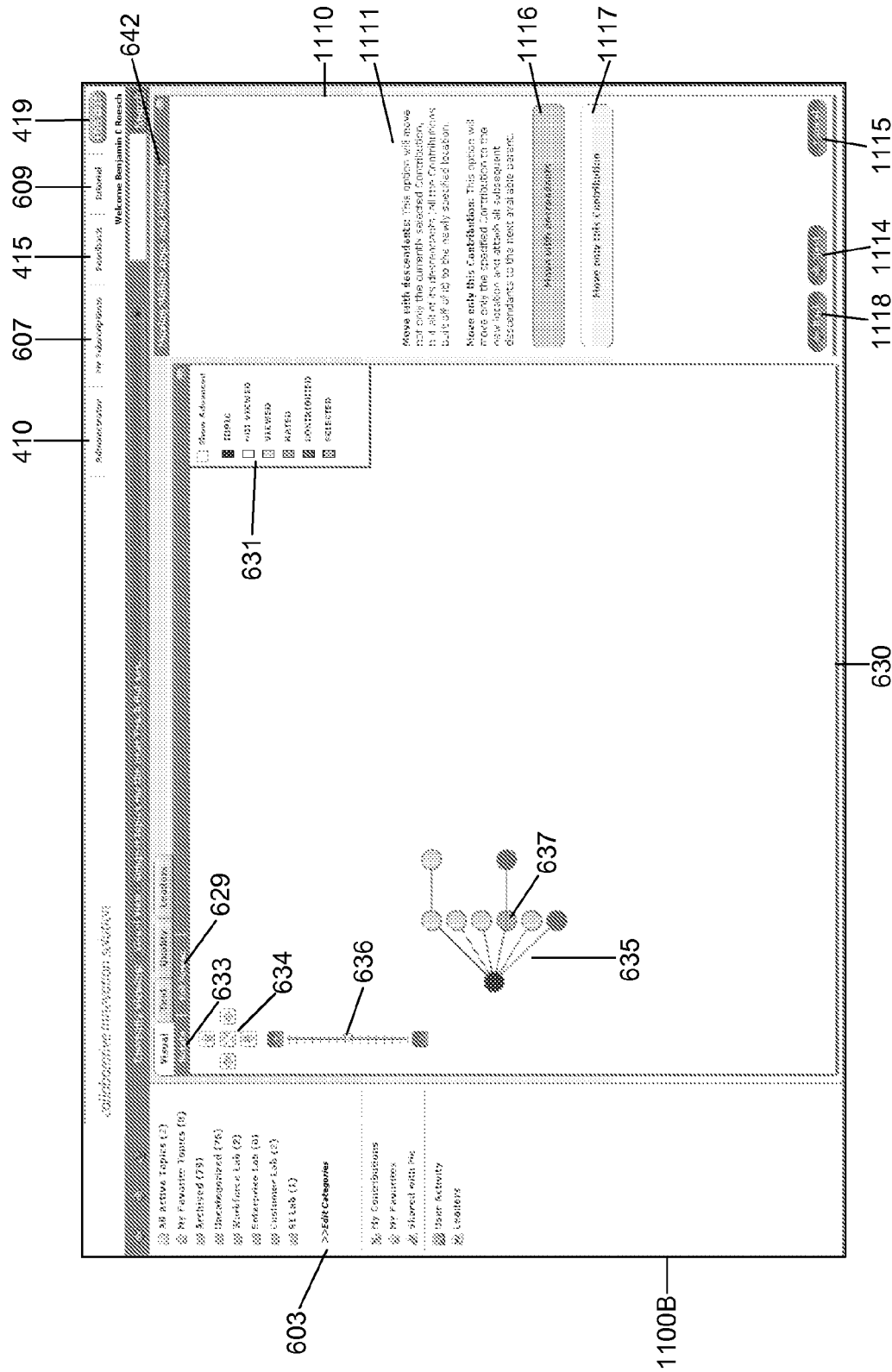
FIG. 11B is a screenshot of a move item options interface in the system of FIG. 1, or other systems for displaying a plurality of associated items in a collaborative environment.

FIG. 11B is a screenshot of a move item options interface 1100B in the system of FIG. 1, or other systems for displaying a plurality of associated items in a collaborative environment.

The system 100 may display the move item options interface 1100B to the user A 120A when the user A 120A requests to move the item represented by the selected shape 637, such as by clicking on the move item button 1112 and then the next button 1114 in the move/convert item interface 1100A. The user A 120A may use the move item options interface 1100B to select options related to moving the item. The move item options interface 1100B may display a graphical representation 635 of the items, such as in the form of a hierarchical structure, which displays the selected shape 637 representing the item being moved.

The move item options interface 1100B may include an admin button 410, a my subscriptions link 607, a feedback link 415, a tutorial link 609, a logout link 419, a navigation section 603, a collaborative display subsection 630, and a move/convert item subsection 1110. The collaborative display subsection 630 may include a display modifier 634, a rotate button 633, a zoom bar 636, a full screen button 629, a graphical representation 635, and a selected shape 637. The move/convert subsection 1110 may include a description field 1111, a move descendants button 1116, a move only this item button 1117, a next button 1114, a back button 1118, and a cancel button 1115.

In operation, the user A 120A may view the graphical representation 635 of the items innovated from an initial item in the collaborative display subsection 630. The graphical representation 635 may provide a visual depiction of the collaborative innovation process by representing each item as a shape, such as a circle. The user A 120A may move around the graphical representation 635 using the display modifier 634. The user A 120A may zoom in and out of the graphical collaborative display using the zoom bar 636. The user A 120A may rotate the graphical representation 635 using the rotate button 633. The user A 120A may view the graphical representation 635 in full screen by clicking on the full screen button 629.

The user A 120A may use the move/convert item subsection 1110 to select whether to move only the item represented by the selected shape 637, or both the item and its descendants. The descendants of an item may refer to any items which were innovated from the item, both directly and indirectly. The user A 120A may view information pertinent to moving only the item represented by the selected shape 637 or both the item and its descendants in the description field 1111. The user A 120A may click on the move with descendants button 1116 to move both the item represented by the selected shape 637 and its descendants. The user A 120A may click on the move only this contribution button 1117 to move only the item represented by the selected shape 637. The user A 120A may return to the move/convert item interface 1100A by clicking on the back button 1118. The user A 120A may cancel the move of the item by clicking on the cancel button 1115. The user A 120A may confirm their selection by clicking on the next button 1114.

The user A 120A may navigate through the system 100 using the navigation section 603. The user A 120A may view their subscriptions by clicking on the my subscriptions link 607. The user A 120A may view a tutorial by clicking on the tutorial link 609.

Figure 11C:
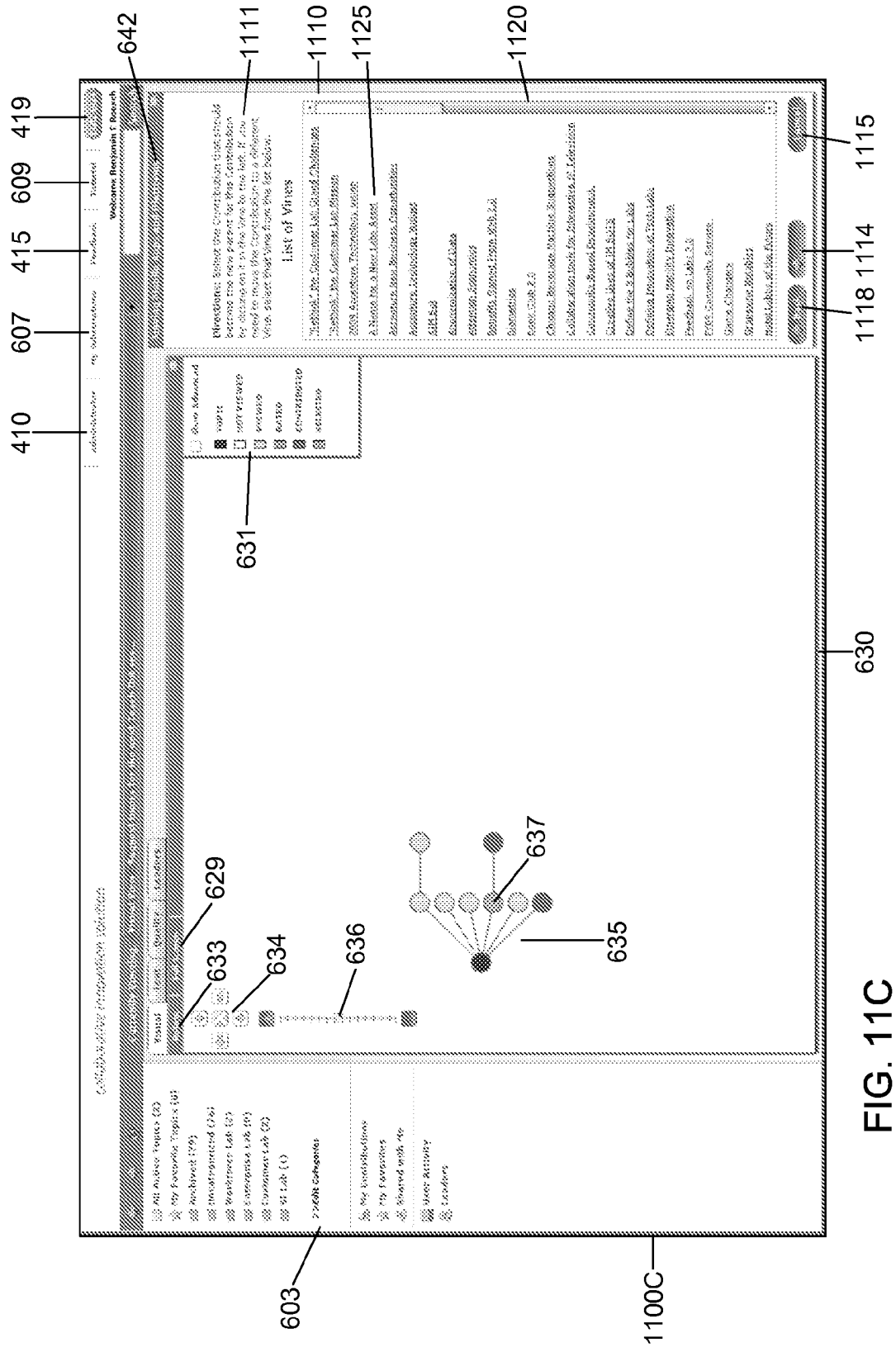
FIG. 11C is a screenshot of a move item destination interface in the system of FIG. 1, or other systems for displaying a plurality of associated items in a collaborative environment.

FIG. 11C is a screenshot of a move item destination interface 1100C in the system of FIG. 1, or other systems for displaying a plurality of associated items in a collaborative environment. The system 100 may display the move item destination interface 1100C to the user A 120A when the user A 120A clicks on the next button 1114 of the move item options interface 1100B. The user A 120A may use the move item options destination interface 1100C to select a destination item to move the item represented by the selected shape 637 to. The move item destination interface 1100C may display a graphical representation 635 of the items, such as in the form of a hierarchical structure, which displays the selected shape 637 representing the item being moved.

The move item destination interface 1100C may include an admin button 410, a my subscriptions link 607, a feedback link 415, a tutorial link 609, a logout link 419, a navigation section 603, a collaborative display subsection 630, and a move/convert item subsection 1110. The collaborative display subsection 630 may include a display modifier 634, a rotate button 633, a zoom bar 636, a full screen button 629, a graphical representation 635, and a selected shape 637. The move/convert subsection 1110 may include a description field 1111, a destination items table 1120, destination items 1125, a next button 1114, a back button 1118, and a cancel button 1115.

In operation, the user A 120A may view the graphical representation 635 of the items innovated from an initial item in the collaborative display subsection 630. The graphical representation 635 may provide a visual depiction of the collaborative innovation process by representing each item as a shape, such as a circle. The user A 120A may move around the graphical representation 635 using the display modifier 634. The user A 120A may zoom in and out of the graphical collaborative display using the zoom bar 636. The user A 120A may rotate the graphical representation 635 using the rotate button 633. The user A 120A may view the graphical representation 635 in full screen by clicking on the full screen button 629.

The user A 120A may use the move/convert item subsection 1110 to select a destination item to move the item represented by the selected shape 637 to, and the descendents of the item if applicable. The user A 120A may view information pertaining to selecting a destination item 1125 in the description field 1111. The user A 120A may view the possible destination items 1125 in the destination items table 1120. The user A 120A may click on a destination item 1125 to select a destination item 1125. The user A 120A may return to the move item options interface 1100B by clicking on the back button 1118. The user A 120A may cancel the move of the item by clicking on the cancel button 1115. The user A 120A may confirm their selection of a destination item 1125 by clicking on the next button 1114.

The user A 120A may navigate through the system 100 using the navigation section 603. The user A 120A may view their subscriptions by clicking on the my subscriptions link 607. The user A 120A may view a tutorial by clicking on the tutorial link 609.

Figure 11D:
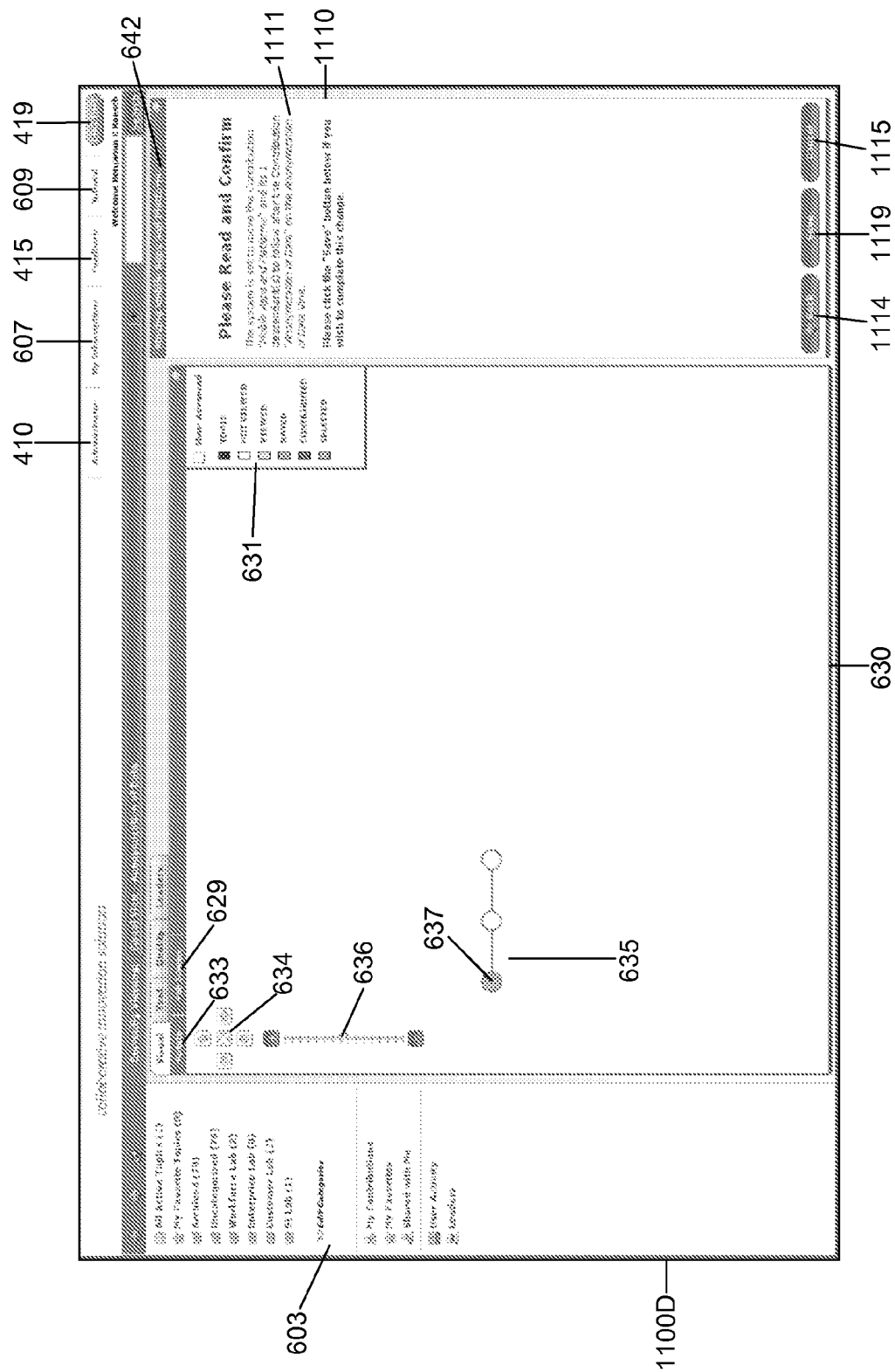
FIG. 11D is a screenshot of a move item confirmation interface in the system of FIG. 1, or other systems for displaying a plurality of associated items in a collaborative environment.

FIG. 11D is a screenshot of a move item confirmation interface 1100D in the system of FIG. 1, or other systems for displaying a plurality of associated items in a collaborative environment. The system 100 may display the move item confirmation interface 1100D to the user A 120A when the user A 120A clicks on the next button 1114 of the move item destination interface 1100C. The user A 120A may use the move item confirmation interface 1100D to review and confirm the move of the item represented by the selected shape 637. The move item confirmation interface 1100D may display a preview of the graphical representation 635 displaying the item represented by the selected shape 637 moved to the destination item 1125.

The move item confirmation interface 1100D may include an admin button 410, a my subscriptions link 607, a feedback link 415, a tutorial link 609, a logout link 419, a navigation section 603, a collaborative display subsection 630, and a move/convert item subsection 1110. The collaborative display subsection 630 may include a display modifier 634, a rotate button 633, a zoom bar 636, a full screen button 629, a graphical representation 635, and a selected shape 637. The move/convert subsection 1110 may include a description field 1111, a next button 1114, a back button 1118, and a save button 1119.

In operation, the user A 120A may view the graphical representation 635 of the items innovated from an initial item in the collaborative display subsection 630. The graphical representation 635 may provide a visual depiction of the collaborative innovation process by representing each item as a shape, such as a circle. The user A 120A may move around the graphical representation 635 using the display modifier 634. The user A 120A may zoom in and out of the graphical collaborative display using the zoom bar 636. The user A 120A may rotate the graphical representation 635 using the rotate button 633. The user A 120A may view the graphical representation 635 in full screen by clicking on the full screen button 629.

The user A 120A may use the move/convert item subsection 1110 to review and confirm the move of the item represented by the selected shape 637 to the destination item 1125. The user A 120A may review details relating to the move of the item represented by the selected shape 637 to the destination item 1125 in the description field 1111. The user A 120A may return to the move item destination interface 1100C by clicking on the back button 1118. The user A 120A may cancel the move of the item represented by the selected shape 637 by clicking on the cancel button 1115. The user A 120A may confirm the move of the item represented by the selected shape 637 to the destination item 1125 by clicking on the save button 1119.

The user A 120A may navigate through the system 100 using the navigation section 603. The user A 120A may view their subscriptions by clicking on the my subscriptions link 607. The user A 120A may view a tutorial by clicking on the tutorial link 609.

Figure 11E:
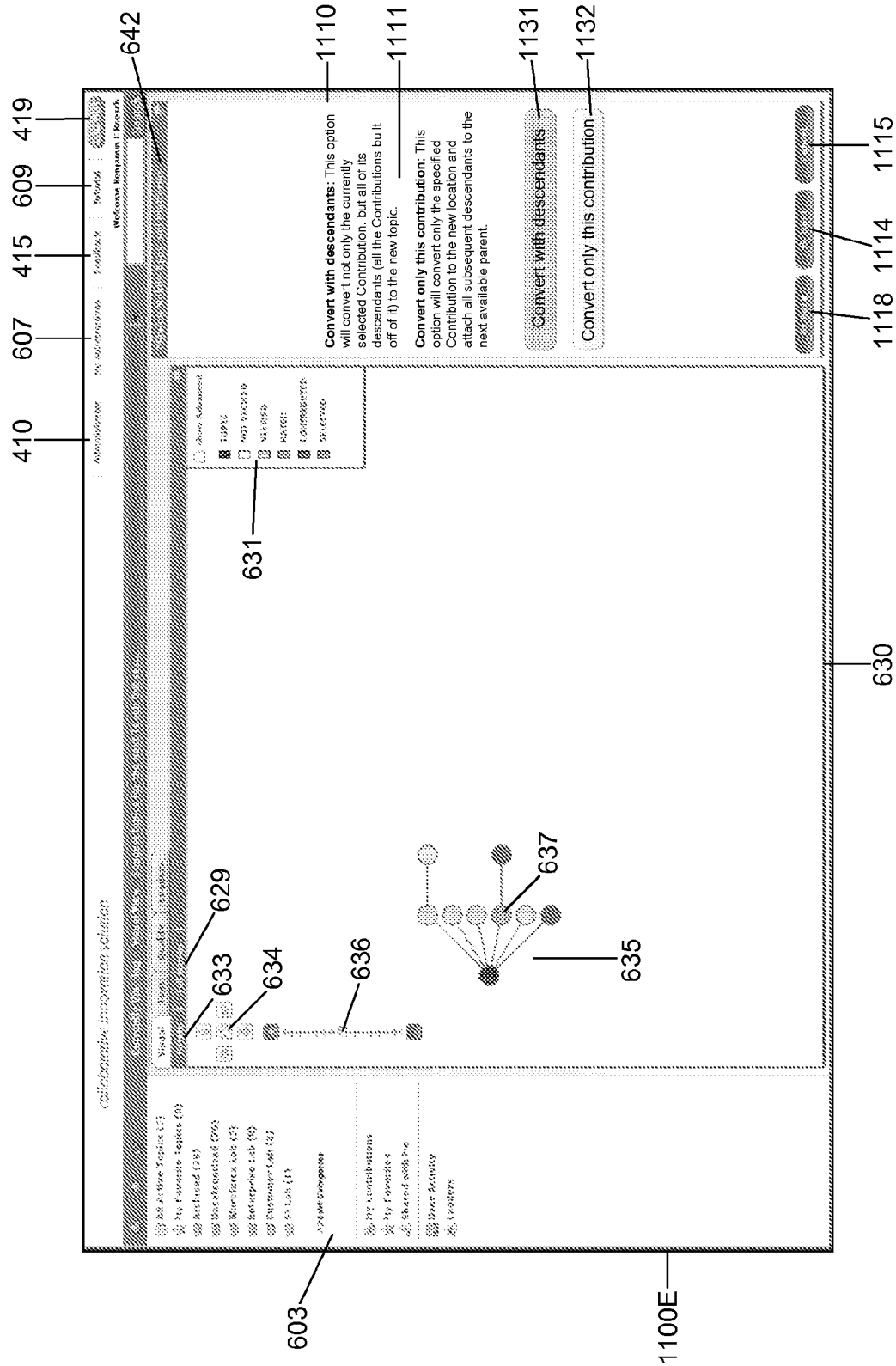
FIG. 11E is a screenshot of a convert item option interface in the system of FIG. 1, or other systems for displaying a plurality of associated items in a collaborative environment.

FIG. 11E is a screenshot of a convert item option interface 1100E in the system of FIG. 1, or other systems for displaying a plurality of associated items in a collaborative environment. The system 100 may display the convert item option interface 1100E to the user A 120A when the user A 120A requests to convert the item represented by the selected shape 637 to an initial item, such as by clicking on the convert item button 1113 and then the next button 1114 in the move/convert item interface 1100A. The user A 120A may use the convert item option interface 1100E to select options related to converting the item represented by the selected shape 637 into an initial item. The convert item option interface 1100E may display a graphical representation 635 of the items, such as in the form of a hierarchical structure, which displays the selected shape 637 representing the item being converted into an initial item.

The convert item option interface 1100E may include an admin button 410, a my subscriptions link 607, a feedback link 415, a tutorial link 609, a logout link 419, a navigation section 603, a collaborative display subsection 630, and a move/convert item subsection 1110. The collaborative display subsection 630 may include a display modifier 634, a rotate button 633, a zoom bar 636, a full screen button 629, a graphical representation 635, and a selected shape 637. The move/convert subsection 1110 may include a description field 1111, a convert with descendants button 1131, a convert only this item button 1132, a next button 1114, a back button 1118, and a cancel button 1115.

In operation, the user A 120A may view the graphical representation 635 of the items innovated from an initial item in the collaborative display subsection 630. The graphical representation 635 may provide a visual depiction of the collaborative innovation process by representing each item as a shape, such as a circle. The user A 120A may move around the graphical representation 635 using the display modifier 634. The user A 120A may zoom in and out of the graphical collaborative display using the zoom bar 636. The user A 120A may rotate the graphical representation 635 using the rotate button 633. The user A 120A may view the graphical representation 635 in full screen by clicking on the full screen button 629.

The user A 120A may use the move/convert item subsection 1110 to select whether to convert only the item represented by the selected shape 637 to an initial item, or to convert the item represented by the selected shape 637, along with its descendants, to an initial item. The user A 120A may view information pertinent to converting only the item or both the item and its descendants in the description field 1111. The user A 120A may click on the convert with descendants button 1131 to convert the item and its descendants. The user A 120A may click on the convert only this item button 1132 to convert only the item. The user A 120A may return to the move/convert item interface 1100A by clicking on the back button 1118. The user A 120A may cancel converting the item by clicking on the cancel button 1115. The user A 120A may confirm their selection by clicking on the next button 1114.

The user A 120A may navigate through the system 100 using the navigation section 603. The user A 120A may view their subscriptions by clicking on the my subscriptions link 607. The user A 120A may view a tutorial by clicking on the tutorial link 609.

Figure 11F:
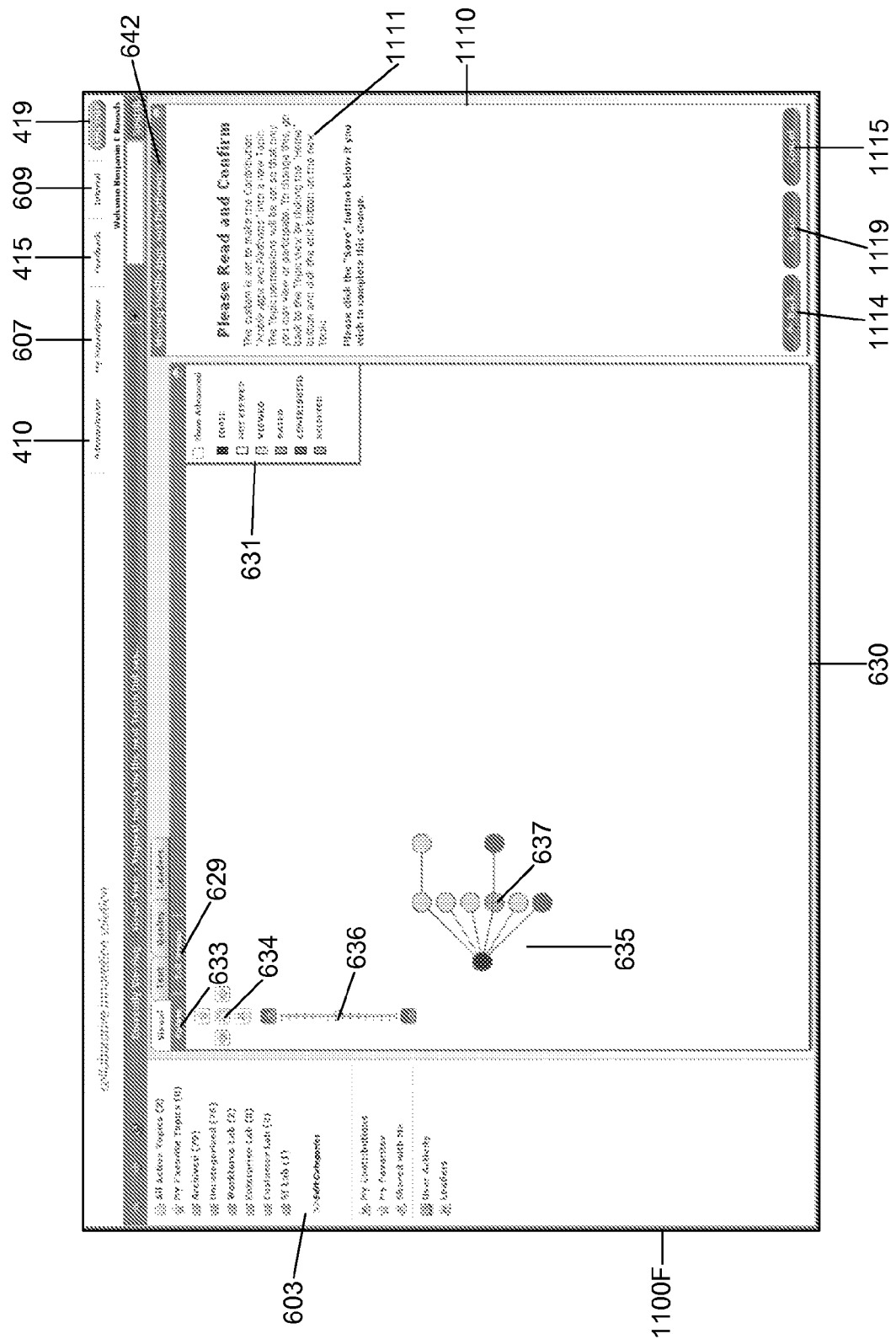
FIG. 11F is a screenshot of a convert item confirmation interface in the system of FIG. 1, or other systems for displaying a plurality of associated items in a collaborative environment.

FIG. 11F is a screenshot of a convert item confirmation interface 1100F in the system of FIG. 1, or other systems for displaying a plurality of associated items in a collaborative environment. The system 100 may display the convert item confirmation interface 1100F to the user A 120A when the user A 120A clicks on the next button 1114 in the convert item option interface 1100E. The user A 120A may use the convert item confirmation interface 1100F to review and confirm converting the item represented by the selected shape into an initial item. The convert item confirmation interface 1100F may display a preview of the graphical representation 635 displaying the item represented by the selected shape 637 converted to an initial item.

The convert item confirmation interface 1100F may include an admin button 410, a my subscriptions link 607, a feedback link 415, a tutorial link 609, a logout link 419, a navigation section 603, a collaborative display subsection 630, and a move/convert item subsection 1110. The collaborative display subsection 630 may include a display modifier 634, a rotate button 633, a zoom bar 636, a full screen button 629, a graphical representation 635, and a selected shape 637. The move/convert subsection 1110 may include a description field 1111, a next button 1114, a back button 1118, and a save button 1119.

In operation, the user A 120A may view a preview of the graphical display of the item represented by the selected shape 637 converted to an initial item in the graphical representation 635. The graphical representation 635 may provide a visual depiction of the collaborative innovation process by representing each item as a shape, such as a circle. The user A 120A may move around the graphical representation 635 using the display modifier 634. The user A 120A may zoom in and out of the graphical collaborative display using the zoom bar 636. The user A 120A may rotate the graphical representation 635 using the rotate button 633. The user A 120A may view the graphical representation 635 in full screen by clicking on the full screen button 629.

The user A 120A may use the move/convert item subsection 1110 to review and confirm converting the item represented by the selected shape 637 into an initial item. The user A 120A may review information pertaining to converting the item represented by the selected shape 637 in the description field 1111. The user A 120A may return to the convert item option interface 1100E by clicking on the back button 1118. The user A 120A may cancel converting the item by clicking on the cancel button 1115. The user A 120A may confirm converting the item by clicking on the save button 1119.

The user A 120A may navigate through the system 100 using the navigation section 603. The user A 120A may view their subscriptions by clicking on the my subscriptions link 607. The user A 120A may view a tutorial by clicking on the tutorial link 609.

Figure 12:
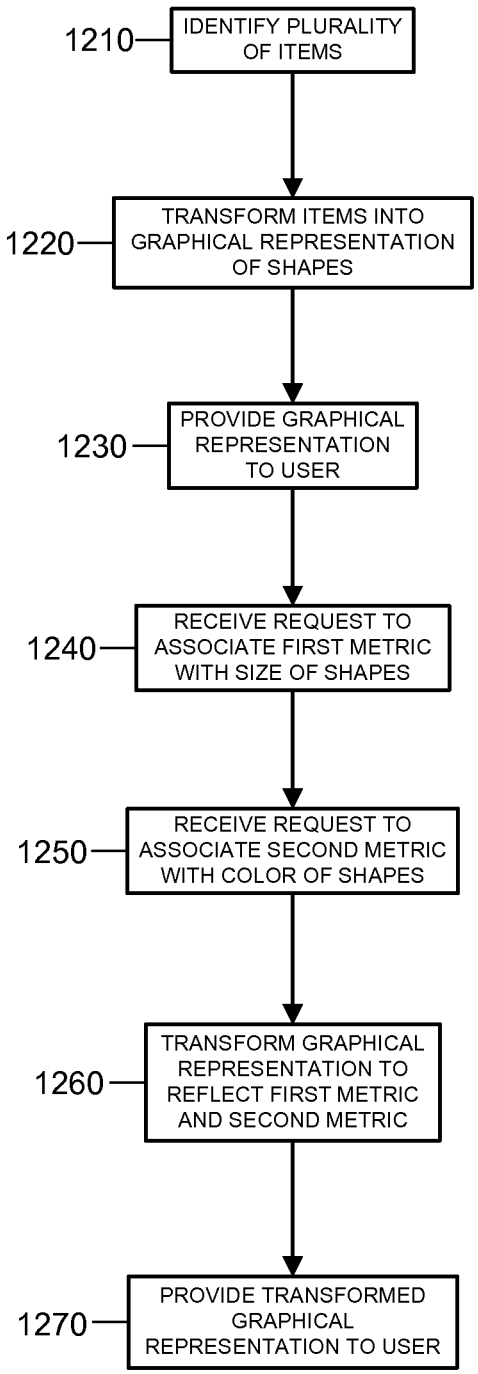
FIG. 12 is a flowchart illustrating the operations of associating metrics with display attributes of shapes representing items in the system of FIG. 1, or other systems for displaying a plurality of associated items in a collaborative environment.

FIG. 12 is a flowchart illustrating the operations of associating metrics with display attributes of shapes representing items in the system of FIG. 1, or other systems for displaying a plurality of associated items in a collaborative environment. The steps of FIG. 12 are described as being performed by the service provider server 240. However, the steps may be performed by the operating system of the service provider server 240, a processor of the service provider server 240, any other hardware component of the server 240, or any combination thereof. Alternatively the steps may be performed by an external hardware component, an external software process, or any combination thereof.

At step 1210, the service provider server 240 may identify a plurality of items in a collaborative environment. The plurality of items may include an initial item and items innovated from the initial item. Each item may be associated with the item it was innovated from. At step 1220, the service provider server 240 may transform the plurality of items into a graphical representation. Each item in the plurality of items may be represented by a shape in the graphical representation, such as a circle, and the association between items may be represented as a line between the shapes.

At step 1230, the service provider server 240 may provide the graphical representation to the user A 120A, such as through a device of the user A 120A. For example, the service provider server 240 may provide the graphical representation 635 of FIG. 6 to the user A 120A. At step 1240, the service provider server 240 may receive a request from the user A 120A to associate a first metric of the items with the size of the shapes representing the items. For example, the user A 120A may select a metric from the size metric selector 674 of FIG. 6. The user A 120A may associate any metric related to the items with the size of the shapes, such as the quality of the items as indicated by ratings of the items, the number of readers of the items, the age of the items, the status of the items, the number of times the items were shared with other users, the number of total votes (i.e. the sum of positive and negative votes) received for the item, the geographic location of the users who provided the items, or the department of the organization the users who provided the items belong to.

At step 1250, the service provider server 240 may receive a request to associate a second metric relating to the items with the color of the shapes. For example, the user A 120A may select a metric from the color metric selector 672 of FIG. 6. The user A 120A may associate any metric related to the items with the color of the shapes, such as the quality of the items as indicated by ratings of the items, the number of readers of the items, the age of the items, the status of the items, the number of times the items were shared with other users, the number of total votes (i.e. the sum of positive and negative votes) received for the item, the geographic location of the users who provided the items, or the department of the organization the users who provided the items belong to.

At step 1260, the service provider server 240 may transform the graphical representation of the items to reflect the association of the first metric with the size of the shapes representing the items and the second metric with the color of the shapes representing the items. For example, the service provider server 240 may increase the size of a shape representing an item if the item has a high value for the metric relative to the other items. Conversely, the service provider server 240 may decrease the size of a shape representing an item if the item has a low value for the metric relative to the other items. For example, there may be a maximum and minimum size for the shapes. The shape representing the item with the maximum value for the metric may be the maximum size, while the shape representing the item with the minimum value for the metric may be the minimum size. The shapes representing the items with values in-between the maximum value and minimum value may be sized proportionally to the maximum size and/or the minimum size based on the value of the item relative to the maximum value and/or the minimum value for the metric.

Alternatively, the service provider server 240 may decrease the size of the shape representing the item if the item has a low value for the metric relative to the other items, and the service provider server 240 may increase the size of the shape representing the item if the item has a high value for the metric relative to the other items. Alternatively, the service provider server 240 may increase the size of the shape representing the item as the value of the metric of the item approaches a best value for the metric, and the service provider server 240 may decrease the size of the shape representing the item as the value of the metric of the item approaches a worst value for the metric. The best and worst values for a metric may be determined by an administrator. Alternatively, the user A 120A may identify the best value and the worst value for each metric.

Likewise, the service provider server 240 may associate a first color, such as green, with a high value of the second metric for an item, and a second color, such as red, with a low value of the second metric for an item. Alternatively, the user A 120A may select the first color and the second color. The first color and the second color may be any color, hue or shading. The service provider server 240 may transform the color of a shape representing an item to the first color if the item has a high value for the metric. Conversely, the service provider server 240 may transform the color of a shape representing an item to the second color if the item has a low value for the metric. The service provider server 240 may utilize blends of the first color and the second color for shapes representing items that are relatively average for the second metric. The blend may shift more towards the first color as the value of the second metric for an item increases and may shift more towards the second color as the value of the second metric for an item decreases. For example, the color green may be associated with a maximum value for the metric while the color red may be associated with a minimum value for the metric. The shape representing the item with the maximum value for the metric may be colored green, while the shape representing the item with the minimum value for the metric may be colored red. The shapes representing the items with values in-between the maximum value and the minimum value may be colored a blend of green and red, the amount of green and/or red in the blend being proportional to value of the metric for the item relative to the maximum value and/or minimum value for the metric.

Alternatively, the service provider server 240 may change the color of the shape representing the item to the first color as the value of the metric of the item approaches a best value for the metric, and the service provider server 240 may change the color of the shape representing the item to the second color as the value of the metric of the item approaches a worst value for the metric. The best and worst values for a metric may be determined by an administrator. Alternatively, the user A 120A may identify the best value and the worst value for each metric.

At step 1270, the service provider server 240 may provide the transformed graphical representation of the items to the user A 120A. The transformed graphical representation may depict the size of the shapes representing the items in accordance with the items' values for the first metric and may depict the color of the shapes in accordance with the items' values for the second metric. For example, the service provider server 240 may provide the user A 120A with the graphical representation 635 of FIG. 6.

Figure 13:
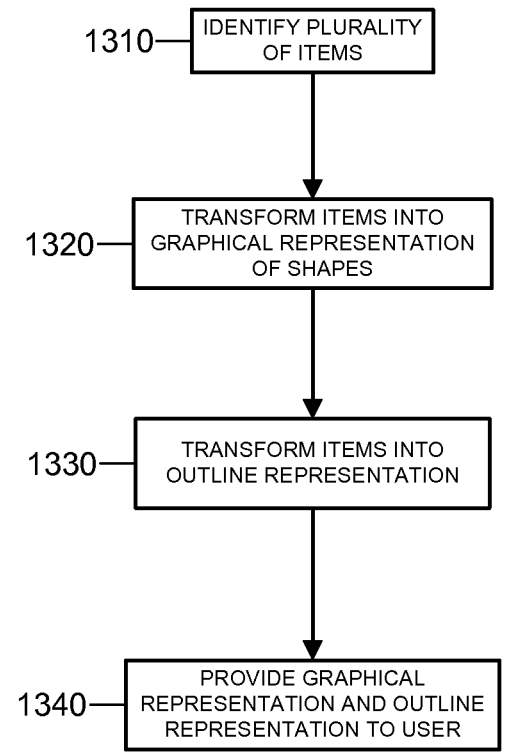
FIG. 13 is a flowchart illustrating the operations of providing a hybrid display of items in the system of FIG. 1, or other systems for displaying a plurality of associated items in a collaborative environment.

FIG. 13 is a flowchart illustrating the operations of providing a hybrid display of items in the system of FIG. 1, or other systems for displaying a plurality of associated items in a collaborative environment. The steps of FIG. 13 are described as being performed by the service provider server 240. However, the steps may be performed by the operating system of the service provider server 240, a processor of the service provider server 240, any other hardware component of the server 240, or any combination thereof. Alternatively the steps may be performed by an external hardware component, an external software process, or any combination thereof.

At step 1310, the service provider server 240 may identify a plurality of items in a collaborative environment. The plurality of items may include an initial item and items innovated from the initial item. Each item may be associated with the item it was innovated from. At step 1320, the service provider server 240 may transform the plurality of items into a graphical representation. Each item in the plurality of items may be represented by a shape in the graphical representation, such as a circle, and the association between items may be represented as a line between the shapes. The graphical representation 635 of FIG. 6 may provide an example of a graphical representation of the items.

At step 1330, the service provider server 240 may transform the plurality of items into an outline representation. Each item in the outline representation may be represented by a textual name or description of the item. Items innovated from an item may appear indented and below the item it was innovated from. The outline representation 662 of FIG. 6C may provide an example of an outline representation of the items.

At step 1340, the service provider server 240 may provide the graphical representation and the outline representation to the user A 120A, such as through a device of the user A 120A. For example, the service provider server 240 may provide the graphical representation 635 of FIG. 6 and the outline representation 662 of FIG. 6C to the user A 120A. The graphical representation 635 and the outline representation may 662 be displayed simultaneously to the user A 120A and may be synchronized. For example, when the user A 120A navigates through either representation, the navigation is reflected in both representations. In addition, when the user A 120A selects an item in either representation, the selection is reflected in both representations.

Figure 14:
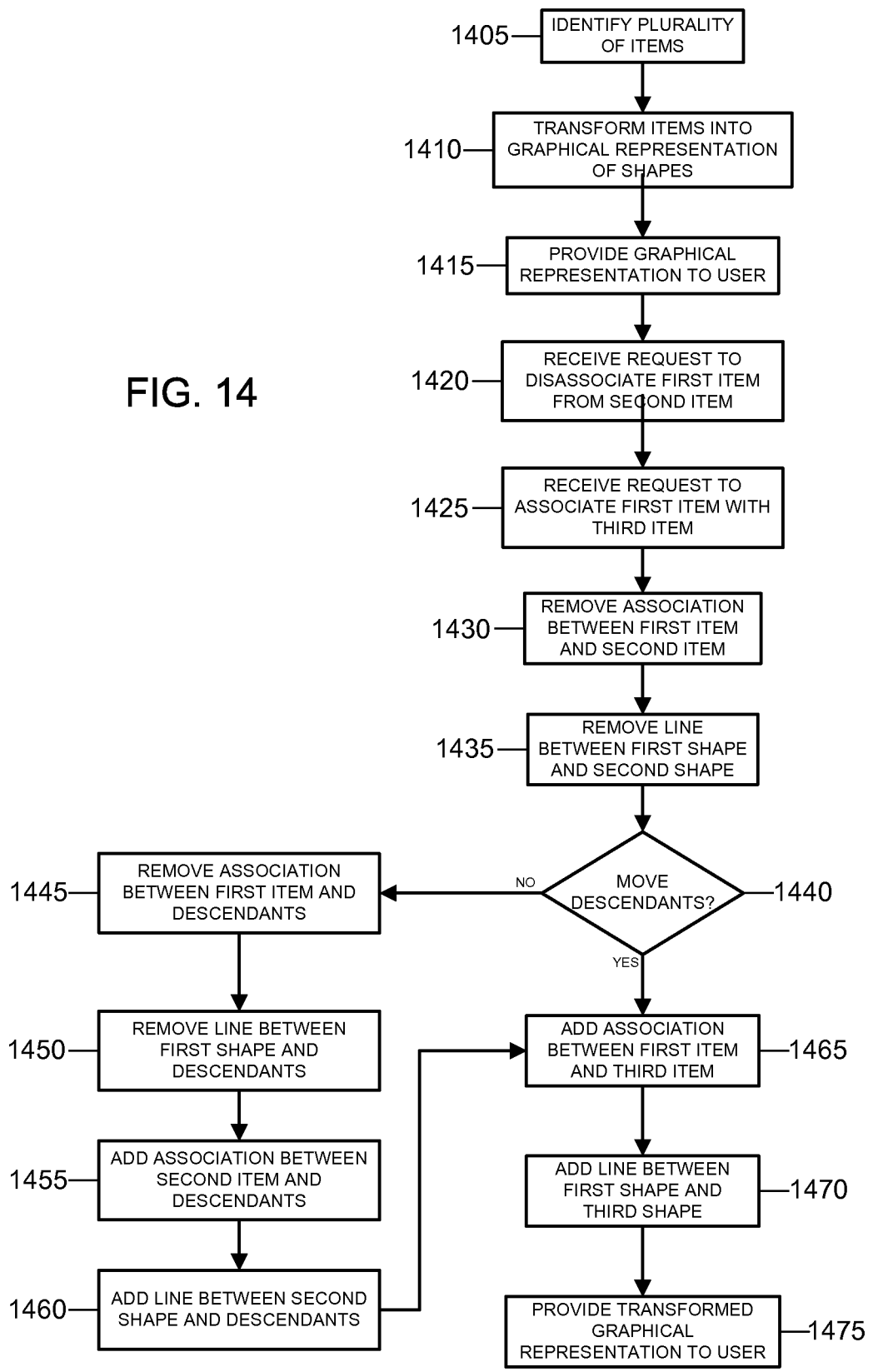
FIG. 14 is a flowchart illustrating the operations of moving an item in the system of FIG. 1, or other systems for displaying a plurality of associated items in a collaborative environment.

FIG. 14 is a flowchart illustrating the operations of moving an item in the system of FIG. 1, or other systems for displaying a plurality of associated items in a collaborative environment. The steps of FIG. 14 are described as being performed by the service provider server 240. However, the steps may be performed by the operating system of the service provider server 240, a processor of the service provider server 240, any other hardware component of the server 240, or any combination thereof. Alternatively the steps may be performed by an external hardware component, an external software process, or any combination thereof.

At step 1405, the service provider server 240 may identify a plurality of items in a collaborative environment. The plurality of items may include an initial item and items innovated from the initial item. Each item may be associated with the item it was innovated from. At step 1410, the service provider server 240 may transform the plurality of items into a graphical representation. Each item in the plurality of items may be represented by a shape in the graphical representation, such as a circle, and the association between items may be represented as a line between the shapes.

At step 1415, the service provider server 240 may provide the graphical representation to the user A 120A, such as through a device of the user A 120A. For example, the service provider server 240 may provide the graphical representation 635 of FIG. 6 to the user A 120A. At step 1420, the service provider server 240 may receive a request from the user to disassociate a first item in the graphical representation from a second item in the graphical representation. For example, the user A 120A may select a shape representing an item in the graphical representation 635 of FIG. 6 and may click on the move/convert button 655.

At step 1425, the service provider server 240 may receive a request to associate the first item with a third item. For example, the user A 120A may select a destination item 1125 from the destination items table 1120 of FIG. 11C. At step 1430, the service provider server 240 may remove the association between the first item and the second item. For example, the service provider server 240 may delete a row or a field in the data store 245 which stores the association between the first item and the second item.

At step 1435, the service provider server 240 may remove the line between the first shape and the second shape in the graphical representation. For example, the service provider server 240 may delete the line connecting the first shape and the second shape in the graphical representation. At step 1440, the service provider server 240 determines whether the user A 120A wishes to move the descendants of the first item to the third item. For example, the service provider server 240 may provide the user A 120A with the move item options interface 1100B. In the move item options interface 1100B, the user A 120A may select to move the descendants with the first item by clicking on the move with descendants button 1116. Alternatively, the user A 120A may select to only move the first item by clicking on move only this item button 1117.

If, at step 1440, the service provider server 240 determines that the user A 120A selected to move only the first item, the service provider server 240 moves to step 1445. At step 1445, the service provider server 240 removes the association between the first item and its descendants. For example, the service provider server 240 may delete a row or a field in the data store 245 which stores the association between the first item and its descendants. At step 1450, the service provider server 240 may remove the line from the first shape and its descendants, such as by deleting the line connecting the first shape and its descendants in the graphical representation.

At step 1455, the service provider server 240 adds an association between the second item and the descendants of the first item. For example, the service provider server 240 may add a record or field to the data store 245 indicating that the descendants of the first item are now associated with the second item. At step 1460, the service provider server 240 may add a line between the second item and the descendants of the first item in the graphical representation. For example, the service provider server 240 may add a line connecting the descendants of the first item and the second item in the graphical representation.

If, at step 1440, the service provider server 240 determines that the user A 120A selected to move the first item and its descendants, the service provider server 240 moves to step 1465. At step 1465, the service provider server 240 adds an association between the first item and the third item. For example, the service provider server 240 may add a row or field to the data store 245 indicating that the first item is associated with the third item. At step 1470, the service provider server 240 adds a line between the first shape and the third shape in the graphical representation. For example, the service provider server 240 may add a line connecting the first shape and the third shape in the graphical representation.

At step 1475, the service provider server 240 may provide the transformed graphical representation to the user A 120A, such as through a device of the user A 120A. For example, the service provider server 240 may provide the graphical representation 635 of FIG. 6 to the user A 120A.

Figure 15:
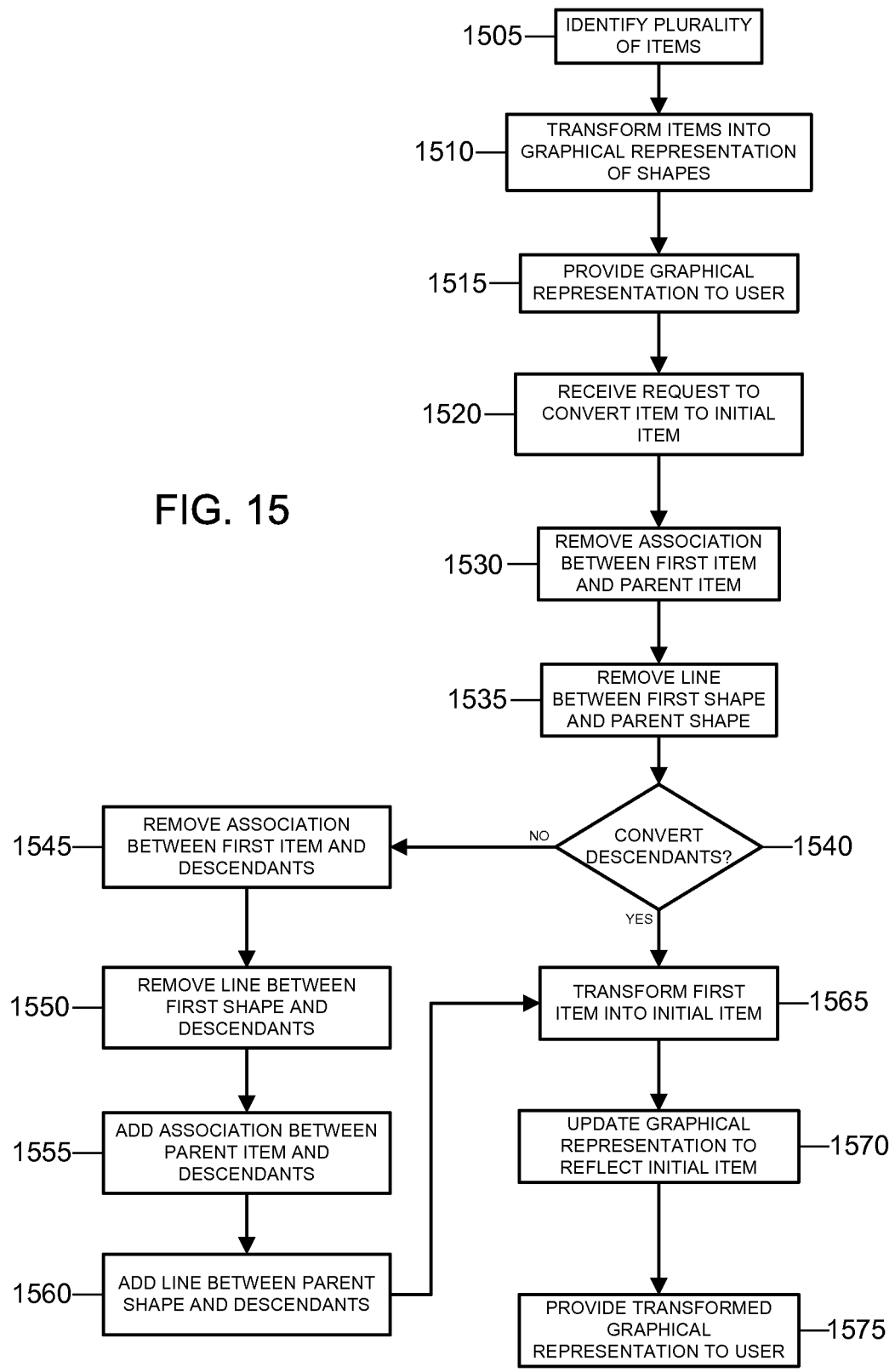
FIG. 15 is a flowchart illustrating the operations of converting an item into an initial item in the system of FIG. 1, or other systems for displaying a plurality of associated items in a collaborative environment.

FIG. 15 is a flowchart illustrating the operations of converting an item into an initial item in the system of FIG. 1, or other systems for displaying a plurality of associated items in a collaborative environment. The steps of FIG. 15 are described as being performed by the service provider server 240. However, the steps may be performed by the operating system of the service provider server 240, a processor of the service provider server 240, any other hardware component of the server 240, or any combination thereof. Alternatively the steps may be performed by an external hardware component, an external software process, or any combination thereof.

At step 1505, the service provider server 240 may identify a plurality of items in a collaborative environment. The plurality of items may include an initial item and items innovated from the initial item. Each item may be associated with the item it was innovated from. At step 1510, the service provider server 240 may transform the plurality of items into a graphical representation. Each item in the plurality of items may be represented by a shape in the graphical representation, such as a circle, and the association between items may be represented as a line between the shapes.

At step 1515, the service provider server 240 may provide the graphical representation to the user A 120A, such as through a device of the user A 120A. For example, the service provider server 240 may provide the graphical representation 635 of FIG. 6 to the user A 120A. At step 1520, the service provider server 240 may receive a request from the user to convert a first item into an initial item. For example, the user A 120A may select a shape representing an item in the graphical representation 635 of FIG. 6 and may click on the move/convert button 655.

At step 1530, the service provider server 240 may remove the association between the first item and its parent item. The parent item may be the item the first item was innovated from. For example, the service provider server 240 may delete a row or a field in the data store 245 which stores the association between the first item and its parent item. At step 1535, the service provider server 240 may remove the line between the first shape and its parent shape in the graphical representation. For example, the service provider server 240 may delete the line connecting the first shape and its parent shape. At step 1540, the service provider server 240 determines whether the user A 120A wishes to convert the first item and its descendants to the initial item. For example, the service provider server 240 may provide the user A 120A with the convert item options interface 1100E. In the convert item options interface 1100E, the user A 120A may select to convert the first item and its descendants by clicking on the convert with descendants button 1131. Alternatively, the user A 120A may select to only convert the first item by clicking on convert only this item button 1132.

If, at step 1540, the service provider server 240 determines that the user A 120A selected to convert only the first item, the service provider server 240 moves to step 1545. At step 1545, the service provider server 240 removes the association between the first item and its descendants. For example, the service provider server 240 may delete a row or a field in the data store 245 which stores the association between the first item and its descendants. At step 1550, the service provider server 240 may remove the line from the first shape and its descendants from the graphical representation, such as by deleting the line connecting the first shape and its descendants in the graphical representation.

At step 1555, the service provider server 240 may add an association between the parent item of the first item and the descendants of the first item. For example, the service provider server 240 may add a record or field to the data store 245 indicating that the descendants of the first item are now associated with the parent item of the first item. At step 1560, the service provider server 240 may add a line between the parent item and the descendants of the first item in the graphical representation. For example, the service provider server 240 may add a line connecting the descendants of the first item and the parent item in the graphical representation.

If, at step 1540, the service provider server 240 determines that the user A 120A selected to convert the first item and its descendants, the service provider server 240 moves to step 1565. At step 1565, the service provider server 240 transforms the first item into an initial item. For example, the service provider server 240 may modify a field or record in the data store 245 to indicate that the first item is now an initial item. At step 1570, the service provider server 240 updates the graphical representation to reflect that the first item was transformed into an initial item.

At step 1575, the service provider server 240 may provide the updated graphical representation to the user A 120A, such as through a device of the user A 120A. For example, the service provider server 240 may provide the graphical representation 635 of FIG. 6 to the user A 120A.

Figure 16:
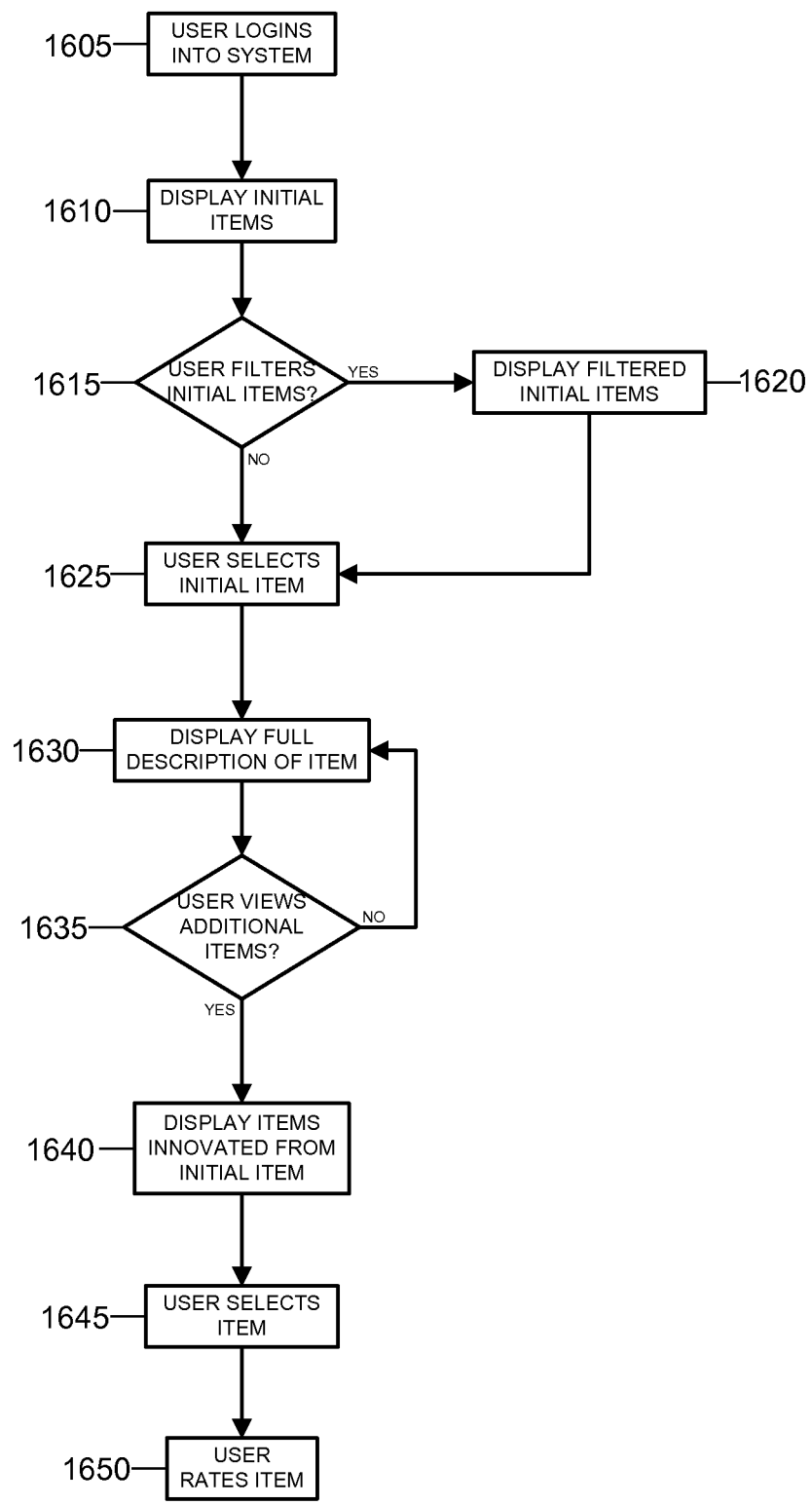
FIG. 16 is a flowchart illustrating the operations of rating an item in the system of FIG. 1, or other systems for displaying a plurality of associated items in a collaborative environment.

FIG. 16 is a flowchart illustrating the operations of rating an item in the system of FIG. 1, or other systems for displaying a plurality of associated items in a collaborative environment. The steps of FIG. 16 are described as being performed by the service provider server 240. However, the steps may be performed by the operating system of the service provider server 240, a processor of the service provider server 240, any other hardware component of the server 240, or any combination thereof. Alternatively the steps may be performed by an external hardware component, an external software process, or any combination thereof.

At step 1605, one of the users 120A-N, such as the user A 120A, may log into the service provider server 240, such as by using the user login interface 300. At step 1610, the service provider server 240 may display the existing initial items to the user A 120A, such as in the initial item selection interface 400. At step 1615, the user A 120A may use the initial item selection interface 400 to filter the one or more displayed initial items. If the user A 120A chooses to filter the initial items then the service provider server 240 moves to step 1620.

At step 1620, the service provider server 240 displays the filtered initial items to the user A 120A.

If the user A 120A does not filter the initial items at step 1615, the service provider server 240 moves to step 1625. At step 1625, the user A 120A may use the initial item selection interface 400 to select an initial item. At step 1630, the service provider server 240 may display the full description of the item selected by the user A 120A, such as through the initial item details screen 500. At step 1635, the user A 120A may view the items innovated from the selected initial item. If, at step 1635, the user A 120A does not choose to view the items innovated from the selected initial item, the service provider server 240 may return to step 1630. If, at step 1635, the user A 120A chooses to view the items innovated from the selected initial item, the service provider server 240 may move to step 1640.

At step 1640, the service provider server 240 may display the items innovated from the initial item, such as via the initial item collaborative innovation interface 600. The items may be displayed as a tree-like structure in the graphical representation 635. Each item on the graphical collaborative display may be represented by a shape, such as a circle, and each shape may be connected via a line to the shape representing the item it was innovated from. At step 1645, the user A 120A may select a shape representing an item in the graphical representation 635 of the initial item collaborative innovation interface 600. At step 1650, the user A 120A may indicate whether they like or dislike the item represented by the selected shape, such as by clicking on he like it button 644 or the don't like it button 646. The service provider server 240 may store whether the user A 120A likes or dislikes the item represented by the selected shape in the data store 245. The data describing whether the user A 120A likes or dislikes the item may be used to determine the rating of the item.

Figure 17:
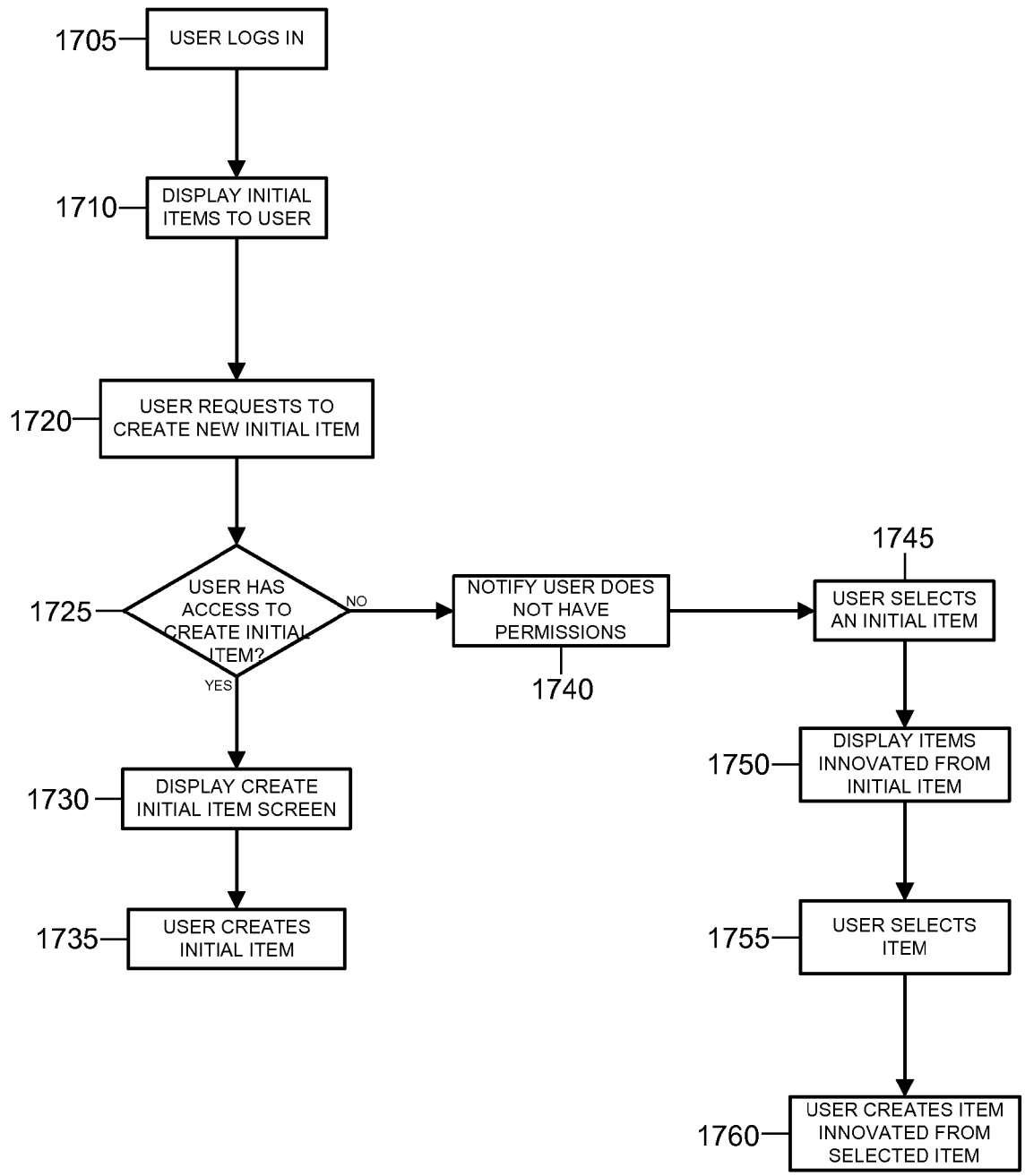
FIG. 17 is a flowchart illustrating the operations of creating an item in the system of FIG. 1, or other systems for displaying a plurality of associated items in a collaborative environment.

FIG. 17 is a flowchart illustrating the operations of creating an item in the system of FIG. 1, or other systems for displaying a plurality of associated items in a collaborative environment. The steps of FIG. 17 are described as being performed by the service provider server 240. However, the steps may be performed by the operating system of the service provider server 240, a processor of the service provider server 240, any other hardware component of the server 240, or any combination thereof. Alternatively the steps may be performed by an external hardware component, an external software process, or any combination thereof.

At step 1705, one of the content providers 1100A-N or one of the users 120A-N, such as the user A 120A, may log into the service provider server 240, such as via the user login interface 300. At step 1710, the service provider server 240 may display the existing initial items to the user A 120A, such as via the initial item selection interface 400. At step 1720, the user A 120A may request to create a new initial item, such as via the initial item selection interface 400. At step 1725, the service provider server 240 may determine whether the user A 120A has sufficient permissions to create a new initial item. If the service provider server 240 determines the user A 120A has sufficient permissions to create a new initial item, the service provider server 240 may move to step 1730. At step 1730, the service provider server 240 may display a create initial item interface to the user A 120A. The create initial item interface may allow the user A 120A to create one or more initial items. At step 1735, the user A 120A may use the create new initial item interface to create a new initial item.

If, at step 1725, the service provider server 240 determines that the user A 120A does not have sufficient permissions to create a new initial item, the service provider server 240 may move to step 1740. At step 1740, the service provider server 240 may notify the user A 120A that the user A 120A does not have the necessary permissions to create an initial item. The service provider server 240 may then display the initial item selection interface 400, where the user may create an item innovated from an existing item or initial item. At step 1745, the user A 120A may select an initial item, such as from the initial item selection interface 400. At step 1750, the service provider server 240 may display items innovated from the selected initial item, such as via the graphical representation 635 of the initial item collaborative innovation interface 600. At step 1755, the user A 120A may select a shape representing an item in the initial item collaborative innovation interface 600. The selected shape may represent the initial item, or any item innovated from the initial item. At step 1760, the user A 120A may create an item innovated from the selected item, such as by entering the item into the item enhancement field 648 and clicking the enhance button 652. Alternatively or in addition, an item innovated from another item may also be referred to as an enhancement of the initial item.

Figure 18:
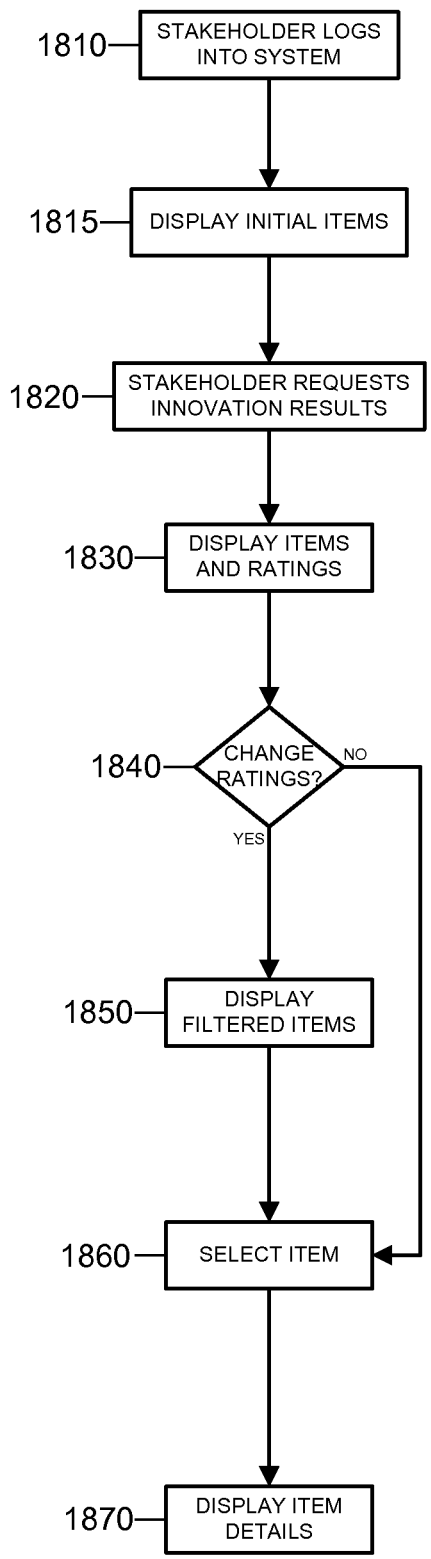
FIG. 18 is a flowchart illustrating the operations of viewing an initial item summary in the system of FIG. 1, or other systems for displaying a plurality of associated items in a collaborative environment.

FIG. 18 is a flowchart illustrating the operations of viewing an initial item summary in the system of FIG. 1, or other systems for displaying a plurality of associated items in a collaborative environment. The steps of FIG. 18 are described as being performed by the service provider server 240. However, the steps may be performed by the operating system of the service provider server 240, a processor of the service provider server 240, any other hardware component of the server 240, or any combination thereof. Alternatively the steps may be performed by an external hardware component, an external software process, or any combination thereof.

At step 1810 one of the content providers 110A-N, such as the content provider A 110A, may log into the service provider server 240, such as via the user login interface 300. Alternatively or in addition, one of the users 120A-N with proper permissions may log into the service provider server 240. At step 1815, the service provider server 240 may display the initial items to the content provider A 110A, such as via the initial item selection interface 400. At step 1820, the content provider A 110A may select an initial item and request to view the collaborative innovation results associated with the initial item.

At step 1830, the service provider server 240 may display the results of the collaborative innovation process for the selected initial item. The results may be displayed as an ordered list of innovated items ordered based on the ratings received from the users 120A-N. Alternatively or in addition the ratings received from the users 120A-N may be used as one factor in an overall ratings calculation for each item. Additional factors used in the ratings calculation may include the number of ratings the item received, the number of views the item received, the number of unique viewers of the item, or generally any factor that may indicate the value of the item. At step 1840, the content provider A 110A may change the weight applied to each factor incorporated in such a ratings calculation. If, at step 1840, the content provider A 110A selects to change the weight applied to each factor in the ratings calculation, the service provider server 240 may move to step 1850. At step 1850, the service provider server 240 may re-calculate the rating of the items displayed in the results list in accordance with the weight for each factor identified by the content provider A 110A. If, at step 1840, the content provider A 110A does not choose to re-weight the factors used in the rating calculation, the service provider server 240 may move to step 1860.

At step 1860, the content provider A 110A may select an item displayed in the results list. At step 1870, the service provider server 240 may display the details associated with the item to the content provider A 110A. The details may include a description of the item, the rating of the item, the date the item was created, the creator of the item, or generally any information that may be of value to the content provider A 110A.

Figure 19:
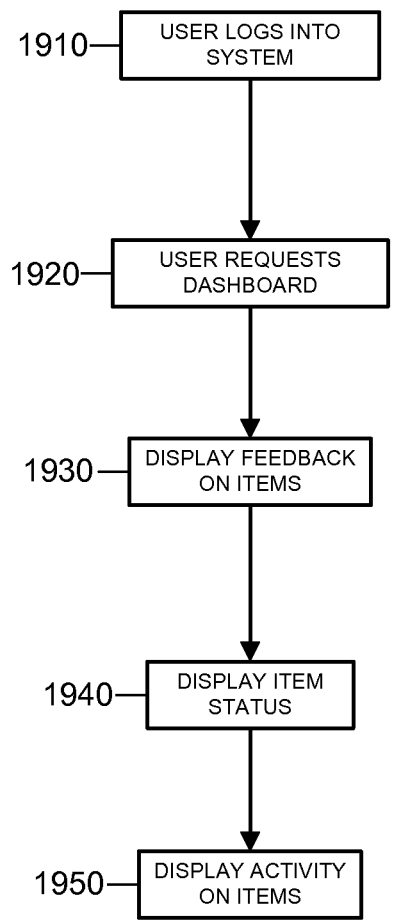
FIG. 19 is a flowchart illustrating the operations of displaying user dashboard information in the system of FIG. 1, or other systems for displaying a plurality of associated items in a collaborative environment.

FIG. 19 is a flowchart illustrating the operations of displaying user dashboard information in the system of FIG. 1, or other systems for displaying a plurality of associated items in a collaborative environment. The steps of FIG. 19 are described as being performed by the service provider server 240. However, the steps may be performed by the operating system of the service provider server 240, a processor of the service provider server 240, any other hardware component of the server 240, or any combination thereof. Alternatively the steps may be performed by an external hardware component, an external software process, or any combination thereof.

At step 1910, the user A 120A may log into the service provider server 240, such as via the user login interface 300. At step 1920, the user A 120A may request to view the user dashboard screen 800, such as by clicking on the dashboard button 412. At step 1930, the service provider server 240 may display the feedback on items given by the user A 120A, such as via the user dashboard screen 800. The feedback on items given by the user A 120A may be displayed in one or more graphs, such as the feedback graph 814. At step 1940, the service provider server 240 may display the item status of the user A 120A, such as the current items of the user A 120A and/or the historical items of the user A 120A. At step 1950, the service provider server 240 may display the activity on the items of the user A 120A. The activity on the items of the user A 120A may be displayed as one or more graphs. The activity on the items of the user A 120A may include data describing the feedback given by the other users 120B-N on the items of the user A 120A. The user A 120A may use the data displayed by the user dashboard screen 800 to manage their interactions with the service provider server 240.

FIG. 20 illustrates a computer system 2000, which may represent a service provider server 240, a third party server 250, the client applications 210A-N, 220A-N, or any of the other computing devices referenced herein. The computer system 2000 may include a set of instructions 2024 that may be executed to cause the computer system 2000 to perform any one or more of the methods or computer based functions disclosed herein. The computer system 2000 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 2000 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 2024 (sequential or otherwise) that specify actions to be taken by that machine. In a particular embodiment, the computer system 2000 may be implemented using electronic devices that provide voice, video or data communication. Further, while a single computer system 2000 may be illustrated, the term "system" shall also be taken to include any collection of systems or subsystems that individually or jointly execute a set, or multiple sets, of instructions to perform one or more computer functions.

As illustrated in FIG. 20, the computer system 2000 may include a processor 2002, such as, a central processing unit (CPU), a graphics processing unit (GPU), or both. The processor 2002 may be a component in a variety of systems. For example, the processor 2002 may be part of a standard personal computer or a workstation. The processor 2002 may be one or more processors, digital signal processors, application specific integrated circuits, field programmable gate arrays, servers, networks, digital circuits, analog circuits, combinations thereof, or other now known or later developed devices for analyzing and processing data. The processor 2002 may implement a software program, such as code generated manually (i.e., programmed).

The computer system 2000 may include a memory 2004 that can communicate via a bus 2008. The memory 2004 may be a main memory, a static memory, or a dynamic memory. The memory 2004 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 2004 may include a cache or random access memory for the processor 2002. Alternatively or in addition, the memory 2004 may be separate from the processor 2002, such as a cache memory of a processor, the system memory, or other memory. The memory 2004 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 2004 may be operable to store instructions 2024 executable by the processor 2002. The functions, acts or tasks illustrated in the figures or described herein may be performed by the programmed processor 2002 executing the instructions 2024 stored in the memory 2004. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system 2000 may further include a display 2014, such as a liquid crystal display (LCD), an organic light emitting diode (OLED), a flat panel display, a solid state display, a cathode ray tube (CRT), a projector, a printer or other now known or later developed display device for outputting determined information. The display 2014 may act as an interface for the user to see the functioning of the processor 2002, or specifically as an interface with the software stored in the memory 2004 or in the drive unit 2006.

Additionally, the computer system 2000 may include an input device 2012 configured to allow a user to interact with any of the components of system 2000. The input device 2012 may be a number pad, a keyboard, or a cursor control device, such as a mouse, or a joystick, touch screen display, remote control or any other device operative to interact with the system 2000.

The computer system 2000 may also include a disk or optical drive unit 2006. The disk drive unit 2006 may include a computer-readable medium 2022 in which one or more sets of instructions 2024, e.g. software, can be embedded. Further, the instructions 2024 may perform one or more of the methods or logic as described herein. The instructions 2024 may reside completely, or at least partially, within the memory 2004 and/or within the processor 2002 during execution by the computer system 2000. The memory 2004 and the processor 2002 also may include computer-readable media as discussed above.

The present disclosure contemplates a computer-readable medium 2022 that includes instructions 2024 or receives and executes instructions 2024 responsive to a propagated signal; so that a device connected to a network 235 may communicate voice, video, audio, images or any other data over the network 235. Further, the instructions 2024 may be transmitted or received over the network 235 via a communication interface 2018. The communication interface 2018 may be a part of the processor 2002 or may be a separate component. The communication interface 2018 may be created in software or may be a physical connection in hardware. The communication interface 2018 may be configured to connect with a network 235, external media, the display 2014, or any other components in system 2000, or combinations thereof. The connection with the network 235 may be a physical connection, such as a wired Ethernet connection or may be established wirelessly as discussed below. Likewise, the additional connections with other components of the system 2000 may be physical connections or may be established wirelessly. In the case of a service provider server 240 or the content provider servers 110A-N, the servers may communicate with users 120A-N through the communication interface 2018.

The network 235 may include wired networks, wireless networks, or combinations thereof. The wireless network may be a cellular telephone network, an 802.11, 802.16, 802.20, or WiMax network. Further, the network 235 may be a public network, such as the Internet, a private network, such as an intranet, or combinations thereof, and may utilize a variety of networking protocols now available or later developed including, but not limited to TCP/IP based networking protocols.

The computer-readable medium 2022 may be a single medium, or the computer-readable medium 2022 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 2022 may include a solid-state memory such as a memory card or other package that houses one or more non-volatile read-only memories. The computer-readable medium 2022 also may be a random access memory or other volatile re-writable memory. Additionally, the computer-readable medium 2022 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

We claim:

1. A computer-implemented method for providing a graphical representation of a plurality of items in a collaborative innovation environment, the method comprising:
   initiating a collaborative innovation process with a seed item wherein the seed item includes an idea, a question, an opinion or a statement for which a result is sought, and innovating one or more idea items directly or indirectly in response to the seed item to determine the result for the seed item based on the one or more idea items in the collaborative innovation process, wherein the seed item and the one or more idea items comprise a plurality of items;

providing, by a processor to a device of a user, a list of a plurality of seed items in a graphical user interface;

providing, by the processor to the device of the user in the graphical user interface, a graphical representation of the plurality of items including a seed item selected by the user from the plurality of seed items and one or more idea items innovated in response to the selected seed item, each item of the plurality of items having an association with at least one other item in the graphical representation, wherein each item of the plurality of items is represented by a shape and the association of each item with the at least one other item is represented by a line between each shape representing each item and each shape representing the at least one other item, wherein the line between each shape representing each item and each shape representing the at least one other item identifies whether the item is an idea item that was innovated from the at least one other item;

receiving, by the processor from the device of the user, a request to associate a first metric of the plurality of items with a size of each shape representing each respective item, wherein the size of each shape is based on a first value of the first metric of each respective item;

receiving, by the processor from the device of the user, a request to associate a second metric of the plurality of items with a color of each shape representing each respective item, wherein the color of each shape is based on a second value of the second metric of each respective item;

transforming, by the processor, the graphical representation of the plurality of items such that the size of each shape representing each respective item is based on the first value of the first metric of each respective item and the color of each shape representing each respective item is based on the second value of the second metric of each respective item;

transforming, by the processor, the plurality of items into a textual outline representation of the plurality of items;

providing, by the processor to the device of the user, the transformed graphical representation and the textual outline representation of the plurality of items in the graphical user interface, wherein the transformed graphical representation of the plurality of items and the textual outline representation of the plurality of items are simultaneously displayed on the device of the user in a graphical representation display area and a textual outline display area respectively, wherein the graphical representation display area and the textual outline display area are each a responsive display area to each other;

responsively, reflecting actions performed in either the graphical representation display area or the textual outline display area in the responsive display area of the other, including:
  creating an item innovated from one of the plurality of items in the responsive display area of the other in instances when one of the plurality of items is selected and when a selection is received from a user selection made in either the graphical representation display area or the textual outline display area; and receiving, by the processor from the device of the user, a request to search through a set of idea items of the plurality of items based on a characteristic of an idea item, wherein the set of idea items to be searched based on the characteristic is determined based on a user selection that indicates whether to search all of the one or more idea items or to search only a subset of the one or more idea items that have received a specified rating;

moving a user-selected one item of the plurality of items having an association with the at least one other item in the graphical representation to a user-selected destination by:
  disassociating the user-selected one item of the plurality of items from an item it was innovated from;
  associating the user-selected one item of the plurality of items with another item based on user input;
  providing by the processor to the device of the user a preview for display of the graphical representation including the moved user-selected one item of the plurality of items to the destination item; and
  allowing the user to cancel or confirm the move of the user-selected one item of the plurality of items;
  wherein in response to a click of a move descendants button in a user interface by the user, including the descendants of the user-selected one item of the plurality of items in the moving of the user-selected one item of the plurality of items to the user-selected destination, and including the descendants of the moved user-selected one item of the plurality of items in the preview for display of the graphical representation;

in response to a click of a like it button or a click of a don't like it button in the graphical user interface, entering a rating of a selected item in the graphical user interface;

in response to a click of an enhance button in the graphical user interface allowing a user to create an item enhancing a selected item in the graphical user interface;

in response to a click of an edit button in the graphical user interface allowing a user to edit a selected item in the graphical user interface; and in response to a click of a delete button in the graphical user interface deleting a selected item in the graphical user interface;

wherein the graphical user interface includes the like it button, the don't like it button, the enhance button, the edit button and the delete button.

2. The computer-implemented method of claim 1 wherein the size of each shape increases as the first value of the first metric of each item increases and the size of each shape decreases as the first value of the first metric of each item decreases.

3. The computer-implemented method of claim 1 wherein the size of each shape decreases as the first value of the first metric of each item increases, and the size of each shape increases as the first value of the first metric of each item decreases.

4. The computer implemented method of claim 1 wherein the size of each shape increases as the first value of the first metric of each item approaches a best value for the first metric, and the size of each shape decreases as the first value of the first metric of each item approaches a worst value for the first metric.

5. The computer-implemented method of claim 1 wherein the color of each shape becomes a first color as the second value of the second metric of each item increases and the color of each shape becomes a second color as the second value of the second metric of each item decreases.

6. The computer-implemented method of claim 5 wherein the color of each shape becomes a blend of the first color and the second color as the second value of the second metric increases or decreases.

7. The computer-implemented method of claim 6 wherein an amount of the first color in the blend of the first color and the second color increases as the second value of the second metric of each item increases.

8. The computer-implemented method of claim 6 wherein an amount of the second color in the blend of the first color and the second color increases as the second value of the second metric of each item decreases.

9. The computer-implemented method of claim 1 wherein the first metric comprises at least one of a number of views of each item, an age of each item, a status of each item, a rating of each item, a number of times each items was shared, a number of total votes each item received, a geographic location of a user who provided the each item, or a department the user who provided each item belongs to.

10. The computer-implemented method of claim 1 wherein the second metric comprises at least one of a number of views of each item, an age of each item, a status of each item, a rating of each item, a number of times each items was shared, a number of total votes each item received, a geographic location of a user who provided the each item, or a department the user who provided each item belongs to.

11. The computer-implemented method of claim 1 wherein each shape comprises a geometric shape.

12. The computer-implemented method of claim 1 wherein the graphical representation comprises a hierarchical structure.

13. The computer-implemented method of claim 1 further comprising receiving the plurality of items from a plurality of users.

14. The computer-implemented method of claim 1 wherein an item of the plurality of items has the association with another item if the item was innovated from the other item or if the other item was innovated from the item.

15. The computer-implemented method of claim 1 further comprising, displaying a result of the collaborative innovation processes as an ordered list of one or more of the items innovated directly or indirectly from the seed item, wherein the result is relative to the content of the seed item and wherein the ordered list is ordered based on ratings received from one or more users, or based on one or more metrics associated with the plurality of items.

16. The computer-implemented method of claim 1 further comprising, adding a tag to a user selected item which is selected by the user from the plurality of items, wherein the user selected item is represented as a shape and selected by the user from the graphical representation, or the user selected item is represented by the outline representation and selected by the user from the outline representation, and wherein the tag associates the user selected item with one or more searchable keywords.

17. The computer implemented method of claim 1 further comprising, providing to a display of a user, details about the selected seed item including a creator of the seed item, the creation date of the seed item, the number of items innovated from the seed item, the total number of views of the seed item and the number of unique viewers of the seed item.

18. The computer implemented method of claim 1 further comprising, in response to a click of a toggle button in the graphical user interface, toggling between the graphical representation of the plurality of items and the outline representation of the plurality of items.

19. The computer implemented method of claim 1 further comprising:
in response to a click of a like it button or a click of a don't like it button in the graphical user interface enter a rating of a selected item in the graphical user interface;
in response to a click of an enhance button in the graphical user interface allow a user to create an item enhancing a selected item in the graphical user interface;
in response to a click of an edit button in the graphical user interface allow a user to edit a selected item in the graphical user interface; and
in response to a click of a delete button in the graphical user interface delete a selected item in the graphical user interface;
wherein the graphical user interface includes the like it button, the don't like it button, the enhance button, the edit button and the delete button.

20. The computer implemented method of claim 1 further comprising, converting a user selected one of the plurality of items having an association with the at least one other item in the graphical representation into a new seed item by:
disassociating the user selected one of the plurality of items from an item it was innovated from;
transforming the selected one of the plurality of items to the new seed item;
providing by the processor to the device of the user a preview for display of the graphical representation including the new seed item; and
allowing the user to cancel or confirm the conversion of the user selected item to the new seed item.

21. The computer implemented method of claim 20 further comprising, in response to a click of a button in a user interface by a user, including the descendants of the user selected one of the plurality of items in the conversion of the user selected one of the plurality of items to a seed item, and including the descendants of the user selected one of the plurality of items in the preview for display of the graphical representation including the new seed item as descendants of the new seed item.

22. A computer-implemented method for providing a graphical representation of a plurality of items in a collaborative innovation environment, the method comprising:
initiating a collaborative innovation process with a seed item wherein the seed item includes an idea, a question, an opinion or a statement for which a result is sought, and innovating one or more idea items directly or indirectly in response to the seed item to determine the result for the seed item based on the one or more idea items in the collaborative innovation process, wherein the seed item and the one or more idea items comprise a plurality of items;
providing by a processor to a device of a user a list of a plurality of seed items in a graphical user interface;
identifying, by the processor, a plurality of items including a seed item selected by the user from the plurality of seed items and a plurality of idea items innovated in response to the selected seed item by a plurality of users in the collaborative innovation environment, each of the plurality of items having an association with at least one other item;
transforming, by the processor, the plurality of items into a graphical representation in the graphical user interface, wherein each item of the plurality of items is represented by a shape and the association of each item with the at least one other item is represented by a line between each shape representing each item and each shape representing the at least one of other item, wherein the line between each shape representing each item and each shape representing the at least one other item identifies whether the item was innovated from the at least one other item;

transforming, by the processor, the plurality of items into a textual outline representation of the plurality of items;

providing, by the processor to a device of a user in the graphical user interface, the graphical representation and the textual outline representation, wherein the graphical representation and the textual outline representation are simultaneously displayed on the device of the user in a graphical display area and a textual outline display area respectively, wherein the graphical representation display area and the textual outline display area are each a responsive display area to each other;

responsively, reflecting actions performed in either the graphical representation display area or the textual outline display area in the responsive display area of the other, including:
 creating an item innovated from one of the plurality of items in the responsive display area of the other in instances when one of the plurality of items is selected and when a selection is received from a user selection made in either the graphical representation display area or the outline display area;

receiving, by the processor from the device of the user, a request to search through a set of idea items of the plurality of items, wherein the set of idea items to be searched is determined based on a user selection that indicates whether to search all of the plurality of idea items or to search only a subset of the plurality of idea items that have received a specified rating;

moving a user-selected one item of the plurality of items having an association with the at least one other item in the graphical representation to a user-selected destination by:
 disassociating the user selected one item of the plurality of items from an item it was innovated from;
 associating the selected one item of the plurality of items with another item based on user input;
 providing by the processor to the device of the user a preview for display of the graphical representation including the moved user-selected one item of the plurality of items to the destination item; and
 allowing the user to cancel or confirm the move of the user-selected one item of the plurality of items;
 wherein in response to a click of a move descendants button in a user interface by the user, including the descendants of the user-selected one item of the plurality of items in the moving of the user-selected one of the plurality of items to the user-selected destination, and including the descendants of the moved user-selected one item of the plurality of items in the preview for display of the graphical representation;
 in response to a click of a like it button or a click of a don't like it button in the graphical user interface, entering a rating of a selected item in the graphical user interface;
 in response to a click of an enhance button in the graphical user interface allowing a user to create an item enhancing a selected item in the graphical user interface;
 in response to a click of an edit button in the graphical user interface allowing a user to edit a selected item in the graphical user interface; and
 in response to a click of a delete button in the graphical user interface deleting a selected item in the graphical user interface;
 wherein the graphical user interface includes the like it button, the don't like it button, the enhance button, the edit button and the delete button.

23. The computer-implemented method of claim 22 wherein a color of each shape is based on a first value of a first metric of each item represented by each shape.

24. The computer-implemented method of claim 23 wherein the first metric comprises at least one of a number of views of each item, an age of each item, a status of each item, an age of each item, a status of each item, a rating of each item, a number of times each items was shared, a number of total votes each item received, a geographic location of a user who provided the each item, or a department the user who provided each item belongs to.

25. The computer-implemented method of claim 22 wherein a size of each shape is based on a second value of a second metric of each item represented by each shape.

26. The computer-implemented method of claim 25 wherein the second metric comprises at least one of an age of each item, a status of each item, a rating of each item, a number of times each items was shared, a number of total votes each item received, a geographic location of a user who provided the each item, or a department the user who provided each item belongs to.

27. The computer-implemented method of claim 22 wherein the graphical representation comprises a hierarchical structure.

28. The computer-implemented method of claim 22 further comprising, displaying a result of the collaborative innovation processes as an ordered list of one or more of the items innovated directly or indirectly from the seed item, wherein the result is relative to the content of the seed item and wherein the ordered list is ordered based on ratings received from one or more users, or based on one or more metrics associated with the plurality of items.

29. The computer-implemented method of claim 22 further comprising, adding a tag to a user selected item which is selected by the user from the plurality of items, wherein the user selected item is represented as a shape and selected by the user from the graphical representation, or the user selected item is represented by the outline representation and selected by the user from the outline representation, and wherein the tag associates the user selected item with one or more searchable keywords.

30. A computer-implemented method for modifying a graphical representation of a plurality of items in a collaborative innovation environment, the method comprising:
 initiating a collaborative innovation process with a seed item wherein the seed item includes an idea, a question, an opinion or a statement for which a result is sought, and innovating one or more idea items directly or indirectly in response to the seed item to determine the result for the seed item based on the one or more idea items in the collaborative innovation process, wherein the seed item and the one or more idea items comprise a plurality of items;
 providing, by a processor to a device of a user, a list of a plurality of seed items in a graphical user interface;
 providing, by the processor to the device of the user in the graphical user interface, a graphical representation of a plurality of items including a seed item selected by the user from the plurality of seed items and one or more idea items innovated in response to the selected seed item, each item of the plurality of items having an association with at least one other item the graphical representation, wherein each item of the plurality of items is represented by a shape and the association of each item with the at least one other item is represented by a line between each shape representing each item and each shape representing the at least one of other item, wherein the line between each shape representing each item and each shape representing the at least one other item identifies whether the item is an idea item that was innovated from the at least one other item;

receiving, by a processor, a request to remove a line between a first shape and a second shape and add a line between the first shape and a third shape;

removing, by the processor, the association between the item represented by the first shape and the item represented by the second shape;

transforming, by the processor, the graphical representation to remove the line between the first shape and the second shape;

adding, by the processor, an association between the item represented by the first shape and the item represented by the third shape;

transforming, by the processor, the item represented by the first shape and the item represented by the third shape into textual outline representation;

transforming, by the processor, the graphical representation to display a line between the first shape and the third shape;

displaying the transformed graphical representation and the textual outline representation of the plurality of items, wherein the transformed graphical representation comprising the association represented by the first shape and the item represented by the third shape and the textual outline representation are simultaneously displayed on the device of the user in a graphical representation display area and an textual outline display area, respectively, wherein the graphical representation display area and the textual outline display area are each a responsive display area to each other;

responsively, reflecting actions performed in either the graphical representation display area or the textual outline display area in the responsive display area of the other, including:

creating an item innovated from one of the plurality of items in the responsive display area of the other in instances when one of the plurality of items is selected and when a selection is received from a user selection made in either the graphical representation display area or the textual outline display area; and receiving, by the processor from the device of the user, a request to search through a set of idea items of the plurality of items, wherein the set items to be searched is determined based on a user selection that indicates whether to search all of the one or more idea items or to search only a subset of the one or more idea items that have received a specified rating;

moving a user-selected one item of the plurality of items having an association with the at least one other item in the graphical representation to a user-selected destination by:

disassociating the user-selected one item of the plurality of items from an item it was innovated from;

associating the selected one item of the plurality of items with another item based on user input;

providing by the processor to the device of the user a preview for display of the graphical representation including the moved user-selected one item of the plurality of items to the destination item; and allowing the user to cancel or confirm the move of the user-selected one item of the plurality of items;

wherein in response to a click of a move descendants button in a user interface by the user, including the descendants of the user-selected one item of the plurality of items in the moving of the user-selected one item of the plurality of items, and including the descendants of the moved user-selected one item of the plurality of items in the preview for display of the graphical representation;

in response to a click of a like it button or a click of a don't like it button in the graphical user interface, entering a rating of a selected item in the graphical user interface;

in response to a click of an enhance button in the graphical user interface allowing a user to create an item enhancing a selected item in the graphical user interface;

in response to a click of an edit button in the graphical user interface allowing a user to edit a selected item in the graphical user interface; and in response to a click of a delete button in the graphical user interface deleting a selected item in the graphical user interface;

wherein the graphical user interface includes the like it button, the don't like it button, the enhance button, the edit button and the delete button.

31. The computer-implemented method of claim 30 further comprising providing, by the processor to the device of the user, the transformed graphical representation.

32. The computer-implemented method of claim 30 wherein a color of each shape is based on a first value of a first metric of each item represented by each shape.

33. The computer-implemented method of claim 16 wherein the first metric comprises at least one of an age of each item, a status of each item, a rating of each item, a number of times each items was shared, a number of total votes each item received, a geographic location of a user who provided the each item, or a department the user who provided each item belongs to.

34. The computer-implemented method of claim 30 wherein a size of each shape is based on a second value of a second metric of each item represented by each shape.

35. The computer-implemented method of claim 34 wherein the second metric comprises at least one of an age of each item, a status of each item, a rating of each item, a number of times each item was shared, a number of total votes each item received, a geographic location of a user who provided the each item, or a department the user who provided each item belongs to.

36. The computer-implemented method of claim 30 wherein the graphical representation comprises a hierarchical structure.

37. The computer-implemented method of claim 30 further comprising, displaying a result of the collaborative innovation processes as an ordered list of one or more of the items innovated directly or indirectly from the seed item, wherein the result is relative to the content of the seed item and wherein the ordered list is ordered based on ratings received from one or more users, or based on one or more metrics associated with the plurality of items.

38. The computer-implemented method of claim 30 further comprising, adding a tag to a user selected item which is selected by the user from the plurality of items, wherein the user selected item is represented as a shape and selected by the user from the transformed graphical representation, or the user selected item is represented by the outline representation and selected by the user from the outline representation, and wherein the tag associates the user selected item with one or more searchable keywords.

39. A system for providing a graphical representation of a plurality of items in a collaborative innovation environment, the system comprising:
  a memory to store a plurality of items, each item having an association with at least one other item;
  an interface operatively connected to the memory, the interface operative to communicate with a device of a user; and
  a hardware processor operatively connected to the memory and the interface, the hardware processor operative to:
    receive, from the device of the user, a request to initiate a collaborative innovation process with a seed item wherein the seed item includes an idea, a question, an opinion or a statement for which a result is sought, and to innovate one or more idea items directly or indirectly in response to the seed item to determine the result for the seed item based on the one or more idea items in the collaborative innovation process, wherein the seed item and the one or more idea items comprise the plurality of items;
    provide by the hardware processor to the device of the user, a list of a plurality of seed items in a graphical user interface;
    provide, to the device of the user in the graphical user interface, a graphical representation of the plurality of items including a seed item selected by the user from the plurality of seed items and a plurality of idea items innovated in response to the selected seed item, wherein each item of the plurality of items is represented by a shape and the association of each item with the at least one other item is represented by a line between each shape representing each item and each shape representing the at least one other item, wherein the line between each shape representing each item and each shape representing the at least one other item identifies whether the each item is an idea item that was innovated from the at least one other item,
    receive, from the device of the user, a request to associate a first metric of the plurality of items with a size of each shape representing each respective item, wherein the size of each shape is based on a value of the first metric of each respective item,
    receive, from the device of the user, a request to associate a second metric with a color of each shape representing each respective item, wherein the color of each shape is based on a second value of the second metric of each respective item,
    transform, by the hardware processor, the graphical representation of the plurality of items such that the size of each shape representing each respective item is based on the first value of the first metric of each respective item and the color of each shape representing each item is based on the second value of the second metric of each respective item,
    transform, by the hardware processor, the plurality of items into a textual outline representation of the plurality of items,
    provide, to the device of the user, the transformed graphical representation and the textual outline representation of the plurality of items, wherein the graphical representation comprising the metrics of the idea items and the textual outline representation comprising the textual descriptive information of the plurality of idea items are simultaneously displayed on the device of the user in a graphical representation display area and an textual outline display area respectively, wherein the graphical representation display area and the textual outline display area are each a responsive display area to each other; and
    responsively, reflect actions performed in either the graphical representation display area or the textual outline display area in the responsive display area of the other, by:
      creating an item innovated from one of the plurality of items in the responsive display area of the other in instances when one of the plurality of items is selected and when a selection is received from a user selection made in either the graphical representation display area or the textual outline display area; and
    receiving, by the hardware processor from the device of the user, a request to search through a set of idea items of the plurality of idea items, wherein the set of items to be searched is determined based on a user selection that indicates whether to search all of the plurality of idea items or to search only a subset of the plurality of idea items that have received a specified rating;
    moving a user-selected one item of the plurality of items having an association with the at least one other item in the graphical representation to a user-selected destination by:
      disassociating the user-selected one item of the plurality of items from an item it was innovated from;
      associating the selected one item of the plurality of items with another item based on user input;
      providing by the hardware processor to the device of the user a preview for display of the graphical representation including the moved user-selected one item of the plurality of items to the destination item; and
      allowing the user to cancel or confirm the move of the user-selected one item of the plurality of items;
      wherein in response to a click of a move descendants button in a user interface by the user, including the descendants of the user-selected one item of the plurality of items in the moving of the user-selected one item of the plurality of items to the user-selected destination, and including the descendants of the moved user-selected one item of the plurality of items in the preview for display of the graphical representation;
    in response to a click of a like it button or a click of a don't like it button in the graphical user interface, entering a rating of a selected item in the graphical user interface;
    in response to a click of an enhance button in the graphical user interface allowing a user to create an item enhancing a selected item in the graphical user interface;
    in response to a click of an edit button in the graphical user interface allowing a user to edit a selected item in the graphical user interface; and
    in response to a click of a delete button in the graphical user interface deleting a selected item in the graphical user interface;
    wherein the graphical user interface includes the like it button, the don't like it button, the enhance button, the edit button and the delete button.

40. The system of claim 39 wherein the size of each shape increases as the first value of the first metric of each item increases and the size of each shape decreases as the first value of the first metric of each item decreases.

41. The system of claim 39 wherein the size of each shape decreases as the first value of the first metric of each item increases, and the size of each shape increases as the first value of the first metric of each item decreases.

42. The system of claim 39 wherein the size of each shape increases as the first value of the first metric of each item approaches a best value for the first metric, and the size of each shape decreases as the first value of the first metric of each item approaches a worst value for the first metric.

43. The system method of claim 39 wherein the color of each shape becomes a first color as the second value of the second metric of each item increases and the color of each shape becomes a second color as the second value of the second metric of each item decreases.

44. The system of claim 39 wherein the first metric comprises at least one of an age of each item, a status of each item, a rating of each item, a number of times each items was shared, a number of total votes each item received, a geographic location of a user who provided the each item, or a department the user who provided each item belongs to.

45. The system of claim 39 wherein the second metric comprises at least one of an age of each item, a status of each item, a rating of each item, a number of times each items was shared, a number of total votes each item received, a geographic location of a user who provided the each item, or a department the user who provided each item belongs to.

46. The system of claim 39, wherein the hardware processor is operative to display a result of the collaborative innovation processes as an ordered list of one or more of the items innovated directly or indirectly from the seed item, wherein the result is relative to the content of the seed item and wherein the ordered list is ordered based on ratings received from one or more users, or based on one or more metrics associated with the plurality of items.

47. The system of claim 39, wherein the hardware processor is operable to add a tag to a user selected item which is selected by the user from the plurality of items, wherein the user selected item is represented as a shape and selected by the user from the graphical representation, or the user selected item is represented by the outline representation and selected by the user from the outline representation, and wherein the tag associates the user selected item with one or more searchable keywords.

48. A system for providing a graphical representation of a plurality of items in a collaborative environment, the system comprising:
a hardware processor operatively connected to a memory and an interface;
the memory comprising:
a plurality of items, each item having an association with at least one other item;
the interface operatively connected to the memory;
the hardware processor operable to:
communicate via the interface with a device of a user, wherein a collaborative innovation process is initiated with a seed item wherein the seed item includes an idea, a question, an opinion or a statement for which a result is sought, and one or more idea items are innovated directly or indirectly in response to the seed item, and wherein the plurality of items comprises the seed item and the one or more idea items;
provide by the hardware processor to the device of the user, a list of a plurality of seed items in a graphical user interface;
provide by the hardware processor in the graphical user interface, at least one display area comprising:
a graphical display area for graphically displaying a graphical representation of a plurality of items including a seed item selected by the user from the plurality of seed items and a plurality of idea items innovated in response to the selected seed item, wherein each item of the plurality of items is represented by a shape and the association of each item with the at least one other item is represented by a line between each shape representing each item and each shape representing the at least one other item, wherein the line between each shape representing each item and each shape representing the at least one other item identifies whether the item is an idea item that was innovated from the at least one other item,
the graphical display area comprising:
right, left, top and bottom regions;
a display modifier, in the top left region of the graphical display area, comprising directional controls to navigate the graphical representation, the display modifier operable to receive inputs at the directional controls to navigate the graphical representation up, down, right, and left;
a shape modification section, in the top right region of the graphical display area, operable to:
receive a request to associate a first metric of the plurality of items with a size of each shape representing each respective item, wherein the size of each shape is based on a first value of the first metric of each respective item;
receive a request to associate a second metric with a color of each shape representing each respective item, wherein the color of each shape is based on a second value of the second metric of each respective item;
transform by the hardware processor, the graphical representation of the plurality of items such that the size of each shape representing each respective item is based on the first value of the first metric of each respective item and the color of each shape representing each respective item is based on the second value of the second metric of each respective item;
transform, by the hardware processor, the plurality of items into a textual outline representation of the plurality of items; and
display in the at least one display area the transformed graphical representation and the textual outline representation of the plurality of items, wherein the transformed graphical representation comprising the metrics of the idea items and the textual outline representation comprising textual descriptive information of the plurality of idea items are simultaneously displayed on the device of the user in the graphical representation display area and an outline display area respectively, wherein the graphical representation display area and the outline display area are each a responsive display area to each other; and
responsively, reflect actions performed in either the graphical representation display area or the outline display area in the responsive display area of the other, by:
creating an item innovated from one of the plurality of items in the responsive display area of the other in instances when one of the plurality of items is selected and when a selection is received from a user selection made in either the graphical representation display area or the outline display area; and receive, by the hardware processor from the device of the user, a request to search through a set of idea items of the plurality of idea items, wherein the set items to be searched is determined based on a user selection that indicates whether to search all of the plurality of idea items or to search only a subset of the plurality of idea items that have received a specified rating;

move by the hardware processor, a user-selected one item of the plurality of items having an association with the at least one other item in the graphical representation to a user-selected destination by:
   disassociating the user-selected one item of the plurality of items from an item it was innovated from; and
   associating the selected one item of the plurality of items with another item based on user input;

provide by the hardware processor to the device of the user a preview for display of the graphical representation including the moved user-selected one item of the plurality of items to the destination item; and allow the user to cancel or confirm the move of the user-selected one item of the plurality of items;

wherein in response to a click of a move descendants button in a user interface by the user, including the descendants of the user-selected one item of the plurality of items in the moving of the user-selected one item of the plurality of items to the user-selected destination, and including the descendants of the moved user-selected one item of the plurality of items in the preview for display of the graphical representation;

in response to a click of a like it button or a click of a don't like it button in the graphical user interface, enter a rating of a selected item in the graphical user interface;

in response to a click of an enhance button in the graphical user interface allow a user to create an item enhancing a selected item in the graphical user interface;

in response to a click of an edit button in the graphical user interface allow a user to edit a selected item in the graphical user interface; and in response to a click of a delete button in the graphical user interface delete a selected item in the graphical user interface;

wherein the graphical user interface includes the like it button, the don't like it button, the enhance button, the edit button and the delete button.

49. The system of claim 48, wherein the hardware processor is operative to display a result of the collaborative innovation processes as an ordered list of one or more of the items innovated directly or indirectly from the seed item, wherein the result is relative to the content of the seed item and wherein the ordered list is ordered based on ratings received from one or more users, or based on one or more metrics associated with the plurality of items.

50. The system of claim 48, wherein the hardware processor is operable to add a tag to a user selected item which is selected by the user from the plurality of items, wherein the user selected item is represented as a shape and selected by the user from the graphical representation, or the user selected item is represented by the outline representation and selected by the user from the outline representation, and wherein the tag associates the user selected item with one or more searchable keywords.

* * * * *